(12) United States Patent
Iwase et al.

(10) Patent No.: US 11,470,263 B2
(45) Date of Patent: Oct. 11, 2022

(54) IMAGING APPARATUS AND FLICKER CORRECTION METHOD

(71) Applicant: SONY CORPORATION, Tokyo (JP)

(72) Inventors: Akira Iwase, Tokyo (JP); Takahiro Mori, Kanagawa (JP); Daisuke Nakayama, Tokyo (JP); Yasuhiro Kodama, Tokyo (JP); Masaya Kinoshita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 176 days.

(21) Appl. No.: 16/625,166

(22) PCT Filed: May 15, 2018

(86) PCT No.: PCT/JP2018/018721
§ 371 (c)(1),
(2) Date: Dec. 20, 2019

(87) PCT Pub. No.: WO2019/003675
PCT Pub. Date: Jan. 3, 2019

(65) Prior Publication Data
US 2021/0281737 A1 Sep. 9, 2021

(30) Foreign Application Priority Data
Jun. 30, 2017 (JP) .............................. JP2017-128797

(51) Int. Cl.
*H04N 5/235* (2006.01)
(52) U.S. Cl.
CPC ......... *H04N 5/2357* (2013.01); *H04N 5/2353* (2013.01)
(58) Field of Classification Search
CPC ............................ H04N 5/2357; H04N 5/2353
See application file for complete search history.

(56) References Cited

U.S. PATENT DOCUMENTS 8,284,299 B2 * 10/2012 Tanaka ................. H04N 5/2353
348/362
2015/0163392 A1 6/2015 Malone et al.
(Continued)

FOREIGN PATENT DOCUMENTS

CN 101867726 A 10/2010
CN 104104882 A 10/2014
(Continued)

OTHER PUBLICATIONS

Office Action for CN Patent Application No. 201880041840.9, dated Jan. 26, 2021, 8 pages of Office Action and 10 pages of English Translation.
(Continued)

*Primary Examiner* — Twyler L Haskins
*Assistant Examiner* — Angel L Garces-Rivera
(74) *Attorney, Agent, or Firm* — Chip Law Group

(57) ABSTRACT

A control section sets an exposure timing and an exposure period for imaging pixels for acquiring an imaging picture and light intensity detection pixels for detecting intensity of illumination light individually by an imaging section. A correction gain calculation section calculates a flicker correction gain for each of the imaging pixels on the basis of pixel signals generated by the imaging pixels and pixel signals generated by the light intensity detection pixels. A flicker correction section uses the flicker correction gain for each imaging pixel calculated by the correction gain calculation section to perform flicker correction of the imaging pixel. Accordingly, an imaging picture can be obtained on which the influence of fluctuation of the intensity of emission light is reduced irrespective of the positional relationship between an illumination apparatus and an imaging object.

14 Claims, 30 Drawing Sheets

(56) References Cited

U.S. PATENT DOCUMENTS

2017/0134634 A1    5/2017   Jin et al.
2017/0134734 A1    5/2017   Wu et al.

FOREIGN PATENT DOCUMENTS

| CN | 104702853 A | 6/2015 |
|---|---|---|
| CN | 105208293 A | 12/2015 |
| CN | 106063249 A | 10/2016 |
| EP | 3120539 A1 | 1/2017 |
| JP | 2011-097204 A | 5/2011 |
| JP | 2017-501627 A | 1/2017 |
| WO | 2015/088645 A1 | 6/2015 |
| WO | 2015/141925 A1 | 9/2015 |

OTHER PUBLICATIONS

International Search Report and Written Opinion of PCT Application No. PCT/JP2018/018721, dated Jul. 10, 2018, 7 pages of ISRWO.

Office Action for JP Patent Application No. 2019-526662, dated Apr. 12, 2022, 02 pages of English Translation and 02 pages of Office Action.

* cited by examiner

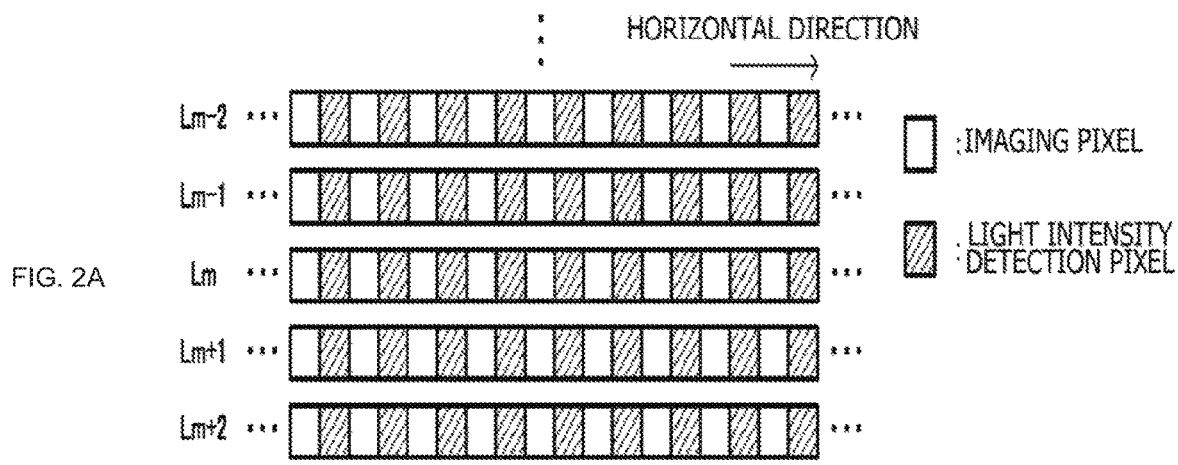
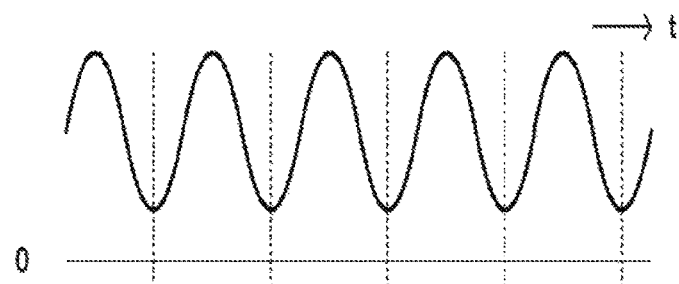
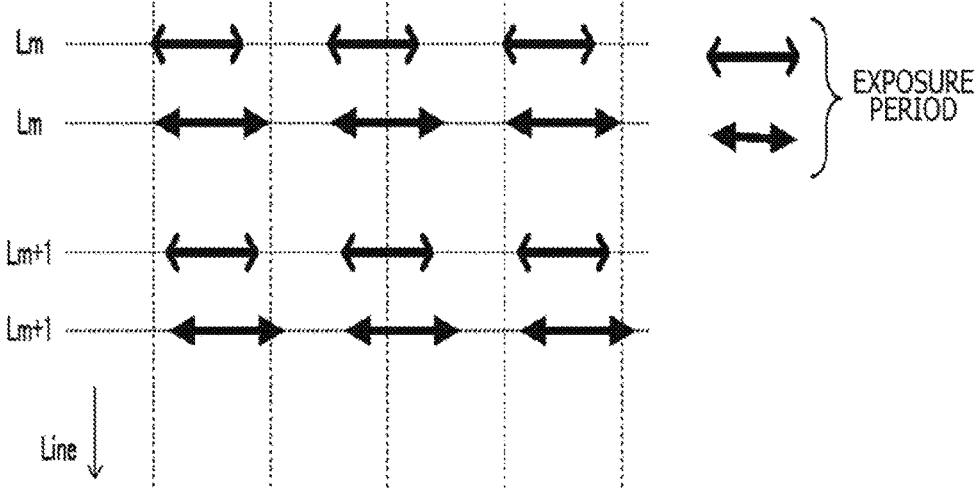

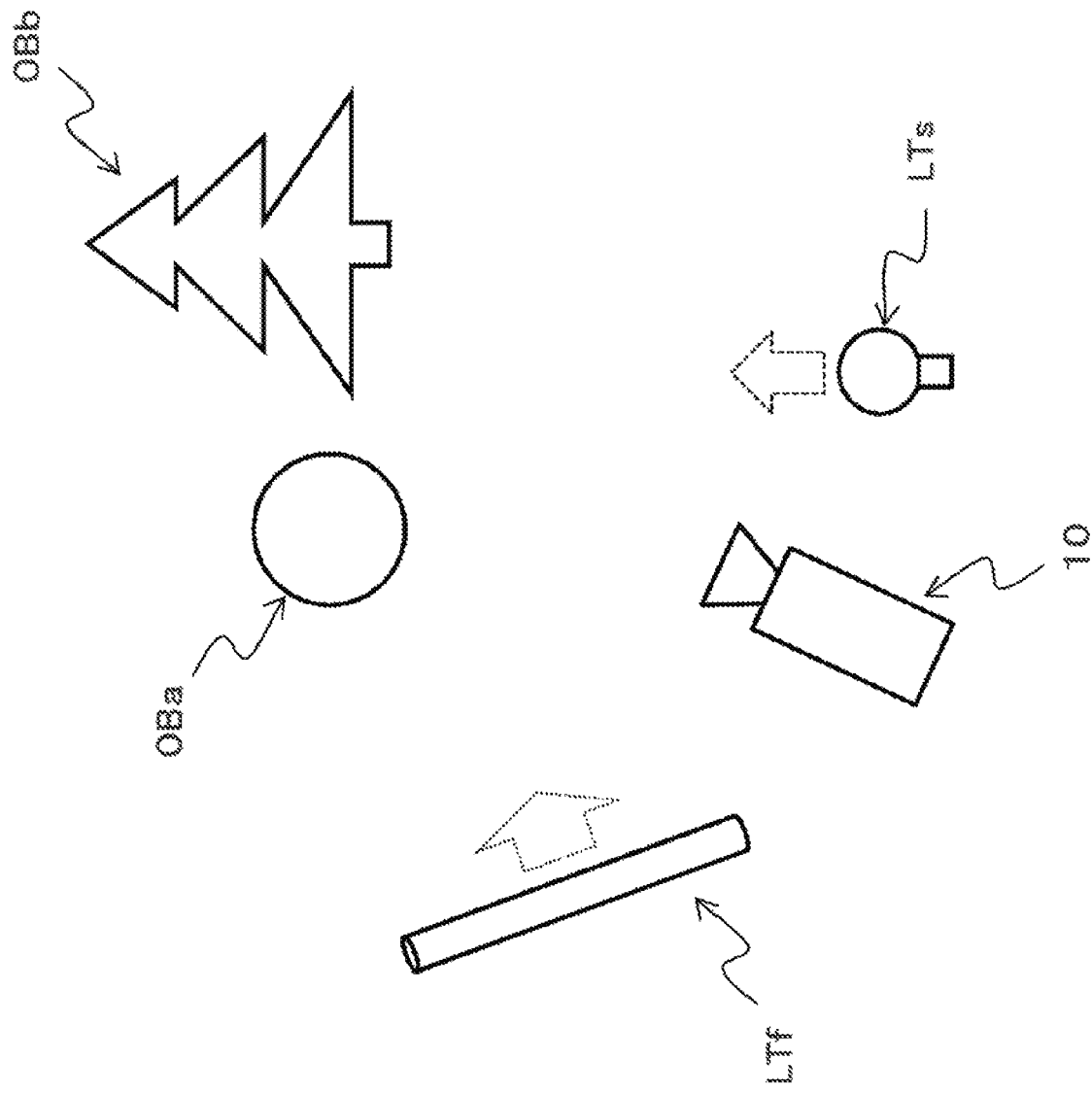

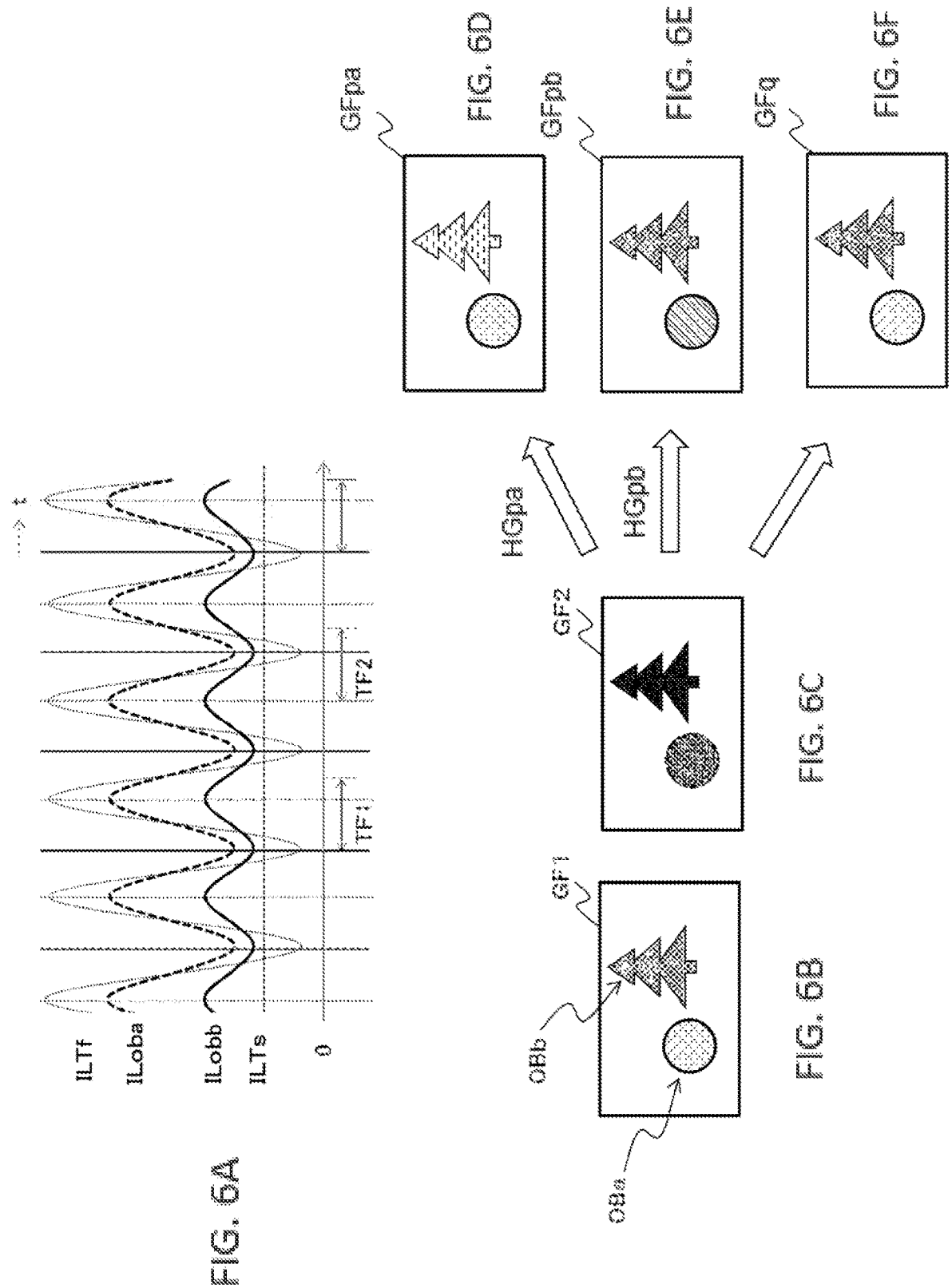

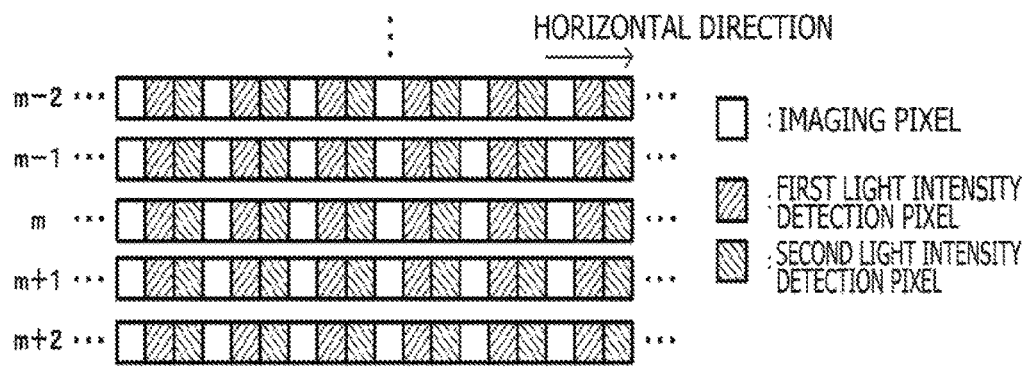
FIG. 7A
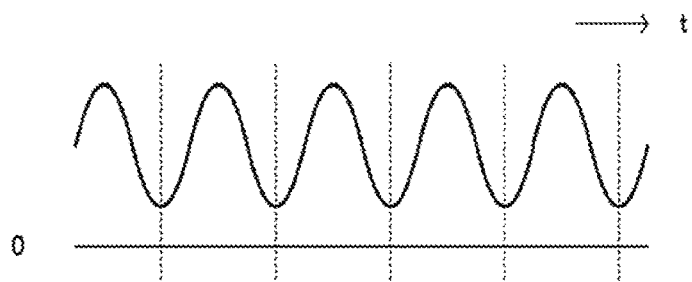
FIG. 7B
FIG. 7C  Lm
FIG. 7D  Lm
FIG. 7E  Lm
FIG. 7F  Lm+1
FIG. 7G  Lm+1
FIG. 7H  Lm+1

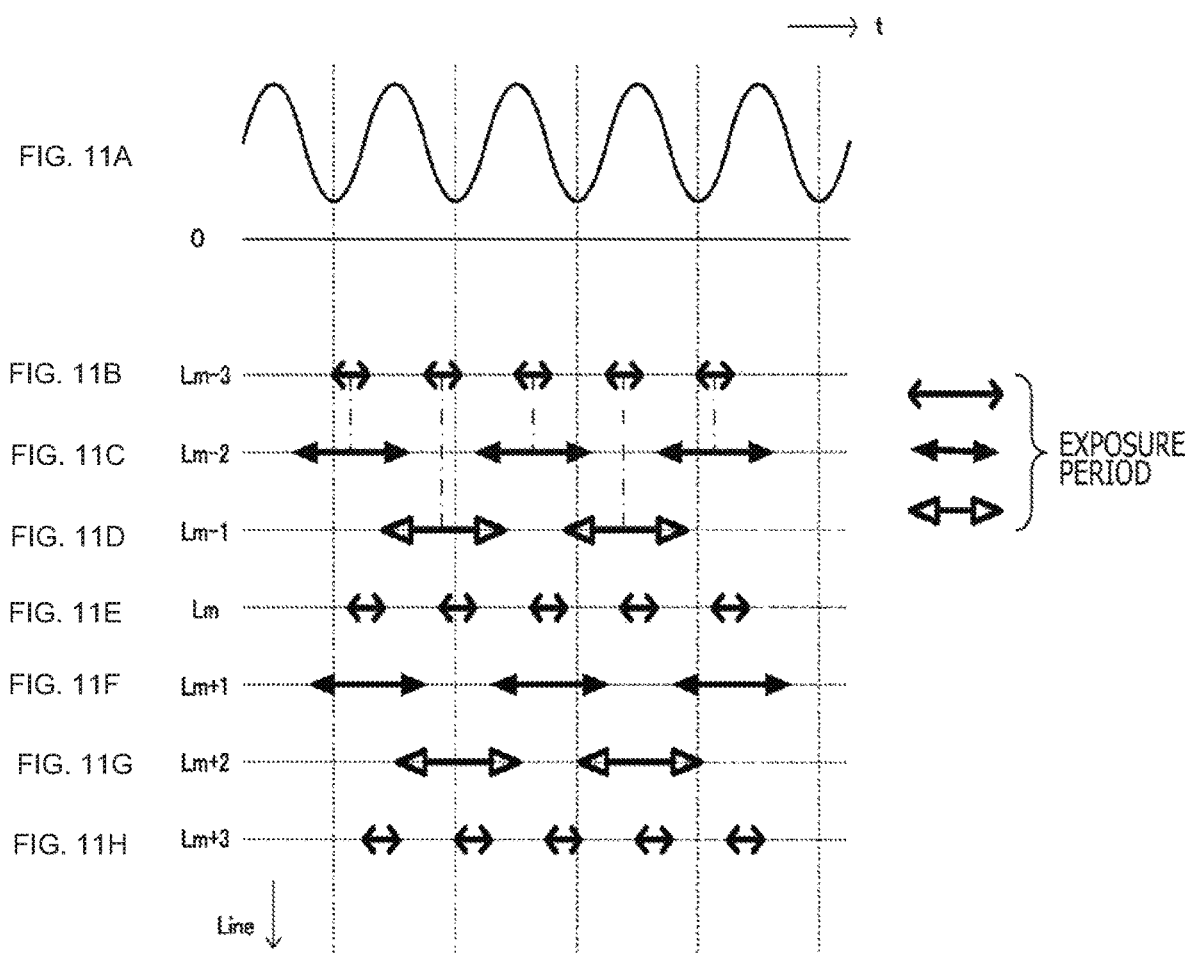

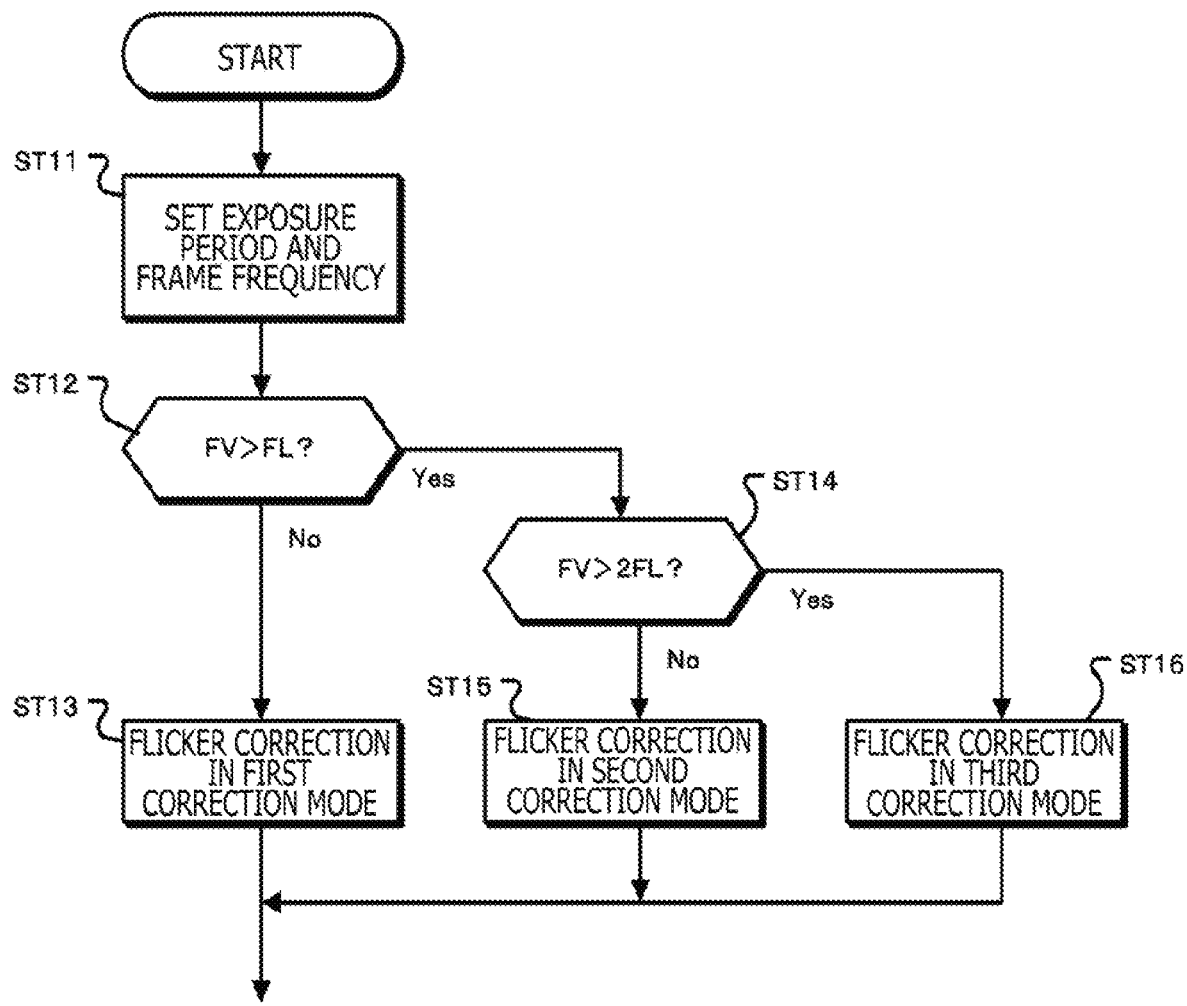

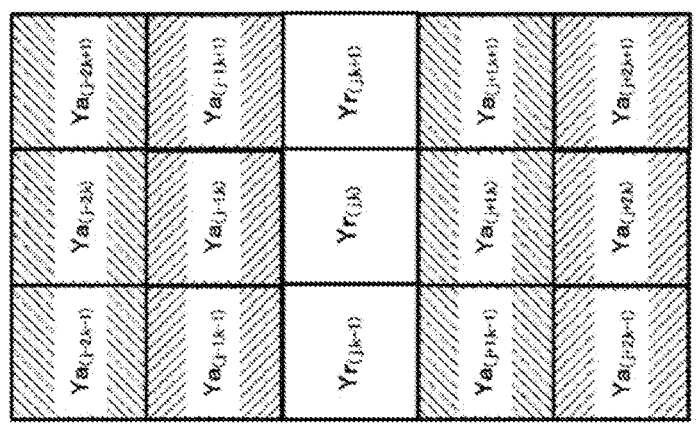
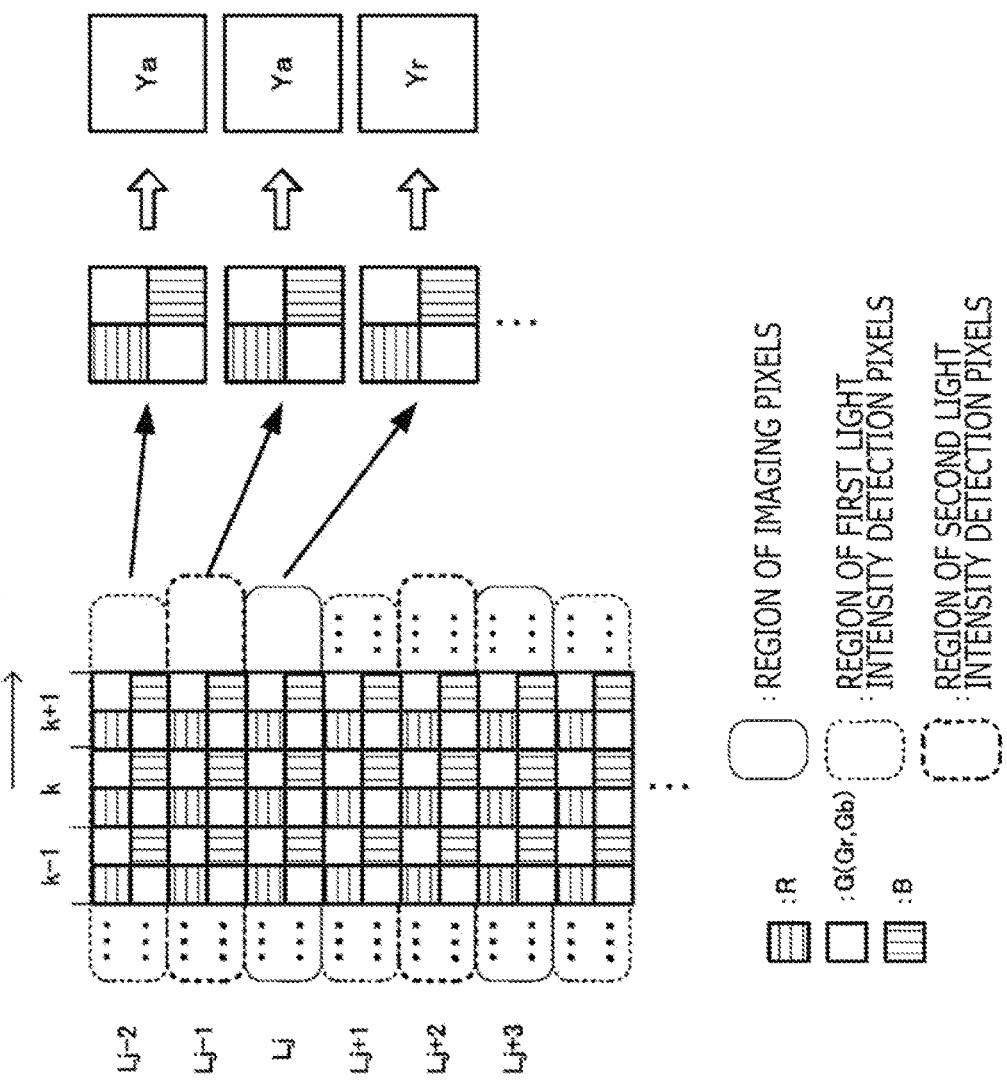

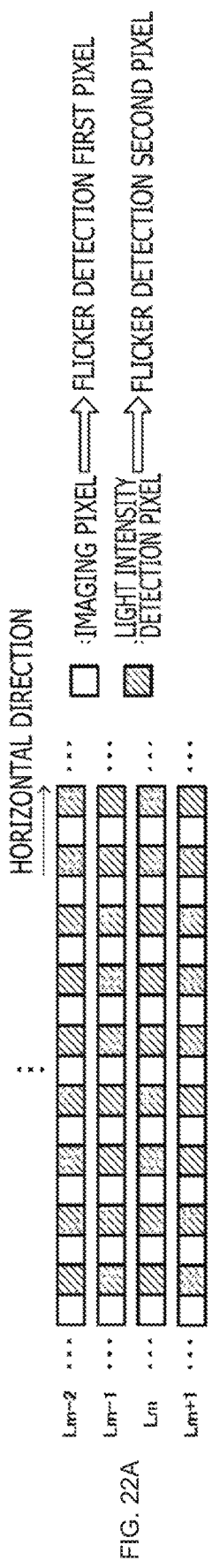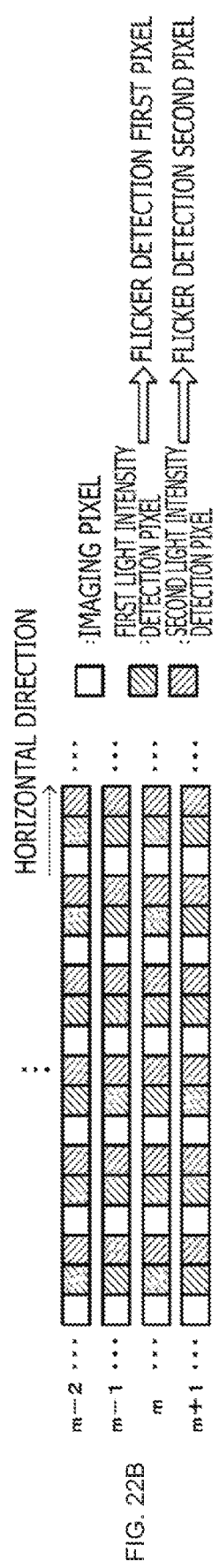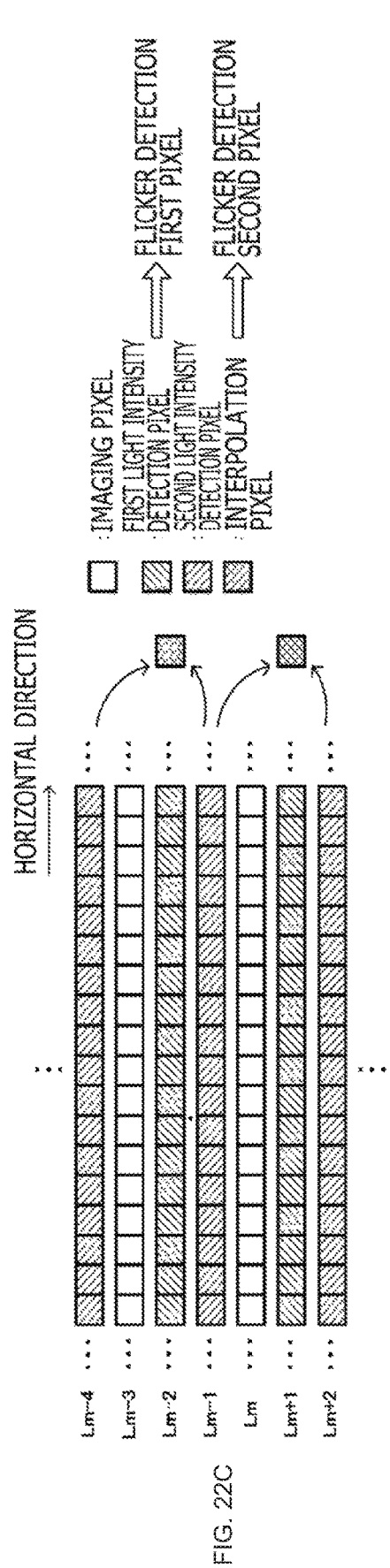

IMAGING APPARATUS AND FLICKER CORRECTION METHOD

CROSS REFERENCE TO RELATED APPLICATIONS

This application is a U.S. National Phase of International Patent Application No. PCT/JP2018/018721 filed on May 15, 2018, which claims priority benefit of Japanese Patent Application No. JP 2017-128797 filed in the Japan Patent Office on Jun. 30, 2017. Each of the above-referenced applications is hereby incorporated herein by reference in its entirety.

TECHNICAL FIELD

The present technology relates to an imaging apparatus, a flicker correction method and a program and make is possible to acquire an imaging picture on which, even if an illumination apparatus whose intensity of illumination light fluctuates periodically is utilized, the influence of the fluctuation of the intensity of illumination light is reduced irrespective of the positional relationship of the illumination apparatus and an imaging object.

BACKGROUND ART

Conventionally, when imaging is performed utilizing an illumination apparatus whose intensity of illumination light fluctuates periodically, reduction of the influence of the fluctuation of the intensity of the illumination light is performed. For example, in PTL 1, a first photodiode for imaging an imaging object and a second photodiode for detecting a fluctuation of the intensity of the illumination light are provided, and an imaging signal acquired using the first photodiode is corrected on the basis of an intensity change pattern of the illumination light detected using the second photodiode.

CITATION LIST

Patent Literature

[PTL 1]
Japanese Patent Laid-Open No. 2011-097204

SUMMARY

Technical Problem

Incidentally, correction of the imaging signal based on the intensity change pattern of the illumination light detected using the second photodiode is correction according to time change of the intensity of the illumination light. Accordingly, for example, the difference in flicker degree for each imaging object arising from a difference in positional relationship of the illumination apparatus and the imaging object cannot be corrected.

Therefore, it is an object of the present technology to provide an imaging apparatus, a flicker correction method and a program by which, even in the case where the intensity of illumination light fluctuates periodically, an imaging picture on which the influence of fluctuation of the intensity of the illumination light is reduced irrespective of a positional relationship between the illumination apparatus and an imaging object can be acquired.

Solution to Problem

The first aspect of the present technology resides in provision of an imaging apparatus including:
a correction gain calculation section configured to calculate a flicker correction gain on a basis of pixel signals of imaging pixels for acquiring an imaging picture and pixel signals of light intensity detection pixels for detecting intensity of illumination light; and
a control section configured to set an exposure timing and an exposure period for the imaging pixels and the light intensity detection pixels individually.

In the present technology, the imaging pixels for acquiring an imaging picture and the light intensity detection pixels for detecting intensity of illumination light are provided adjacent each other, for example, in a vertical direction. The control section sets an exposure timing and an exposure period for the imaging pixels and the light intensity detection pixels individually. For example, the control section sets the exposure period for the imaging pixels to a period according to a shutter speed and sets the exposure period for the light intensity detection pixels to a cycle period of an intensity change of the illumination light, and further sets the exposure timing for the imaging pixels and the light intensity detection pixels to a timing same as any one of an exposure start, an exposure end and a middle of the exposure period. Further, the control section provides one or a plurality of pixel groups of the light intensity detection pixels on the basis of a frame cycle of the imaging picture and a cycle of the intensity change of the illumination light to obtain pixel signals during the exposure period that is a cycle period of the intensity change of the illumination light by any one of the pixel groups of the light intensity detection pixels for each frame of the imaging picture. The correction gain calculation section calculates a flicker correction gain for an imaging pixel of a flicker correction target on the basis of the pixel signals of the imaging pixels and the pixel signals of the light intensity detection pixels. For example, the correction gain calculation section performs an interpolation process using pixel signals of the light intensity detection pixels within a plurality of pixel ranges in a horizontal direction and a vertical direction on the basis of the imaging pixel of the flicker correction target to generate pixel signals of light intensity detection pixels each having a spatial phase same as that of the imaging pixels to calculate a flicker correction gain for each imaging pixel on the basis of the pixel signals of the imaging pixels and the pixel signals of the light intensity detection pixels each having the spatial phase same as that of the imaging pixels. The flicker correction section performs flicker correction of the imaging pixel of the flicker correction target using the flicker correction gain calculated by the correction gain calculation section.

Further, a flicker detection section is provided to detect a cycle of the intensity change of the illumination light on the basis of signal level change of the pixel signals for each frame of flicker detection first pixels whose exposure period is a cycle of a first commercial power supply frequency and flicker detection second pixels whose exposure period is a cycle of a second commercial power supply frequency. In the case where the flicker detection section is provided, before calculation of the flicker correction gain, the control section sets the light intensity detection pixels or the light intensity detection pixels and the imaging pixels to the flicker detection first pixels and the flicker detection second pixels, and controls the flicker detection section to perform flicker detection, and then sets, after the flicker detection, a cycle detected by the flicker detection section to an exposure period for the light intensity detection pixels.

Further, the control section determines a pixel block configured from a plurality of color component pixels as a pixel unit of the imaging pixels and light intensity detection pixels, and the correction gain calculation section calculates the flicker correction gain on the basis of a luminance value calculated from pixel signals of the color component pixels of the pixel block configuring the imaging pixels and the light intensity detection pixels.

Further, the light intensity detection pixels are arranged thinned out, and the correction gain calculation section performs the interpolation process using the pixel signals of the light intensity detection pixels to calculate pixel signals of light intensity detection pixels each having a spatial phase same as that of the imaging pixels and calculates a flicker correction gain of the imaging pixels of the flicker correction target on the basis of the pixel signals of the imaging pixels and the pixel signals of the light intensity detection pixels each having a spatial phase same as that of the imaging pixels.

The second aspect of the present technology resides in provision of a flicker correction method including:

setting an exposure timing and an exposure period for imaging pixels for acquiring an imaging picture and light intensity detection pixels for detecting intensity of illumination light individually;

calculating a flicker correction gain on a basis of pixel signals generated by the imaging pixels and pixel signals generated by the light intensity detection pixels; and performing flicker correction of the imaging pixels using the calculated flicker correction gain.

The third aspect of the present technology resides in provision of a program for causing a computer to execute flicker correction of an imaging picture, the program for causing the computer to execute:

a procedure for setting an exposure timing and an exposure period for imaging pixels for acquiring the imaging picture and light intensity detection pixels for detecting intensity of illumination light individually;

a procedure for calculating a flicker correction gain on a basis of imaging pixel signals generated by the imaging pixels and illumination light pixel signals generated by the light intensity detection pixels; and a procedure for performing flicker correction of the imaging pixels using the calculated flicker correction gain.

It is to be noted that the program of the present technology is a program capable of being provided by a storage medium or a communication medium that provides the program, for example, in a computer-readable form to a general-purpose computer that can execute various program codes, for example, by a storage medium such as an optical disk, a magnetic disk or a semiconductor memory or a communication medium such as a network. By providing such a program as described above in a computer-readable form, processing according to the program is implemented on a computer.

Advantageous Effect of Invention

According to the present technology, an exposure timing and an exposure period for the imaging pixels for acquiring an imaging picture and the light intensity detection pixels for detecting intensity of illumination light are set individually. Further, a flicker correction gain is calculated for each of the imaging pixels on the basis of the pixel signals generated by the imaging pixels and the pixel signals generated by the light intensity detection pixels. Accordingly, it becomes possible to acquire an imaging picture on which the influence of fluctuation of the intensity of emission light is reduced irrespective of the positional relationship between the illumination apparatus and the imaging object. It is to be noted that the effect described in the present specification is exemplary to the end and is not restrictive, and an additional effect may be applicable.

BRIEF DESCRIPTION OF DRAWINGS

FIGS. 2A, 2B, 2C, 2D, 2E, and 2F are views illustrating first operation.

FIG. 5 is a view exemplifying arrangement of an imaging object, an illumination apparatus and the imaging apparatus.

FIGS. 6A, 6B, 6C, 6D, 6E, and 6F are views illustrating flicker correction operation.

FIGS. 7A, 7B, 7C, 7D, 7E, 7F, 7G, and 7H are views illustrating second operation.

FIGS. 11A, 11B, 11C, 11D, 11E, 11F, 11G, and 11H are views illustrating fourth operation.

FIG. 12 is a flow chart depicting fifth operation.

FIGS. 18A and 18B are views illustrating calculation operation of a flicker correction gain of the second embodiment.

FIGS. 22A, 22B, and 22C are views exemplifying a flicker detection first pixel and a flicker detection second pixel.

DESCRIPTION OF EMBODIMENTS

In the following, modes for carrying out the present technology is described. It is to be noted that the description is given in the following order.

1. First Embodiment
1-1. Configuration of Imaging Apparatus
1-2. First Operation of Imaging Apparatus
1-3. Second Operation of Imaging Apparatus
1-4. Third Operation of Imaging Apparatus
1-5. Fourth Operation of Imaging Apparatus
1-6. Fifth Operation of Imaging Apparatus
2. Second Embodiment
2-1. Configuration of Imaging Apparatus
2-2. Operation of Imaging Apparatus
3. Third Embodiment
4. Fourth Embodiment
5. Application Example
6. Application Example to Mobile Body

1. First Embodiment

<1-1. Configuration of Imaging Apparatus>

Figure 1:
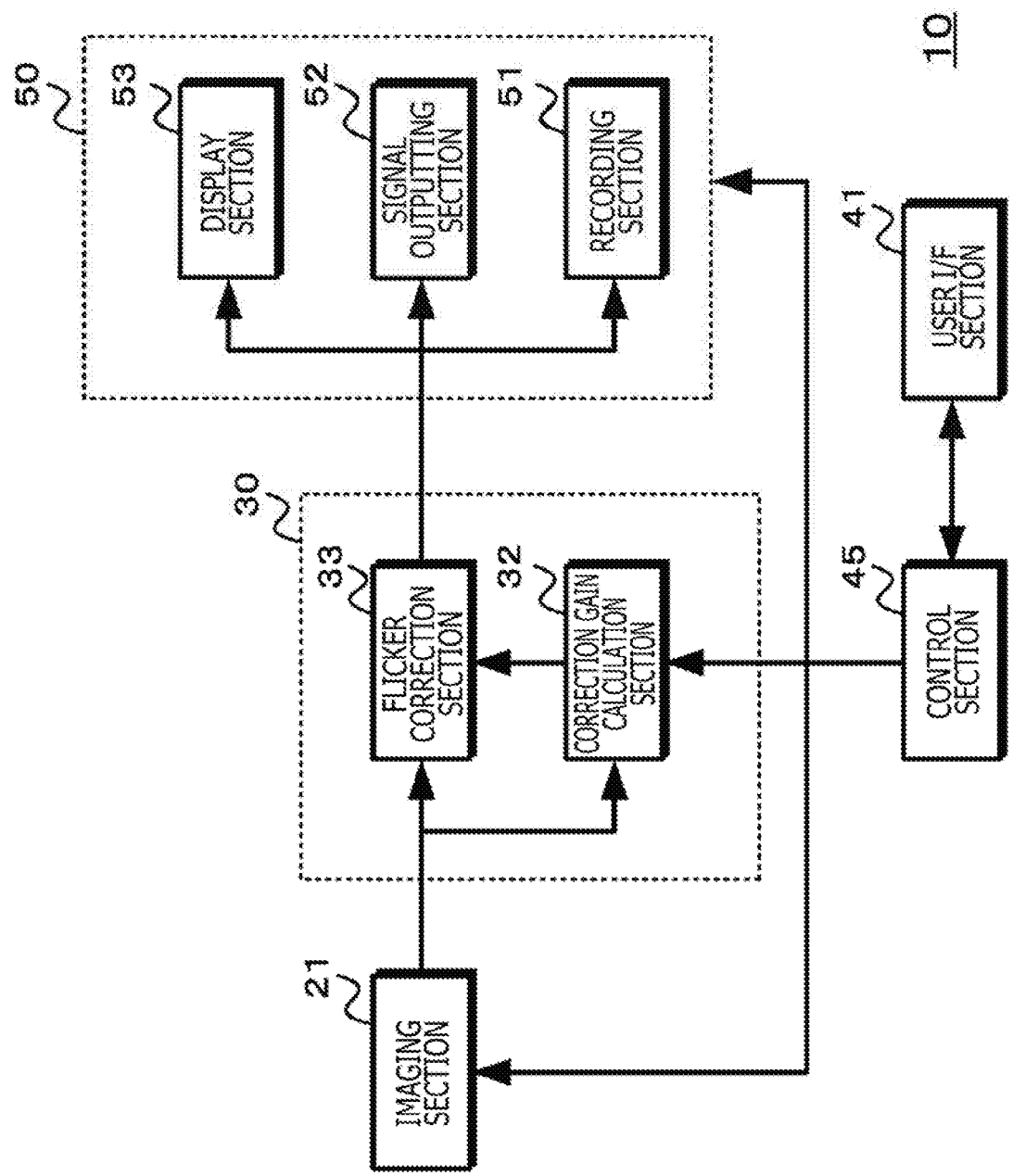
FIG. 1 is a view exemplifying a configuration of an imaging apparatus in a first embodiment.

FIG. 1 exemplifies a configuration of an imaging apparatus according to a first embodiment of the present technology. The imaging apparatus 10 includes an imaging section 21, an image signal processing section 30, an user interface (I/F) section 41 and a control section 45. The imaging apparatus 10 may include a recording section 51, a signal outputting section 52, a display section 53 and so forth as a peripheral section 50.

The imaging section 21 includes imaging pixels and light intensity detection pixels in an imaging plane thereof. The imaging pixels are pixels for acquiring an imaging picture and generate a pixel signal according to the exposure light amount within an exposure period where the exposure period is a period according to a shutter speed. The light intensity detection pixels are pixels for detecting the intensity of illumination light and generate a pixel signal according to the exposure light amount within an exposure period where the exposure period is a flicker cycle period. The imaging section 21 outputs pixel signals generated by the imaging pixels and the light intensity pixels to the image signal processing section 30. It is to be noted that the imaging pixels and the light intensity detection pixels are provided alternately in a horizontal direction or a vertical direction, and details of them are hereinafter described.

The image signal processing section 30 includes a correction gain calculation section 32 and a flicker correction section 33. The correction gain calculation section 32 calculates a flicker correction gain on the basis of the pixel signals generated by the imaging pixels and the light intensity detection pixels of the imaging section 21. In particular, the correction gain calculation section 32 uses pixel signals of the imaging pixels and pixel signals of light intensity detection pixels within a predetermined pixel range based on an imaging pixel of a flicker correction target to generate a pixel signal of a light intensity detection pixel having a spatial phase same as that of the imaging pixel. Further, the correction gain calculation section 32 calculates a flicker correction gain on the basis of the pixel signal of an imaging pixel and the pixel signal of a light intensity detection pixel having a spatial phase same as that of the imaging pixel. The correction gain calculation section 32 outputs the calculated flicker correction gain to the flicker correction section 33.

The flicker correction section 33 performs gain adjustment for the pixel signal of the imaging pixel of the flicker correction target with the flicker correction gain calculated by the correction gain calculation section 32 to generate an image signal for which correction of the flicker has been performed. The flicker correction section 33 outputs the image signal after the flicker correction to the recording section 51, signal outputting section 52, display section 53 and so forth.

The user interface section 41 is configured using operation switches, operation buttons and so forth. The user interface section 41 generates and outputs an operation signal according to a user operation to the control section 45. Further, the commercial power supply frequency is 50 or 60 Hz, and the flicker rate of illumination of a fluorescent lamp whose illumination light intensity changes following up a voltage fluctuation generally is a double rate of the power supply frequency. In particular, the flicker frequency when the commercial power supply frequency is 50 Hz is 100 Hz, and the flicker frequency when the commercial power supply frequency is 60 Hz is 120 Hz. The user interface section 41 allows a user designation operation of a flicker frequency (or a power supply frequency of the commercial power supply to be used by the illumination apparatus) or a flicker cycle.

The control section 45 is configured using a microcomputer in which a storage section such as, for example, a ROM that stores a control program, a flash memory that temporarily stores data and so forth is built. The control section 45 executes the control program to control, on the basis of an operation signal from the user interface section 41, operation of the components such that operation desired by the user is performed by the imaging apparatus 10. Further, the control section 45 controls operation of the imaging section 21 and the image signal processing section 30 as well as the peripheral section 50 such that an image signal for which flicker correction corresponding to a flicker frequency or the like designated by the user operation has been operated can be generated. Further, the control section 45 sets a pixel of the imaging section 21 as an imaging pixel or a light intensity detection pixel. Furthermore, the control section 45 sets an exposure timing and an exposure period individually for the imaging pixel and the light intensity detection pixel.

The recording section 51 records the image signal after the flicker correction generated by the image signal processing section 30 on a recording medium. Further, the recording section 51 read outs an image signal recorded on the recording medium and outputs the image signal to the display section 53. Further, the recording section 51 may perform an encoding process of the image signal after the flicker correction to generate an encoded signal and record the encoded signal on the recording medium and may output an image signal obtained by a decoding process for an encoded signal read out from the recording medium to the display section 53.

The signal outputting section 52 outputs the image signal after the flicker correction generated by the image signal processing section 30 as an image of a predetermined format to an external apparatus. Further, the signal outputting section 52 may perform an encoding process for the image signal after the flicker correction and output the encoded signal to the external apparatus.

The display section 53 displays an imaging picture on the basis of the image signal after the flicker correction generated by the image signal processing section 30 or the image signal read out from the recording section 51. Further, the display section 53 performs displaying of a menu screen image or the like on the basis of a control signal from the control section 45.

<1-2. First Operation of Imaging Apparatus>

Now, first operation of the imaging apparatus is described. FIGS. 2A, 2B, 2C, 2D, 2E, and 2F are views illustrating the first operation. In the first operation, the imaging section 21 allows setting of an exposure time period in a unit of a pixel. In the imaging plane of the imaging section 21, imaging pixels and light intensity detection pixels are provided alternately in a unit of one pixel in the horizontal direction as depicted in of FIG. 2A.

FIG. 2B depicts an intensity change of illumination light. FIG. 2C depicts an exposure period of imaging pixels on a line Lm and FIG. 2D depicts an exposure period of light intensity detection pixels on the line Lm. Meanwhile, FIG. 2E depicts an exposure period of imaging pixels on a line Lm+1 and FIG. 2F depicts an exposure period of light intensity detection pixels on the line Lm+1. It is to be noted that, in the case where the imaging section 21 uses an XY address method for reading out individual pixel signals designating the address of each pixel, the exposure timing is successively displaced for each line.

The control section 45 sets the pixels of the imaging section 21 as imaging pixels and light intensity detection pixels as depicted in FIG. 2A. Further, the control section 45 controls the imaging section 21 to operate setting the exposure period for the imaging pixels to a period according to a shutter speed and setting the exposure period for the light intensity detection pixels to one cycle period of a flicker frequency designated by the user. In the case depicted in FIGS. 2A, 2B, 2C, 2D, 2E, and 2F, the shutter speed=1/120 second and the flicker frequency=100 Hz (1/100 second). Further, the frame frequency of the imaging picture is set to a frequency lower than the flicker frequency, for example, to 66.7 Hz, and the imaging pixels and the light intensity detection pixels are set such that, for example, the exposure starting timings of them coincide with each other in each frame.

Figure 3:
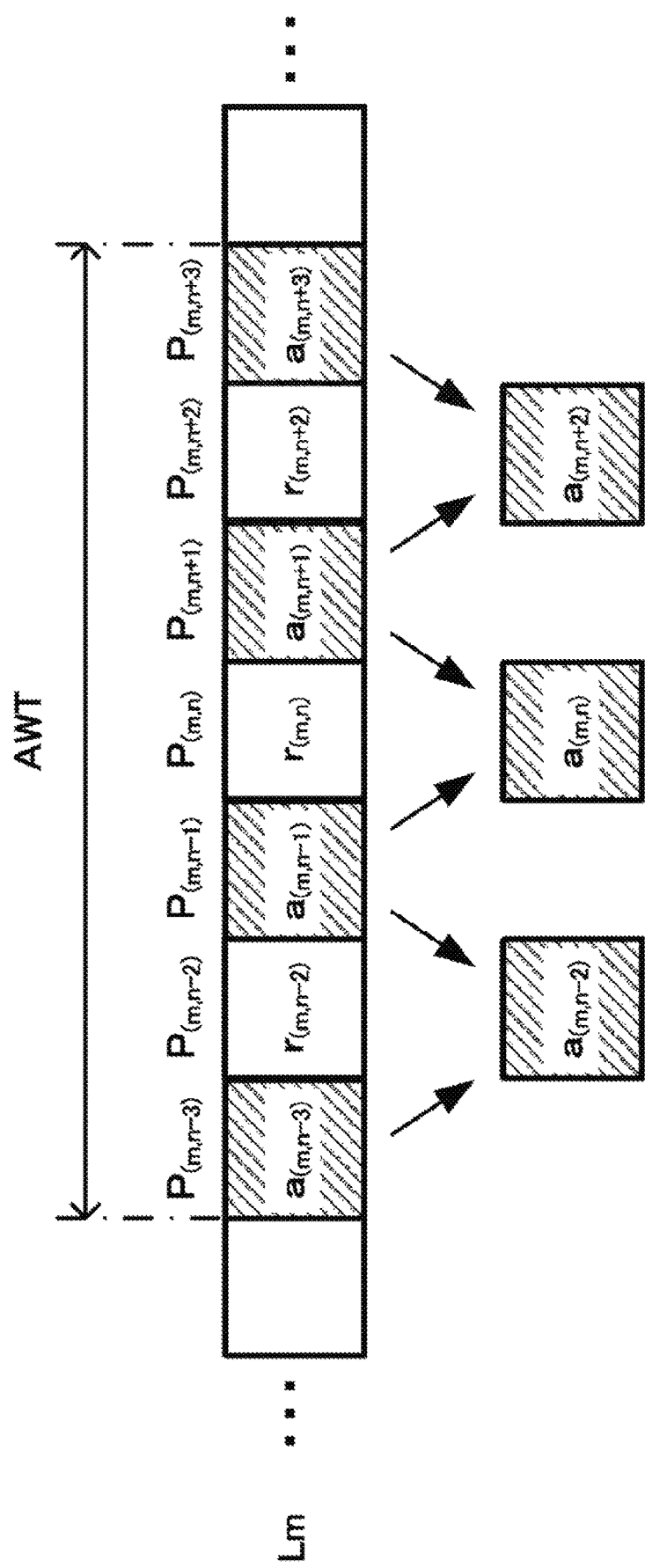
FIG. 3 is a view exemplifying a predetermined pixel range based on an imaging pixel of a flicker correction target.

The image signal processing section 30 performs flicker correction using pixel signals generated by the imaging operation depicted in FIGS. 2A, 2B, 2C, 2D, 2E, and 2F performed by the imaging section 21. FIG. 3 exemplifies a predetermined pixel range based on an imaging pixel of a flicker correction target. The pixel range may be set to a fixed range in advance or may be configured so as to be changeable to an arbitrary range. It is to be noted that, in FIG. 3, an imaging pixel that is the nth pixel P(m,n) on a line Lm is the flicker correction target, and pixels P(m,n-3) to P(m,n+3) are set as a predetermined pixel range AWT. Further, the pixel values of the pixels P(m,n-2), P(m,n) and P(m,n+2) that are imaging pixels are r(m,n-2), r(m,n) and r(m,n+2), respectively. Further, the pixel values of the pixels P(m,n-3), P(m,n-1), P(m,n+1) and P(m,n+3) that are light intensity detection pixels are a(m,n-3), a(m,n-1), a(m,n+1) and a(m,n+3), respectively.

The correction gain calculation section 32 of the image signal processing section 30 calculates a flicker correction gain HG in accordance with an expression (1).

HG=(pixel value $WTa$ of light intensity detection pixel group/pixel value $WTr$ of imaging pixel group) (1)

For the pixel value WTr of the imaging pixel group, for example, an average pixel value of the imaging pixels within the predetermined pixel range as indicated by an expression (2) is used.

$WTr=(r(m,n-2)+r(m,n)+r(m,n+2))/3$ (2)

For the pixel value WTa of the light intensity detection pixel group, linear interpolation is performed using pixel values of the light intensity detection pixel group and pixel values of the light intensity detection pixel group having a spatial phase same as that of the imaging pixel group in the predetermined pixel range are calculated, and an average value of the calculated pixel values is used as the pixel value WTa. The correction gain calculation section 32 calculates the pixel values of the light intensity detection pixels having a spatial phase same as that of the imaging pixel group, namely, pixel values a(m,n-2), a(m,n) and a(m,n+2) of the pixels P(m,n-2), P(m,n) and P(m,n+2), in accordance with expressions (3) to (5). Further, the correction gain calculation section 32 performs an arithmetic operation indicated by an expression (6) to calculate the pixel value WTa of the light intensity detection pixel group having a spatial phase same as that the imaging pixel group.

$a(m,n-2)=0.5 \times a(m,n-3)+0.5 \times a(m,n-1)$ (3)

$a(m,n)=0.5 \times a(m,n-1)+0.5 \times a(m,n+1)$ (4)

$a(m,n+2)=0.5 \times a(m,n+1)+0.5 \times a(m,n+3)$ (5)

$WTa=(a(m,n-2)+a(m,n)+a(m,n+2))/3$ (6)

The correction gain calculation section 32 outputs the calculated flicker correction gain, namely, the flicker correction gain HG(m,n) indicated by an expression (7) to the flicker correction section 33.

$$HG(m, n) = (WTa / WTr) = \\ (0.5 \times a(m, n-3) + a(m, n-1) + a(m, n+1) + 0.5 \times a(m, n+3))/ \\ (r(m, n-2) + r(m, n) + r(m, n+2))$$ (7)

The flicker correction section 33 performs gain adjustment for the pixel signal of the imaging pixel of the pixel P(m,n) that is the flicker correction target using the flicker correction gain HG(m,n) calculated by the correction gain calculation section 32. In particular, the flicker correction section 33 performs an arithmetic operation of an expression (8) to calculate a pixel value rc(m,n) after the correction of the imaging pixel of the flicker correction target.

$rc(m,n)=HG(m,n) \times r(m,n)$ (8)

The image signal processing section 30 generates an image signal on which the influence of the flicker is reduced by performing the processes described above for each imaging pixel.

Figure 4:
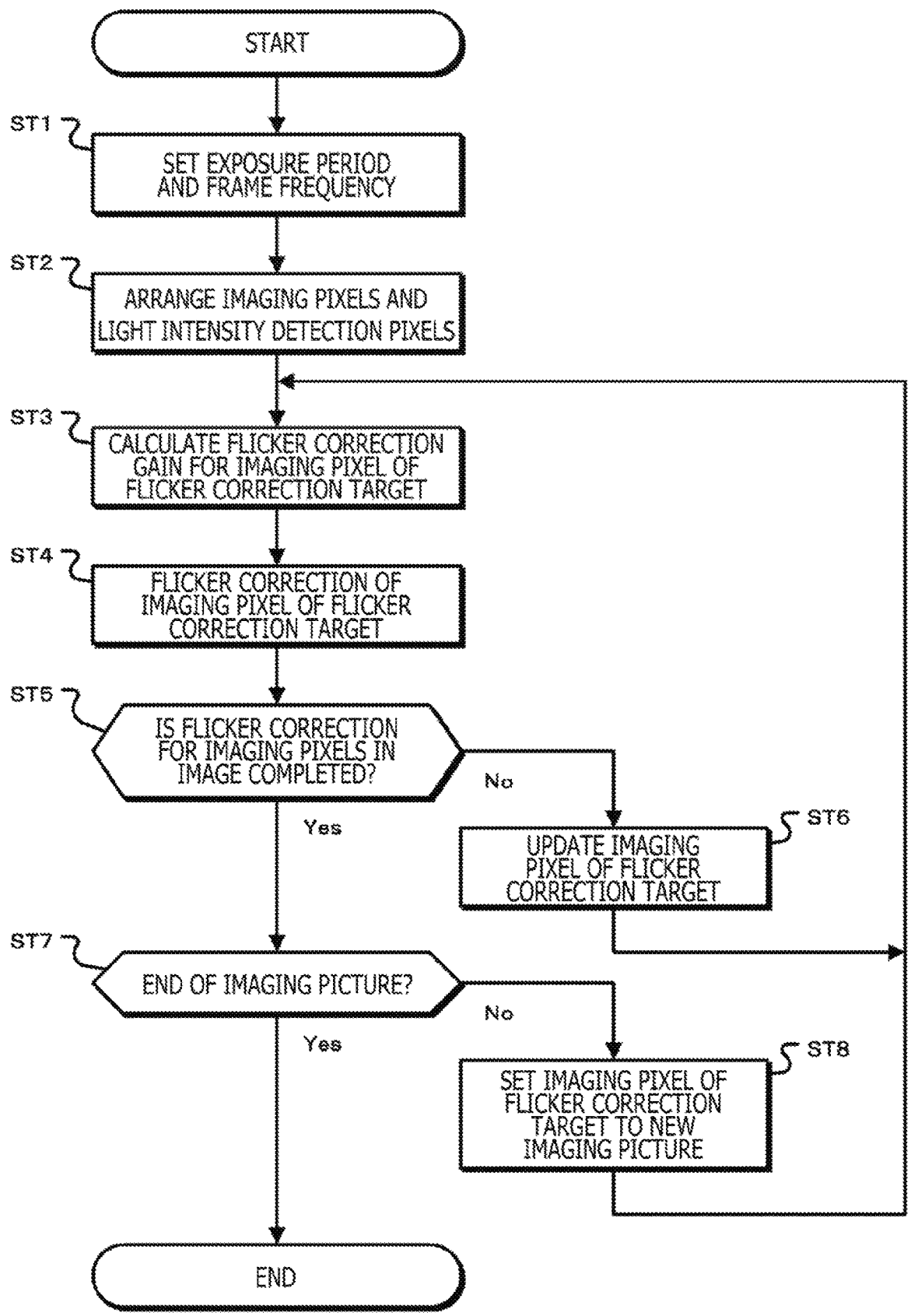
FIG. 4 is a flow chart depicting the first operation.

FIG. 4 is a flow chart depicting the first operation of the imaging apparatus. At step ST1, the imaging apparatus sets an exposure period and a frame frequency. The control section 45 of the imaging apparatus 10 sets the exposure period for an imaging pixel to a period corresponding to a set shutter speed. Further, the control section 45 sets the exposure period for a light intensity detection pixel to the flicker cycle period. Furthermore, the control section 45 sets a frame frequency FV for the imaging picture in response to a frame rate set by the user or the like, and then, the processing advances to step ST2.

At step ST2, the imaging apparatus arranges imaging pixels and light intensity detection pixels. The control section 45 of the imaging apparatus 10 provides such imaging pixels and light intensity detection pixels as described above in the imaging plane of the imaging section 21 and performs driving control setting the exposure periods for the imaging pixels and the light intensity detection pixels to the exposure period set at step ST1, whereafter the processing advances to step ST3.

At step ST3, the imaging apparatus calculates a flicker correction gain for the imaging pixel of the flicker correction target. The correction gain calculation section 32 of the imaging apparatus 10 calculates a flicker correction gain in such a manner as described above using pixel signals of imaging pixels and pixel signals of light intensity detection pixels within a predetermined pixel range based on the imaging pixel of the flicker correction target, and the processing advances to step ST4.

At step ST4, the imaging apparatus performs flicker correction of the imaging pixel of the flicker correction target. The flicker correction section 33 of the imaging apparatus 10 performs gain adjustment of the imaging pixel of the flicker correction target using the flicker correction gain calculated at step ST3 to generate a pixel signal on which the influence of the flicker is corrected, and then the processing advances to step ST5.

At step ST5, the imaging apparatus decides whether or not the flicker correction for the imaging pixels in the screen image is completed. In the case where the image signal processing section 30 of the imaging apparatus 10 does not complete the flicker correction for the imaging pixels in the screen image, the processing advances to step ST6, but in the case where the flicker correction for the imaging pixels in the screen image is completed, the processing advances to step ST7.

At step ST6, the imaging apparatus updates the imaging pixel of the flicker correction target. The image signal processing section 30 of the imaging apparatus 10 sets an imaging pixel for which the flicker correction of an imaging pixel has not been performed as an imaging pixel of a new flicker correction target, and then the processing returns to step ST3.

At step ST7, the imaging apparatus decides whether the imaging picture comes to an end. In the case where the control section 45 of the imaging apparatus 10 decides that the imaging picture for which flicker correction is to be performed does not come to an end, the processing advances to step ST8, but in the case where the imaging picture for which flicker correction is to be performed comes to an end, for example, in the case where an ending operation for imaging is performed, the flicker correction operation is ended.

At step ST8, the imaging apparatus sets the imaging pixel of the flicker correction target to the new imaging picture. The image signal processing section 30 of the imaging apparatus 10 sets the imaging pixel of the flicker correction target to the imaging picture of a new frame, and the processing returns to step ST3.

In this manner, the control section of the imaging apparatus provides imaging pixels and light intensity detection pixels in an imaging screen image and sets a period according to a shutter speed as an exposure period of an imaging pixel and sets a flicker cycle period as an exposure period for a light intensity detection pixel. Further, the correction gain calculation section calculates a flicker correction gain using imaging pixels within a predetermined pixel range based on an imaging pixel of a flicker correction target and a light intensity detection pixel having an exposure starting timing same as that of the imaging pixel of the flicker correction target. Further, the flicker correction section performs gain adjustment of the imaging pixel of the flicker correction target with the calculated flicker correction gain. Accordingly, an imaging picture on which the influence of a fluctuation of the intensity of illumination light is reduced irrespective of the positional relationship between the illumination apparatus and the imaging object can be obtained.

FIG. 5 exemplifies arrangement of an imaging object, an illumination apparatus and an imaging apparatus, and imaging objects OBa and OBb are illuminated, for example, using an illumination apparatus LTs that does not indicate a change in intensity of illumination light and another illumination apparatus LTf that indicates a change in intensity of illumination light. The imaging apparatus 10 images the imaging objects OBa and OBb that are being illuminated by the illumination apparatuses LTs and LTf.

FIGS. 6A, 6B, 6C, 6D, 6E, and 6F a view illustrating flicker correction operation. FIG. 6A exemplifies an intensity ILTs of illumination light of the illumination apparatus LTs, an intensity ILTf of illumination light of the illumination apparatus LTf, an illuminance ILoba of the imaging object OBa and an illuminance ILobb of the imaging object OBb. FIG. 6B indicates an imaging picture GF1 during an exposure period TF1, and FIG. 6C indicates an imaging picture GF2 during an exposure period TF2. The exposure period TF1 and the exposure period TF2 are equal in period length to each other but are different in phase with respect to a change of the intensity ILTf2 of the illumination light of the illumination apparatus LTf from each other. Here, in the case depicted in FIG. 6A, during the exposure period TF2, the intensity ILTf of the illumination light of the illumination apparatus LTf becomes lower than that during the exposure period TF1. Therefore, images of the imaging objects OBa and OBb in the imaging picture GF2 depicted in FIG. 6C are darker than images of the imaging objects OBa and OBb in the imaging picture GF1 depicted in FIG. 6B.

Here, if correction of an imaging signal based on an intensity change pattern of illumination light of an illumination apparatus detected using a photodiode as in the prior art is performed and then flicker correction is performed, for example, with a flicker correction gain HGpa, then the brightness of the imaging object OBa in an imaging picture GFpa after the flicker correction can be corrected to a brightness of the imaging object OBa in the imaging picture GF1 as depicted in FIG. 6D. However, since the change in brightness of the imaging object OBb is smaller than the change in brightness of the imaging object OBa, if flicker correction is performed with the flicker correction gain HGpa, then the imaging object OBb in the imaging picture GFpa becomes brighter than the imaging object OBb in the imaging picture GF1.

Further, for example, if flicker correction is performed with a flicker correction gain HGpb, then the brightness of the imaging object OBb in an imaging picture GFpb after the flicker correction can be corrected to the brightness of the imaging object OBb in the imaging picture GF1 as depicted in FIG. 6E. However, since the change in brightness of the imaging object OBb is smaller than the change in brightness of the imaging object OBa, if flicker correction is performed with the flicker correction gain HGpb, then the imaging object OBa in the imaging picture GFpb is placed into a state in which it is darker than the imaging object OBa in the imaging picture GF1.

In the imaging apparatus of the technology of the present application, a flicker correction gain is calculated for each imaging pixel of a flicker correction target, and the flicker correction section performs gain adjustment of the imaging pixel of the flicker correction target with a calculated flicker correction gain as described above. Accordingly, at whichever timing in the change of the intensity ILTf2 of illumination light of the illumination apparatus LTf the exposure period is, the brightness of the images of the imaging objects OBa and OBb in an imaging picture GFq after the flicker correction can be made a brightness that is free from an influence of the fluctuation of the intensity of illumination light as depicted in FIG. 6F. In other words, an imaging picture on which the influence of fluctuation of the intensity of illumination light is reduced irrespective of the positional relationship between the illumination apparatus and the imaging object can be acquired.

<1-3. Second Operation of Imaging Apparatus>

Incidentally, in the first operation described above, if the frame frequency of the imaging picture is a frequency higher than the flicker frequency, then exposure of a next frame of the imaged image is started before exposure during a flicker cycle period in the light intensity detection pixel is completed. Therefore, since a pixel signal of light intensity detection pixels cannot be generated for each frame of the imaging picture, it becomes impossible to calculate a flicker correction gain for each imaging picture. Thus, in the description of the second operation of the imaging apparatus, operation by which flicker correction can be performed even where the frame frequency of an imaging picture is higher than the flicker frequency is described.

FIGS. 7A, 7B, 7C, 7D, 7E, 7F, 7G, and 7H are views illustrating the second operation. In the second operation, in the imaging section 21, it is possible to set exposure time in a unit of a pixel. Further, in the imaging plane of the imaging section 21, imaging pixels and two kinds of light intensity detection pixels are provided alternately in the horizontal direction as depicted in FIG. 7A. It is to be noted that the two kinds of light intensity detection pixels are first light intensity detection pixels and second light intensity detection pixels.

FIG. 7B depicts an intensity change of illumination light. Further, FIG. 7C indicates exposure periods of imaging pixels on a line Lm; FIG. 7D indicates exposure periods of first light intensity detection pixels on the line Lm; and FIG. 7E indicates exposure periods of second light intensity detection pixels on a line Lm. Further, FIG. 7F indicates exposure periods of imaging pixels on a line Lm+1; FIG. 7G indicates exposure periods of light intensity detection pixels on the line Lm+1; and (h) of FIG. 7H indicates exposure periods of second light intensity detection pixels on the line Lm+1.

The control section 45 sets the pixels of the imaging section 21 as imaging pixels and light intensity detection pixels as depicted in FIG. 7A. Further, the control section 45 controls the imaging section 21 to operate setting the exposure period of the imaging pixels to a period according to the shutter speed and setting the exposure period of the light intensity detection pixels as one cycle period of a flicker frequency designated by the user. Further, the control section 45 synchronizes the exposure starting timing of an exposure period of an imaging pixel and the stating timing of an exposure period of a first light intensity detection pixel with each other. Further, the control section 45 synchronizes the exposure starting timing of an exposure period for a next frame of the imaging pixel and the starting timing of an exposure period of a second light intensity detection pixel with each other. Furthermore, the control section 45 synchronizes the exposure starting timing of an exposure period of a next frame of the imaging pixel and the starting timing of an exposure period of the first light intensity detection pixel with each other. Thereafter, the control section 45 similarly changes over the exposure periods for the first light intensity detection pixels and the exposure periods for the second light intensity detection pixels for each frame of the imaging picture.

FIGS. 7A, 7B, 7C, 7D, 7E, 7F, 7G, and 7H depict a case in which the shutter speed=1/400 second and the flicker frequency=100 Hz (1/100 second). Further, the frame frequency of the imaging picture is set to a frequency higher than the flicker frequency, for example, to 133 Hz.

Figure 8:
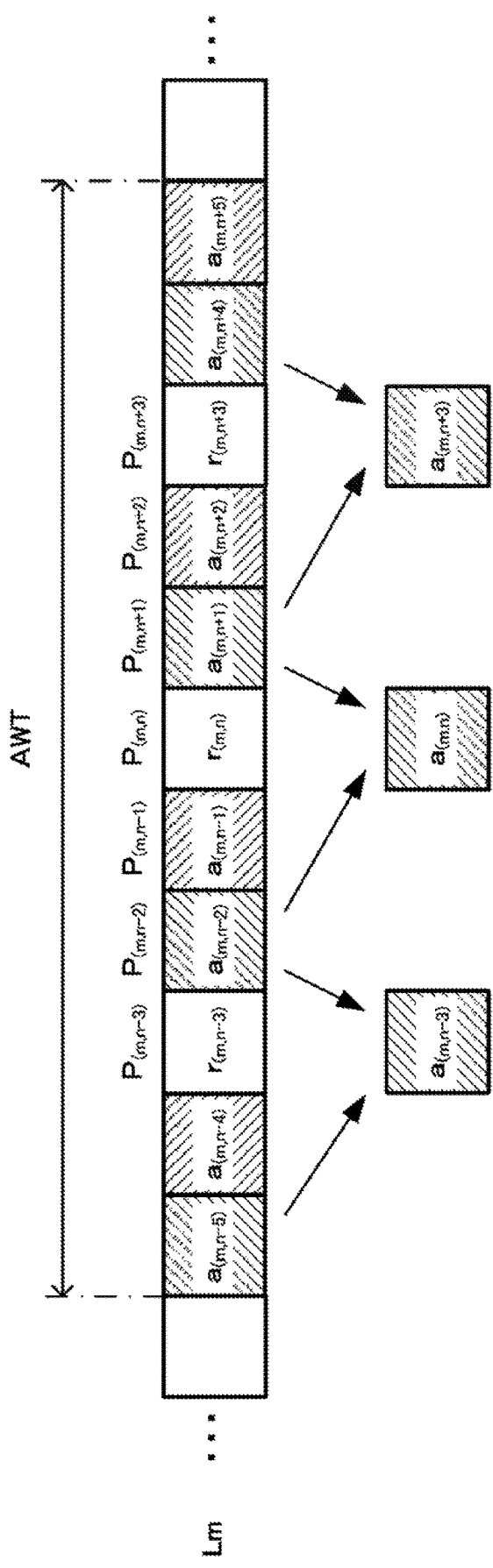
FIG. 8 is a view exemplifying a predetermined pixel range based on an imaging pixel of a flicker correction target.

The image signal processing section 30 performs flicker correction using a pixel signal generated by the imaging operation depicted in FIGS. 7A, 7B, 7C, 7D, 7E, 7F, 7G, and 7H performed by the imaging section 21. FIG. 8 is a view exemplifying a predetermined pixel range based on an imaging pixel of a flicker correction target. It is to be noted that, in FIG. 8, an imaging pixel that is the nth pixel P(m,n) on the line Lm is made a flicker correction target, and the pixels P(m,n−5) to P(m,n+5) are determined as a predetermined pixel range AWT. Further, the pixel values of the pixels P(m,n−3), P(m,n) and P(m,n+3) that are imaging pixels are made r(m,n−3), r(m,n) and r(m,n+3), respectively. Meanwhile, the pixel values of the pixels P(m,n−5), P(m,n−2), P(m,n+1) and P(m,n+4) that are first light intensity detection pixels are made a(m,n−5), a(m,n−2), a(m,n+1) and a(m,n+4), respectively. Further, the pixel values of the pixels P(m,n−4), P(m,n−1), P(m,n+2) and P(m,n+5) that are second light intensity detection pixels are made a(m,n−4), a(m,n−1), a(m,n+2) and a(m,n+5), respectively.

The correction gain calculation section 32 of the image signal processing section 30 calculates a flicker correction gain in accordance with an expression (9).

Flicker correction gain=(pixel value $WTa$ of first or second light intensity detection pixel group)/ pixel value $WTr$ of imaging pixel group) (9)

As the pixel value WTr of the imaging pixel group, an average pixel value of the imaging pixels within the predetermined pixel range is used as indicated, for example, by an expression (10).

$$WTr=(r(m,n-3)+r(m,n)+r(m,n+3))/3 \quad (10)$$

For the pixel value WTa of the light intensity detection pixel group, linear interpolation is performed using pixel values of a light intensity detection pixel group, and pixel values of a light intensity detection pixel group having a spatial phase same as that of an imaging pixel group in a predetermined pixel range are calculated, and then an average value of the calculated pixel values is used as the pixel value WTa. Here, in the case where the starting timing of an exposure period for an imaging pixel is same as the exposure starting timing of a first light intensity detection pixel, the correction gain calculation section 32 calculates a pixel value WTa using the pixel values of the first light intensity detection pixels. On the other hand, in the case where the starting timing of an exposure period for an imaging pixel is same as the exposure starting timing of a second light intensity detection pixel, the correction gain calculation section 32 calculates a pixel value WTa using the pixel values of the second light intensity detection pixels. It is to be noted that FIG. 8 depicts the predetermined pixel range in a case in which the pixel value WTa is calculated using the pixel values of the first light intensity detection pixels.

The correction gain calculation section 32 calculates pixel values a(m,n−3), a(m,n) and a(m,n+3) of the pixels P(m,n−3), P(m,n) and P(m,n+3) in accordance with expressions (11) to (13), respectively. Further, the correction gain calculation section 32 performs an arithmetic operation indicated by an expression (14) to calculate a pixel value WTa of a light intensity detection pixel group having a spatial phase same as that of the imaging pixel group.

$$a(m,n-3)=0.333 \times a(m,n-5)+0.667 \times a(m,n-2) \quad (11)$$

$$a(m,n)=0.333 \times a(m,n-2)+0.667 \times a(m,n+1) \quad (12)$$

$$a(m,n+3)=0.333 \times a(m,n+1)+0.667 \times a(m,n+4) \quad (13)$$

$$WTa=(a(m,n-3)+a(m,n)+a(m,n+3))/3 \quad (14)$$

The correction gain calculation section 32 outputs a calculated flicker correction gain, namely, a flicker correction gain HG(m,n) indicated by an expression (15) to the flicker correction section 33.

$$HG(m, n) = \quad (15)$$
$$(WTa/WTr) = (0.333 \times a(m, n-5) + a(m, n-2) + a(m, n+1) +$$
$$0.667 \times a(m, n+4))/(r(m, n-3) + r(m, n) + r(m, n+3))$$

The flicker correction section 33 performs gain adjustment for the imaging pixel of the pixel P(m,n) that is the flicker correction target using the flicker correction gain HG(m,n) calculated by the correction gain calculation section 32. In particular, the flicker correction section 33 performs an arithmetic operation of the expression (8) given hereinabove to calculate a pixel value rc(m,n) after correction of the imaging pixel of the flicker correction target.

The image signal processing section 30 generates an imaging signal on which the influence of the flicker is reduced by performing the processes described above for each imaging pixel. It is to be note that, as the second operation of the imaging apparatus, processes similar to those of the flow chart depicted in FIG. 4 are performed, and at step ST1, as described above, the imaging apparatus sets exposure periods for the imaging pixels and the light intensity detection pixels. Further, in the second operation, the exposure starting timings for a first light intensity detection pixel and a second light intensity detection pixel are set in such a manner as depicted in FIGS. 7A, 7B, 7C, 7D, 7E, 7F, 7G, and 7H, and the processing advances to step ST2. Further, at step ST3, it is sufficient if a flicker correction gain is calculated using the pixel signal of the first light intensity detection pixel or the second light intensity detection pixel for which exposure is started at a timing same as the exposure starting timing of the imaging pixel of the flicker correction target.

In this manner, the control section of the imaging apparatus provides imaging pixels and a plurality of kinds of light intensity detection pixels within an imaging screen image and sets an exposure period for an imaging pixel to a period according to a shutter speed and then sets exposure periods for a plurality of light intensity detection pixels to a flicker cycle period. Furthermore, the correction gain calculation section calculates a flicker correction gain using imaging pixels within a predetermined pixel range based on an imaging pixel of a flicker correction target and a light intensity detection pixel having an exposure starting timing same as that of the imaging pixel of the flicker correction target. Further, the flicker correction section performs gain adjustment of the imaging pixel of the flicker correction target with the calculated flicker correction gain. Accordingly, even in the case where the frame frequency of the imaging picture is a frequency higher than the flicker frequency, an imaging picture on which the influence of fluctuation of the intensity of illumination light is reduced irrespective of the positional relationship between the illumination apparatus and the imaging object is obtained.

<1-4. Third Operation of Imaging Apparatus>

In the following, a case in which the third operation facilitates configuration and operation of the imaging section is described. Since, in the first operation and the second operation described above, imaging pixels and light intensity detection pixels are lined up in the horizontal direction, a configuration for making control of the exposure period in a unit of a pixel possible is required, and the configuration of the imaging section 21 is complicated. Therefore, the third operation described below is directed to a case in which imaging pixels and light intensity detection pixels are provided in the vertical direction such that control of the exposure period can be performed in a unit of a line to make configuration and operation control of the imaging section easier than those in the first operation and the second operation. It is to be noted that the third operation described below relates to operation in which the frame frequency of an imaging picture is ready for a frequency higher than the flicker frequency.

Figure 9:
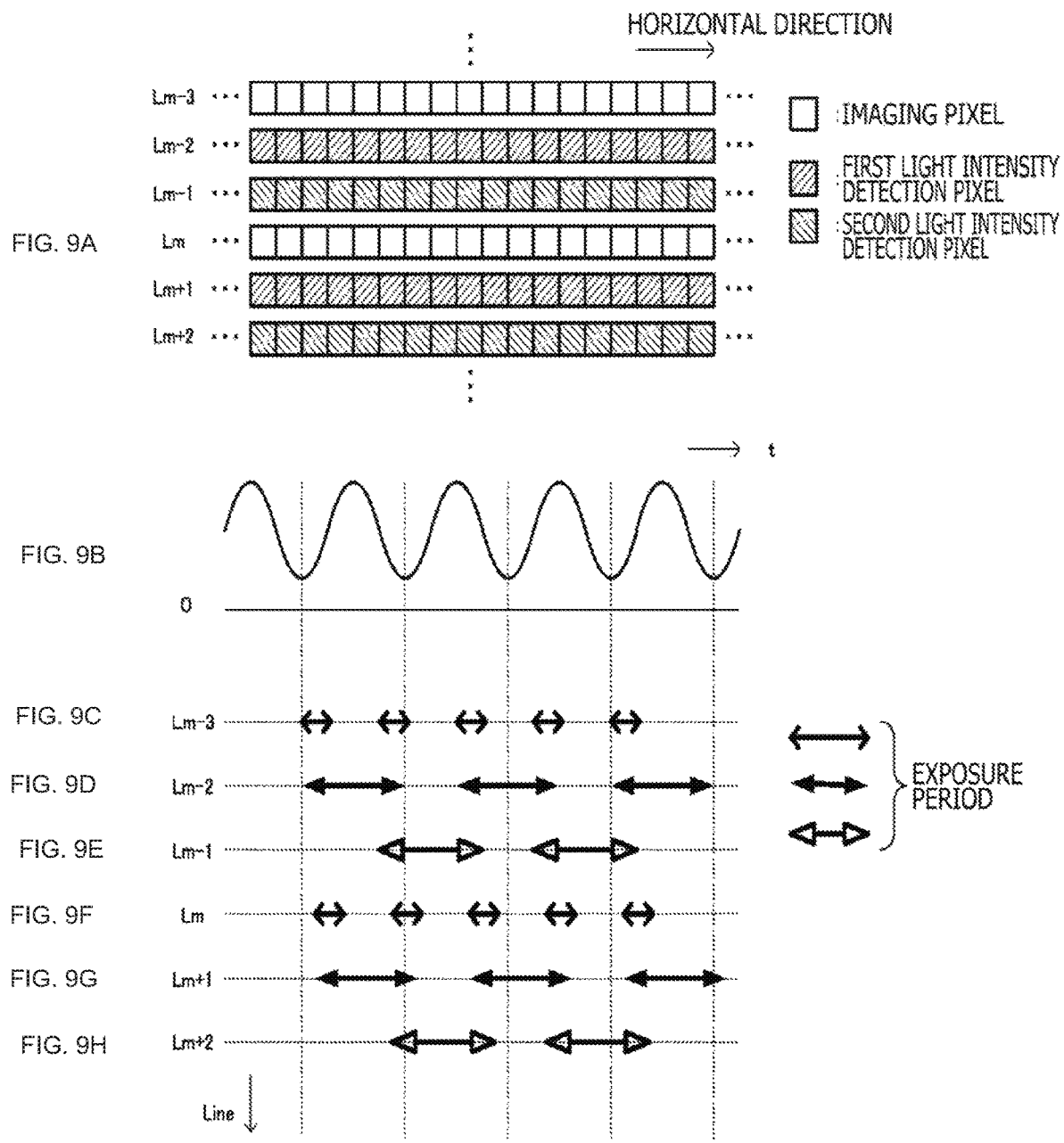
FIGS. 9A, 9B, 9C, 9D, 9E, 9F, 9G, and 9H are views illustrating third operation.

FIGS. 9A, 9B, 9C, 9D, 9E, 9F, 9G, and 9H are views illustrating the third operation. In the third operation, it is possible for the imaging section 21 to set exposure time in a unit of a line. In the imaging plane of the imaging section 21, lines of imaging pixels and lines of two kinds of light intensity detection pixels are provided alternately in the vertical direction as depicted in FIG. 9A. It is to be noted that the light intensity detection pixels of one line are referred to as first light intensity detection pixels, and the light intensity detection pixels of the other line are referred to as second light intensity detection pixels.

FIG. 9B indicates an intensity change of illumination light. Meanwhile, FIG. 9C depicts exposure periods of imaging pixels on a line Lm−3; FIG. 9D depicts exposure periods of first light intensity detection pixels on a line Lm−2; and FIG. 9E depicts exposure periods of second light intensity detection pixels on a line Lm−1. Further, FIG. 9F depicts exposure periods of imaging pixels of a line Lm; FIG. 9G depicts exposure periods of first light intensity detection pixels of a line Lm+1; and FIG. 9H depicts exposure periods of second light intensity detection pixels of a line Lm+2.

The control section 45 sets the pixels of the imaging section 21 to imaging pixels and light intensity detection pixels in a unit of a line as depicted in FIG. 9A. The control section 45 controls the imaging section 21 to operate setting the exposure period of the imaging pixels to a period according to the shutter speed and setting the exposure period of the light intensity detection pixels to a cycle period of a flicker frequency designated by the user. Further, the control section 45 synchronizes the exposure starting timing of an exposure period of an imaging pixel and the starting timing of an exposure period of a line of the first light intensity detection pixels with each other. Further, the control section 45 synchronizes the exposure starting timing of an exposure period of a next frame of an imaging pixel and the starting timing of an exposure period of a line of the second light intensity detection pixels with each other. Furthermore, the control section 45 synchronizes the exposure starting timing of an exposure period of a next frame of the imaging pixel and the starting timing of an exposure period of the line of the first light intensity detection pixels with each other. Thereafter, the control section 45 similarly changes over the exposure periods for a line of the first light intensity detection pixels and a line of the second light intensity detection pixels for each frame of the imaging picture.

FIGS. 9A, 9B, 9C, 9D, 9E, 9F, 9G, and 9H depict a case in which the shutter speed=1/400 second and the flicker frequency=100 Hz (1/100 second). Further, the frame frequency of the imaging picture is set to a frequency higher than the flicker frequency, for example, to 133 Hz.

Figure 10:
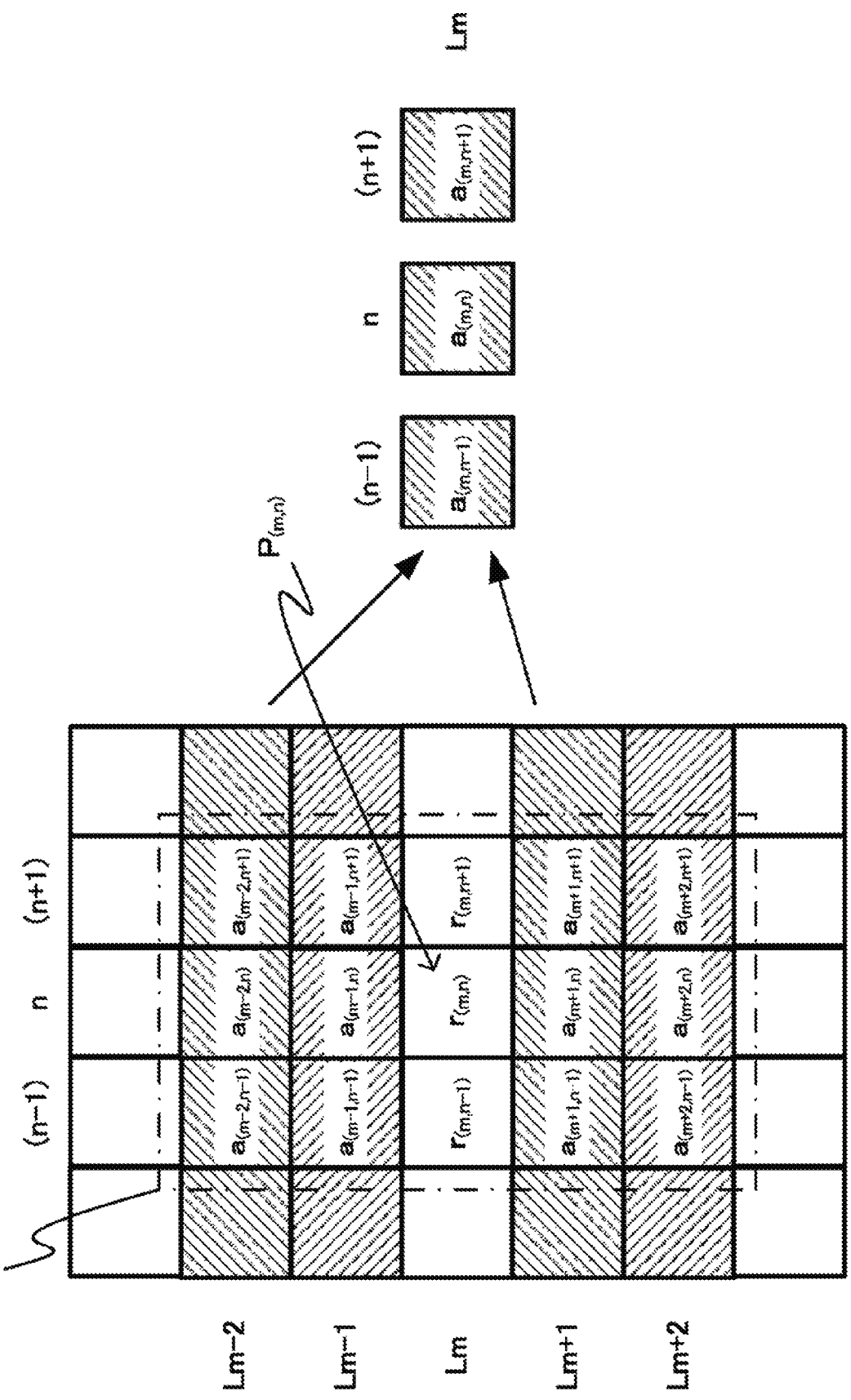
FIG. 10 is a view exemplifying a predetermined pixel range based on an imaging pixel of a flicker correction target.

The image signal processing section 30 performs flicker correction using a pixel signal generated by the imaging operation depicted in FIGS. 9A, 9B, 9C, 9D, 9E, 9F, 9G, and 9H performed by the imaging section 21. FIG. 10 is a view exemplifying a predetermined pixel range based on an imaging pixel of a flicker correction target. It is to be noted that, in FIG. 10, an imaging pixel that is the nth pixel P(m,n) on the line Lm is the flicker correction target, and a range of five lines in the vertical direction and three pixels in the horizontal direction centered at the pixel P(m,n) indicated by a dash-dot line is made the predetermined pixel range AWT. Further, the pixel value of the pixel P(m,n) of the flicker correction target is made r(m,n), and the pixel values of the imaging pixels on the opposite sides of the pixel P(m,n) are made r(m,n−1) and r(m,n+1). Further, the pixel values of the pixels on the line Lm−2 that are first light intensity detection pixels are made a(m−2,n−1), a(m−2,n) and a(m−2,n+1), and the pixel values on the line Lm−1, which are second light intensity detection pixels, are made a(m−1,n−1), a(m−1,n) and a(m−1,n+1), respectively. Furthermore, the pixel values of the pixels on the line Lm+1, which are first light intensity detection pixels are made a(m+1,n−1), a(m+1,n) and a(m+1,n+1), and the pixel values of the pixels on the line Lm+2, which are second light intensity detection pixels are made a(m+2,n−1), a(m+2,n) and a(m+2,n+1) respectively.

The correction gain calculation section 32 of the image signal processing section 30 calculates a flicker correction gain on the basis of an expression (16).

Flicker correction gain=(pixel value WTa of first or second light intensity detection pixel group/ pixel value WTr of imaging pixel group) (16)

For the pixel value WTr of the imaging pixel group, for example, an average pixel value of the imaging pixels within the predetermined pixel range as indicated by an expression (17) is used.

$WTr=(r(m,n-1)+r(m,n)+r(m,n+1))/3$ (17)

For the pixel value WTa of the light intensity detection pixel group, linear interpolation is performed using the pixel values of the light intensity detection pixel group and pixel values of the light intensity detection pixel group having a spatial phase same as that of the imaging pixel group in the predetermined pixel range, and an average value of the calculated pixel values is used as the pixel value WTa. Here, in the case where the starting timing of an exposure period of an imaging pixel is same as an exposure starting timing of a first light intensity detection pixel, the correction gain calculation section 32 calculates a pixel value WTa using the pixel value of the first light intensity detection pixel. Further, in the case where the starting timing of an exposure period of an imaging pixel is same as an exposure starting timing of a second light intensity detection pixel, the correction gain calculation section 32 calculates a pixel value WTa using the pixel value of the second light intensity detection pixel. It is to be note that FIG. 10 depicts the predetermined pixel range in a case in which the pixel value WTa is calculated using the pixel value of a first light intensity detection pixel.

The correction gain calculation section 32 calculates the pixel values a(m,n−1), a(m,n) and a(m,n+1) of light intensity detection pixels having a spatial phase same as that of the imaging pixel in accordance with expressions (18) to (20). Further, the correction gain calculation section 32 performs an arithmetic operation indicated by an expression (21) to calculate a pixel value WTa of the light intensity detection pixel group having a spatial phase same as that the imaging pixel group.

$a(m,n-1)=0.333\times a(m-2,n-1)+0.667\times a(m+1,n-1)$ (18)

$a(m,n)=0.333\times a(m-2,n)+0.667\times a(m+1,n)$ (19)

$a(m,n+1)=0.333\times a(m-2,n+1)+0.667\times a(m+1,n+1)$ (20)

$WTa=(a(m,n-1)+a(m,n)+a(m,n+1))/3$ (21)

The correction gain calculation section 32 outputs the calculated flicker correction gain, namely, the flicker correction gain HG(m,n) indicated by an expression (22) to the flicker correction section 33.

$$HG(m, n) = (WTa / WTr) = \\ (0.333\times (a(m-2, n-1) + a(m-2, n) + a(m-2, n+1)) + \\ 0.667\times (a(m+1, n-1) + a(m+1, n) + a(m+1, n+1)))/ \\ (r(m, n-3) + r(m, n) + r(m, n+3))$$ (22)

It is to be noted that FIG. 10 depicts the predetermined pixel range in a case in which a flicker correction gain for an imaging pixel of a flicker correction target is calculated using pixel signals of an imaging pixel group and a light intensity detection pixel group within a predetermined pixel range having three pixels in the horizontal direction and five pixels in the vertical direction. However, the predetermined pixel range is not limited to the range depicted in FIG. 10. For example, a flicker correction gain may be calculated from a range of one pixel, five pixels or like in the horizontal direction. It is to be noted that, if the predetermined pixel range has one pixel in the horizontal direction, then in the case where noise or the like is superimposed on a pixel signal of an imaging pixel of a flicker correction target, there is a case in which the flicker correction gain does not become an approximate gain value. Therefore, by using pixel signals of a plurality of imaging pixels lined up in the horizontal direction, it becomes possible to reduce the influence of noise and so forth and stably calculate a flicker correction gain.

The flicker correction section 33 performs gain adjustment for the imaging pixel of the pixel P(m,n) that is a flicker correction target using the flicker correction gain HG(m,n) calculated by the correction gain calculation section 32. In particular, the flicker correction section 33 performs an arithmetic operation of the expression (8) given hereinabove to calculate a pixel value rc(m,n) after correction of the imaging pixel of the flicker correction target.

The image signal processing section 30 generates an image signal on which the influence of the flicker is reduced by performing the processes described above for each imaging pixel. It is to be noted that, in the third operation of the imaging apparatus, processes similar to those of the flow chart depicted in FIG. 4 are performed, and at step ST1, the imaging apparatus sets exposure periods for the imaging pixels and the light intensity detection pixels in a unit of a line as described above. Further, in the third operation, exposure starting timings for a first light intensity detection pixel and a second light intensity detection pixel are set in such a manner as depicted in FIGS. 9A, 9B, 9C, 9D, 9E, 9F, 9G, and 9H, and the processing advances to step ST2. Further, at step ST3, it is sufficient if the imaging apparatus calculates a flicker correction gain using pixel signals of a line of first light intensity detection pixels or a line of second light intensity detection pixels for which exposure is started at a timing same as that the exposure starting timing of the imaging pixel of the flicker correction target.

In this manner, the control section of the imaging apparatus provides imaging pixels and a plurality of kinds of light intensity detection pixels in a unit of a line in an imaging screen image, and sets an exposure period for the imaging pixels to a period according to a shutter speed and sets an exposure period for the plurality of kinds of light intensity detection pixels to the flicker cycle period. Further, the correction gain calculation section calculates a flicker correction gain using imaging pixels within a predetermined pixel range based on the imaging pixel of the flicker correction target and a light intensity detection pixel having an exposure starting timing same as that of the imaging pixel of the flicker correction target. Further, the flicker correction section performs gain adjustment of the imaging pixel of the flicker correction target with the calculated flicker correction gain. Accordingly, even in the case where the frame frequency of the imaging picture is a frequency higher than the flicker frequency, an imaging picture on which the influence of fluctuation of the intensity of illumination light is reduced irrespective of the positional relationship between the illumination apparatus and the imaging object is obtained with a simple configuration.

<1-5. Fourth Operation of Imaging Apparatus>

Incidentally, the first operation to the third operation exemplify a case in which the exposure starting timings of an imaging pixel and a light intensity detection pixel are made coincident with each other. Here, it is sufficient if the exposure periods for an imaging pixel and a light intensity detection pixel are an exposure period according to the shutter speed and an exposure period of the flicker cycle period, respectively, and the exposure periods are not limited to those in the case where the exposure starting timings are made coincident with each other. For example, the exposure ends or the middles of the exposure periods may be made coincident with each other. The fourth operation described below is directed to a case in which the timings of the middle of an exposure period according to a shutter speed and the middle of an exposure period that is the flicker cycle period are made coincident with each other. It is to be noted that the description is given assuming that the pixel arrangement of the imaging section is same as that in the case of the third operation depicted in FIGS. 9A, 9B, 9C, 9D, 9E, 9F, 9G, and 9H.

FIGS. 11A, 11B, 11C, 11D, 11E, 11F, 11G, and 11H are views illustrating the fourth operation. FIG. 11A indicates an intensity change of illumination light. Meanwhile, FIG. 11B depicts exposure periods of imaging pixels on a line Lm−3; FIG. 11C depicts exposure periods of first light intensity detection pixels on a line Lm−2; and FIG. 11D depicts exposure periods of second light intensity detection pixels on a line Lm−1. Further, FIG. 11E depicts exposure periods of imaging pixels of a line Lm; (f) of FIG. 11F depicts exposure periods of first light intensity detection pixels of a line Lm+1; and FIG. 11G depicts exposure periods of second light intensity detection pixels of a line Lm+2. It is to be noted that, in the case where the imaging section 21 uses an XY address method for reading out individual pixel signals designating the address of each pixel, the exposure timing is successively displaced for each line.

The control section 45 controls the imaging section 21 to operate setting the exposure period of the imaging pixels to a period according to the shutter speed and setting the exposure period of the light intensity detection pixels to a cycle period of a flicker frequency designated by the user. Further, the control section 45 controls the middle of an exposure period of an imaging pixel and the middle of an exposure period of a first light intensity detection pixel to a same timing. Further, the control section 45 controls the middle of an exposure period of a next frame of an imaging pixel and the middle of an exposure period of a second light intensity detection pixel to a same timing. Furthermore, the control section 45 controls the middle of an exposure period of a next frame of an imaging pixel and the middle of an exposure period of a first light intensity detection pixel to a same timing. Thereafter, the control section 45 similarly changes over the exposure periods for the first light intensity detection pixels and the second light intensity detection pixels for each frame of the imaging picture.

FIGS. 11A, 11B, 11C, 11D, 11E, 11F, 11G, and 11H depict a case in which the shutter speed=1/400 second and the flicker frequency=100 Hz (1/100 second). Further, the frame frequency of the imaging picture is set to a frequency higher than the flicker frequency, for example, to 133 Hz.

By making the timings of the middle of an exposure period according to a shutter speed and the middle of an exposure period that is the flicker cycle period coincident with each other in this manner, the displacement between exposure periods of an imaging pixel and a light intensity detection pixel can be reduced. Further, according to the fourth operation, similar working effects to those by the third operation can be achieved.

<1-6. Fifth Operation of Imaging Apparatus>

Now, in the fifth operation of the imaging apparatus, operation in the case where operation of the imaging section and calculation operation of a flicker correction gain are changed over in response to the frame frequency of an imaging picture. In the fifth operation, one or a plurality of pixel groups of light intensity detection pixels are provided on the basis of the frame cycle of an imaging picture and the period of the flicker such that a pixel signal during an exposure period that is a flicker cycle period is obtained from any one of the pixel groups of the light intensity detection pixels for each frame of the imaging picture. It is to be noted that, in order to facilitate the description, it is assumed that the frame frequency FV of an imaging picture does not exceed four times the flicker frequency FL. Further, light intensity detection pixels may be provided in any of the horizontal direction and the vertical direction.

FIG. 12 is a flow chart depicting the fifth operation. At step ST11, the imaging apparatus sets an exposure period and a frame frequency. The control section 45 of the imaging apparatus 10 sets the exposure period for an imaging pixel to an exposure period corresponding to the shutter speed. Further, the control section 45 sets the exposure period for a light intensity detection pixel to one cycle period of a flicker frequency set by the user or the like. Furthermore, the control section 45 sets the frame frequency FV for an imaging picture to a frequency corresponding to the frame rate set by the user or the like, and the processing advances to step ST12.

At step ST12, the imaging apparatus decides whether the frame frequency FV for an imaging picture exceeds the flicker frequency FL. The control section 45 compares the frame frequency FV and the flicker frequency FL with each other and advances the processing to step ST13 in the case where the frame frequency FV for an imaging picture does not exceed the flicker frequency FL. On the other hand, in the case where the frame frequency FV for an imaging picture exceeds the flicker frequency FL, the control section 45 advances the processing to step ST14.

Figure 13A:
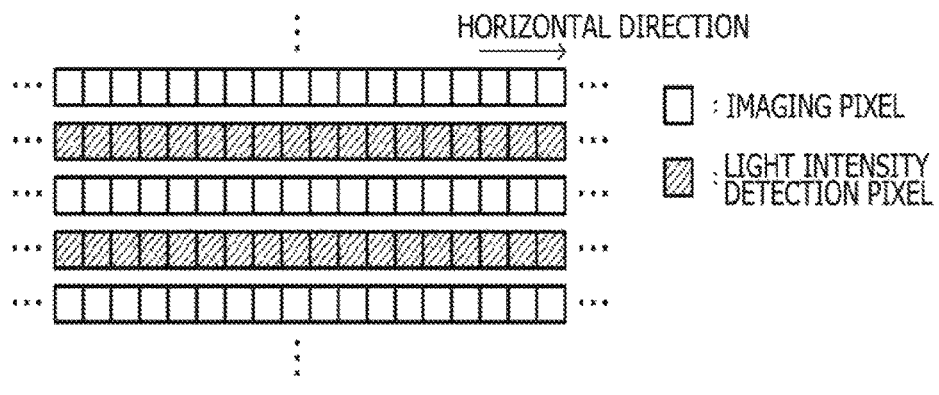
FIGS. 13A, 13B, and 13C are views exemplifying pixel arrangement.

At step ST13, the imaging apparatus performs flicker correction in a first correction mode. In the case where the frame frequency FV for an imaging picture does not exceed the flicker frequency FL, flicker correction is performed similarly as in the first operation described hereinabove. In particular, the imaging apparatus performs the processes at step ST2 to step ST8 in FIG. 4, and at step ST2, the control section 45 provides one kind of light intensity detection pixels as described hereinabove in connection with the first operation and controls the imaging section 21 to operate such that the imaging pixels generate a pixel signal during an exposure period according to the shutter speed and the light intensity detection pixels generate a pixel signal during an exposure period that is the flicker cycle period. Further, in the first correction mode, the image signal processing section 30 performs linear interpolation using pixel signals of the light intensity detection pixel group to generate a pixel signal of the light intensity detection pixel group having a spatial phase same as that of the imaging pixel group during a predetermined pixel range and calculates a flicker correction gain on the basis of the pixel signal of the imaging pixel group and the pixel signal of the light intensity detection pixel group having a spatial phase same as that of the imaging pixel group. Furthermore, the image signal processing section 30 corrects the pixel signal of the imaging pixel of the flicker correction target using the calculated flicker correction gain. It is to be noted that FIGS. 13A 13B, and 13C exemplifies pixel arrangement, and in the first correction mode, as depicted in FIG. 13A, lines of imaging pixels and lines of light intensity detection pixels may be provided in the vertical direction such that a flicker correction gain is calculated using pixel signals within a predetermined pixel range that includes predetermined lines in the vertical direction and a predetermined pixel number in the horizontal direction on the basis of an imaging pixel of a flicker correction target.

When the processing advances from step ST12 to step ST14, the imaging apparatus decides at step ST14 whether the frame frequency FV of the imaging picture exceeds twice the flicker frequency FL. In the case where the frame frequency FV of the imaging picture does not exceed twice the flicker frequency FL, the control section 45 advances the processing to step ST15, but in the case where the frame frequency FV of the imaging picture exceeds twice the flicker frequency FL, the control section 45 advances the processing to step ST16.

Figure 13B:
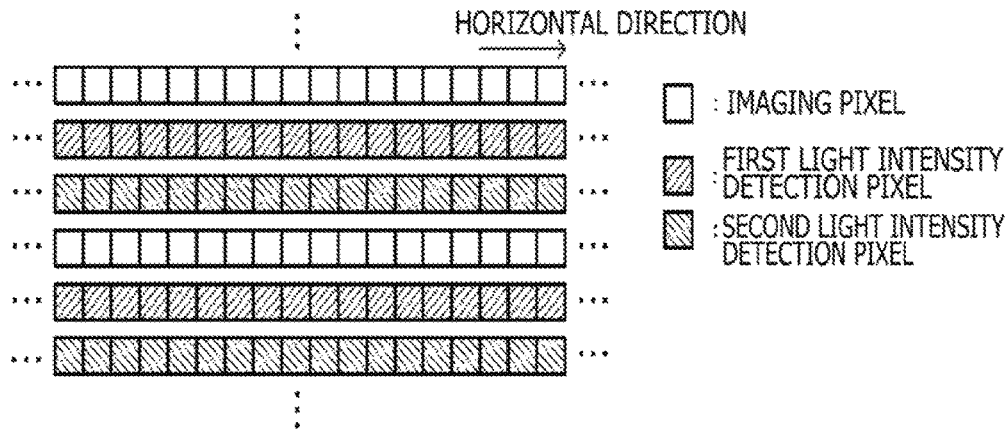

At step ST15, the imaging apparatus performs flicker correction in a second correction mode. In the case where the frame frequency FV of the imaging picture exceeds the flicker frequency FL but does not exceed twice the flicker frequency FL, the imaging apparatus performs flicker correction similarly as in the second operation described above. In particular, the imaging apparatus performs the processes at step ST2 to step ST8 of FIG. 4 and, at step ST2, the control section 45 provides two kinds of light intensity detection pixels as described hereinabove in connection with the second operation and controls the imaging section 21 such that the imaging pixels generate a pixel signal during an exposure period according to the shutter speed and the light intensity detection pixels generate a pixel signal during an exposure period that is the flicker cycle period. In the second correction mode, the image signal processing section 30 performs linear interpolation using pixel signals of the light intensity detection pixel group, by which the pixel signals during an exposure period that is the flicker cycle period are obtained, to generate pixel signals of the light intensity detection pixel group having a spatial phase same as that of the imaging pixel group within a predetermined pixel range and calculates a flicker correction gain on the basis of the pixel signals of the imaging pixel group and the pixel signals of the light intensity detection pixel group having a spatial phase same as that of the imaging pixel group. Furthermore, the image signal processing section 30 corrects the pixel signal of the imaging pixel of the flicker correction target using the calculated flicker correction gain. It is to be noted that, in the correction operation in the second correction mode, as depicted in FIG. 13B, lines of imaging pixels and lines of two kinds of light intensity detection pixels may be provided in the vertical direction such that a flicker correction gain is calculated using pixel signals within a predetermined pixel range that includes predetermined lines in the vertical direction and a predetermined pixel number in the horizontal direction on the basis of the imaging pixel of the flicker correction target.

Figure 13C:
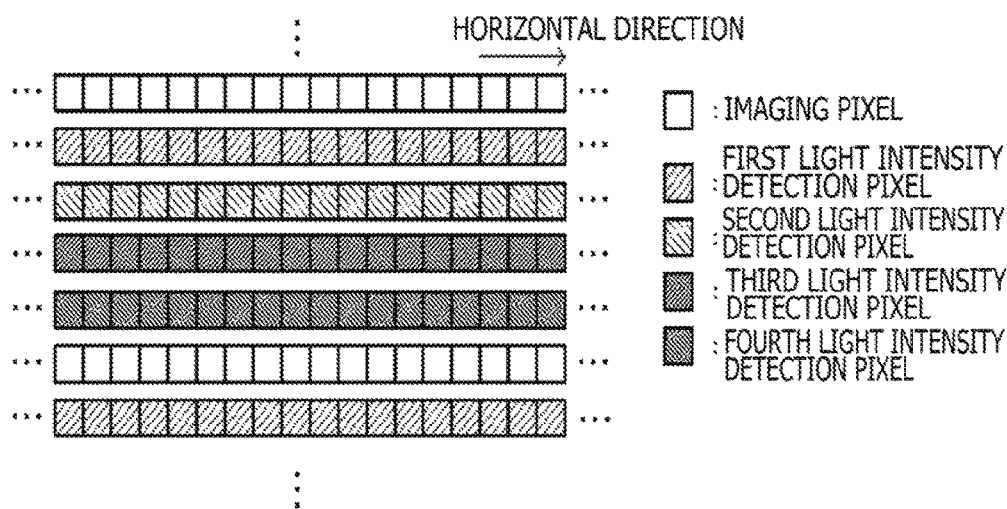

At step ST16, the imaging apparatus performs flicker correction in the third correction mode. In the case where the frame frequency FV of the imaging picture exceeds twice the flicker frequency FL, four kinds of light intensity detection pixels are provided to perform flicker correction. In particular, the processes at step ST2 to step ST8 of FIG. 4 are performed, and at step ST2, the control section 45 provides four kinds of light intensity detection pixels and controls the imaging section 21 such that the imaging pixels generate a pixel signal during an exposure period according to the shutter speed and the light intensity detection pixels generate a pixel signal during an exposure period that is the flicker cycle period. In the third correction mode, the image signal processing section 30 performs linear interpolation using pixel signals of the light intensity detection pixel group, from which the pixel signals during an exposure period that is the flicker cycle period are obtained, to generate pixel signals of the light intensity detection pixel group having a spatial phase same as that of the imaging pixel group within a predetermined pixel range and calculates a flicker correction gain on the basis of the pixel signals of the imaging pixel group and the pixel signals of the light intensity detection pixel group having a spatial phase same as that of the imaging pixel group. Furthermore, the image signal processing section 30 corrects the pixel signal of the imaging pixel of the flicker correction target using the calculated flicker correction gain. It is to be noted that, in the correction operation in the third correction mode, as depicted in FIG. 13C, lines of imaging pixels and four kinds of light intensity detection pixels may be provided in a unit of a line in the vertical direction such that a flicker correction gain is calculated using pixel signals within a predetermined pixel range that includes predetermined lines in the vertical direction and a predetermined pixel number in the horizontal direction on the basis of the imaging pixel of the flicker correction target.

Further, though not depicted in the flow chart, in the case where the frame frequency FV of an imaging picture exceeds four times the flicker frequency FL but does not exceed eight times the flicker frequency FL, it is sufficient if eight kinds of light intensity detection pixels are provided. On the other hand, in the case where the frame frequency FV of an imaging picture exceeds eight times the flicker frequency FL but does not exceed 16 times the flicker frequency FL, it is sufficient if 16 kinds of light intensity detection pixels are provided. In particular, light intensity detection pixels are provided in response to a relationship between the frame frequency of the imaging picture and the flicker frequency such that a pixel signal for which an exposure period is the flicker cycle period for one frame of the imaging picture is obtained.

In this manner, if the control section of the imaging apparatus changes over operation of the imaging section and calculation operation for a flicker correction gain in response to the frame frequency of the imaging picture and the flicker frequency, then it becomes possible to automatically perform flicker correction in accordance with various frame frequencies.

2. Second Embodiment

Now, in the description of the second embodiment, flicker correction of a color imaging picture is described.

<2-1. Configuration of Imaging Apparatus>

Figure 14:
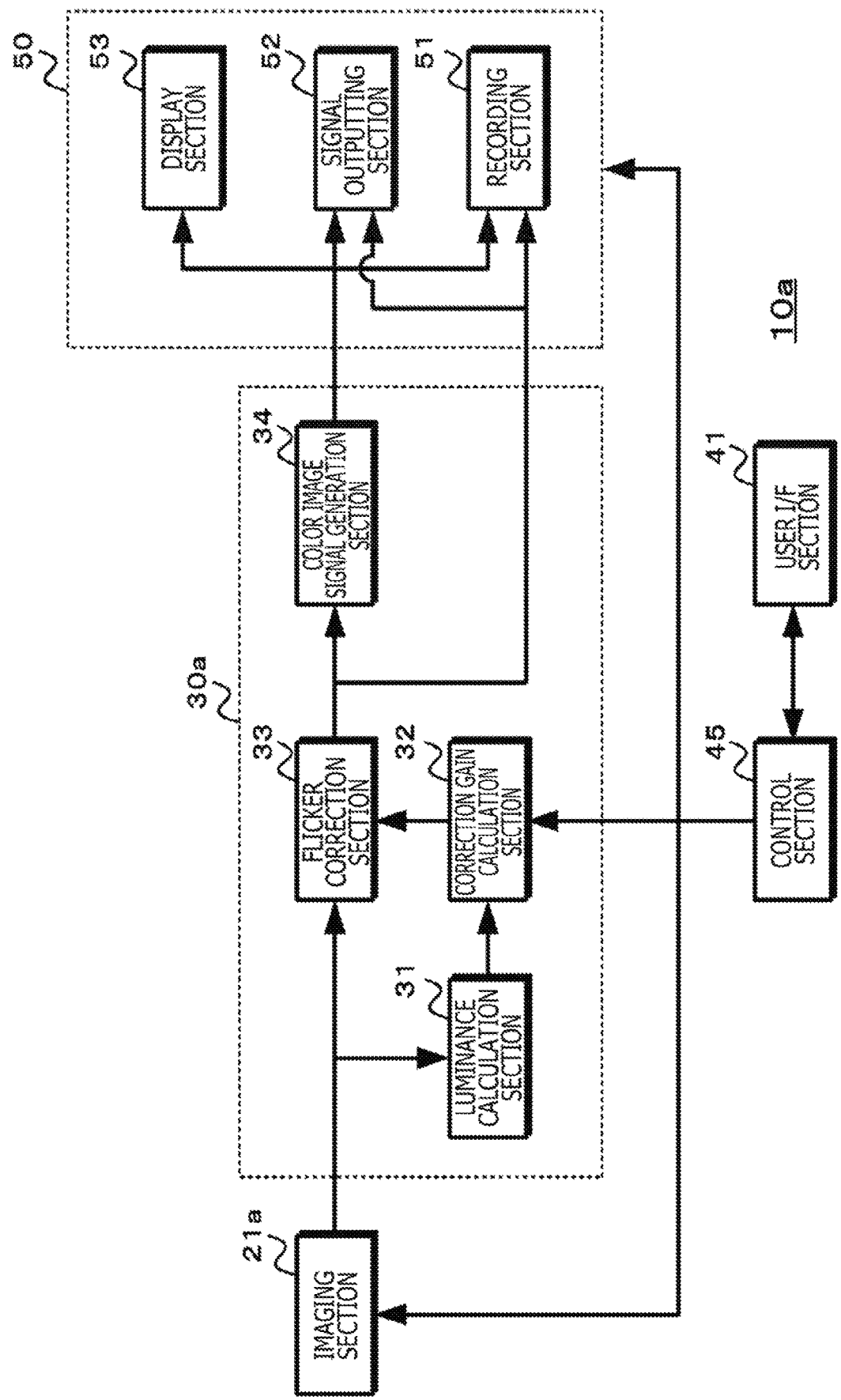
FIG. 14 is a view exemplifying a configuration of an imaging apparatus in a second embodiment.

FIG. 14 exemplifies a configuration of the imaging apparatus according to the second embodiment of the present technology. It is to be noted that elements corresponding to those of the first embodiment depicted in FIG. 1 are denoted by like reference signs.

The imaging apparatus 10*a* includes an imaging section 21*a*, an image signal processing section 30*a*, a user interface (I/F) section 41 and a control section 45. The imaging apparatus 10*a* may further include, as a peripheral section 50, a recording section 51, a signal outputting section 52, a display section 53 and so forth.

The imaging section 21*a* is configured using color component pixels such that a color imaging picture can be acquired. For example, the imaging section 21*a* includes color component pixels of red, blue and green provided in a Bayer array, and a pixel block of color component pixels is used as a pixel unit of an imaging pixel or a light intensity detection pixel as hereinafter described. The imaging pixel is a pixel for acquiring an imaging picture and generates a pixel signal according to an exposure light amount within an exposure period where the exposure period is a period according to a shutter speed. The light intensity detection pixel is a pixel for detecting an intensity of illumination light and generates a pixel signal according to an exposure light amount within an exposure period where the exposure period is a flicker cycle period. The imaging section 21*a* outputs pixel signals generated by an imaging pixel and a light intensity pixel to the image signal processing section 30*a*.

The image signal processing section 30*a* includes a luminance calculation section 31, a correction gain calculation section 32 and a flicker correction section 33. The image signal processing section 30*a* may further include a color image signal generation section 34.

The luminance calculation section 31 calculates luminance values of an imaging pixel and a light intensity detection pixel from the pixel signals generated by the imaging section 21*a*. The luminance calculation section 31 determines, using a luminance value as a pixel value of an imaging pixel or a light intensity detection pixel, a pixel block of color component pixels used for calculation of a luminance value as a pixel-corresponding block of an imaging pixel or a light intensity detection pixel. In particular, the luminance calculation section 31 calculates a luminance value of an imaging pixel or a light intensity detection pixel using color component pixels of a pixel-corresponding block.

The correction gain calculation section 32 uses the luminance value calculated by the luminance calculation section 31 to calculate a flicker correction gain for the color component pixels used for calculation of a luminance value of an imaging pixel. In particular, the correction gain calculation section 32 uses pixel signals of imaging pixels and pixel signals of light intensity detection pixels within a predetermined pixel range based on an imaging pixel of a flicker correction target to generate a pixel signal of a light intensity detection pixel having a spatial phase same as that of the imaging pixel. Further, the correction gain calculation section 32 determines a signal level ratio between the pixel signal of the light intensity detection pixel having a spatial phase same as that of the imaging pixel and the pixel signal of the imaging pixel as a flicker correction gain. The correction gain calculation section 32 outputs the calculated flicker correction gain to the flicker correction section 33.

The flicker correction section 33 performs gain adjustment for the color component pixels in the pixel block corresponding to the imaging pixel of the flicker correction target with the flicker correction gain calculated by the correction gain calculation section 32 to generate an image signal for which correction of the flicker has been performed. The flicker correction section 33 outputs the pixel signal for which the correction of the flicker has been performed to the color image signal generation section 34, recording section 51 and signal outputting section 52.

The color image signal generation section 34 performs a demosaic process and so forth using the pixel signal for which the correction of the flicker has been performed to generate an image signal of a color imaging picture and outputs the image signal to the recording section 51, signal outputting section 52, display section 53 and so forth.

The user interface section 41 is configured using operation switches, operation buttons and so forth. The user interface section 41 generates an operation signal according to a user operation and outputs the operation signal to the control section 45. The user interface section 41 allows a user designation operation of a flicker frequency (or a commercial power supply frequency for illumination).

The control section 45 is configured using a microcomputer in which storage sections such as, for example, a ROM that stores a control program, a flash memory for temporarily storing data and so forth are built. The control section 45 executes the control program to control operation of the components on the basis of an operation signal from the user interface section 41 such that operation desired by the user is performed by the imaging apparatus 10*a*. Further, the control section 45 controls operation of the imaging section 21*a*, image signal processing section 30*a* and peripheral section 50 such that an image signal for which flicker correction corresponding to a flicker frequency designated by a user operation has been performed can be generated. Further, the control section 45 sets each pixel of the imaging section 21*a* to an imaging pixel or a light intensity detection pixel. Furthermore, the control section 45 sets exposure timings and exposure periods for imaging pixels and a light intensity detection pixel individually.

The recording section 51 records a pixel signal after flicker correction or an image signal of a color imaging picture generated by the image signal processing section 30*a* on a recording medium. Further, the recording section 51 reads out an image signal recorded on the recording medium and outputs the image signal to the display section 53. Furthermore, the recording section 51 may perform an encoding process for the image signal after flicker correction to generate an encoded signal and record the encoded signal on the recording medium and may output an image signal obtained by a decoding process of an encoded signal read out from the recording medium to the display section 53.

The signal outputting section 52 outputs a pixel signal after flicker correction or an image signal of a color imaging picture generated by the image signal processing section 30*a* as a signal of a predetermined format to an external apparatus. Further, the signal outputting section 52 may perform an encoding process for an image signal of a color imaging picture and output an encoded signal to an external apparatus.

The display section 53 displays a color imaging picture on the basis of an image signal of a color imaging picture generated by the image signal processing section 30*a* or an image signal read out from the recording section 51. Further, the display section 53 performs display of a menu screen image or the like on the basis of a control signal from the control section 45.

<2-2. Operation of Imaging Apparatus>

Figure 15A:
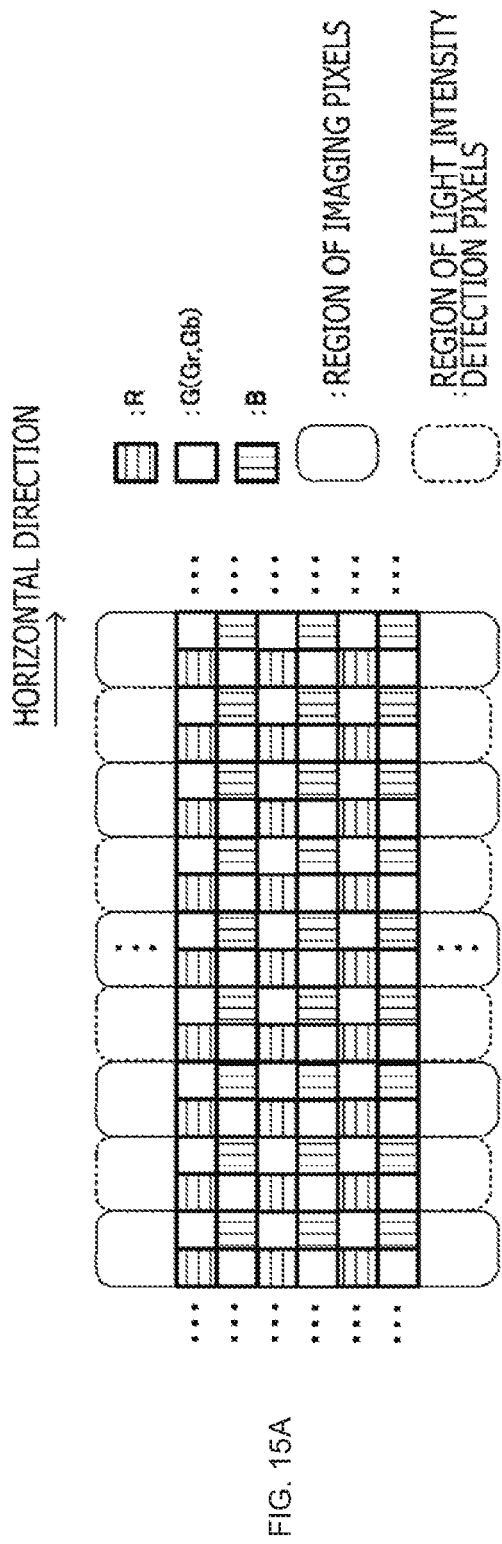
FIGS. 15A and 15B are views exemplifying arrangement of imaging pixels and light intensity detection pixels in the case where the frame frequency of an imaging picture is lower than a flicker frequency.
Figure 15B:
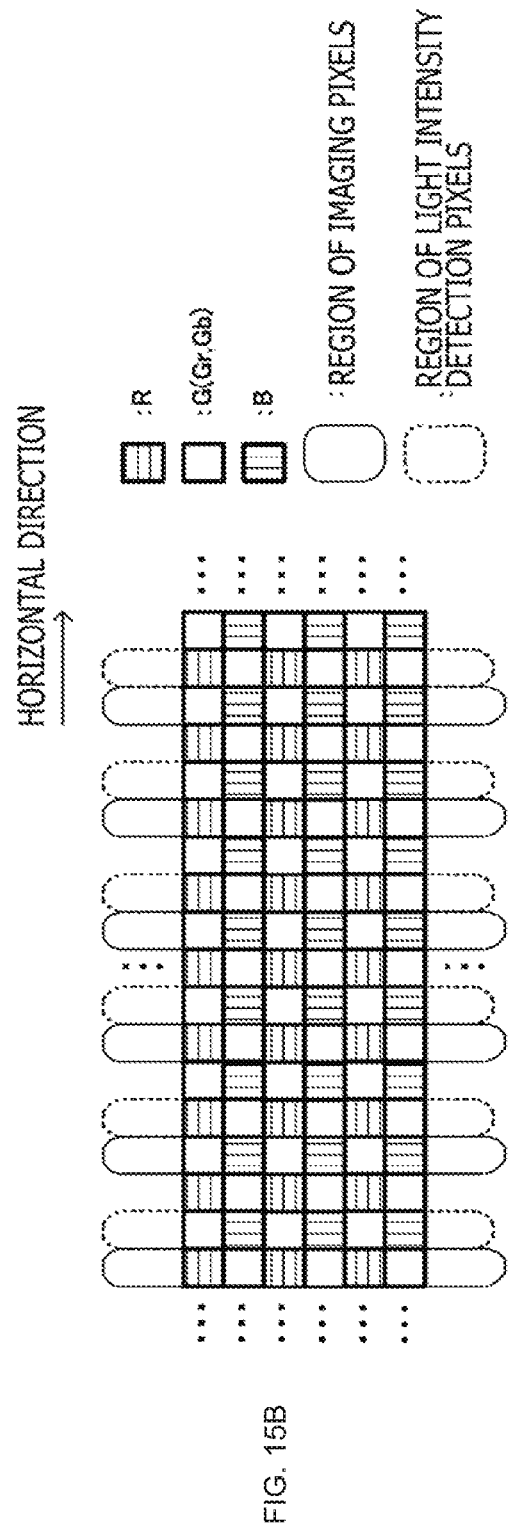

Now, operation of the imaging apparatus is described. FIGS. 15A and 15B exemplifies arrangement of imaging pixels and light intensity detection pixels in the case where the frame frequency of an imaging picture is lower than the flicker frequency. In an imaging plane of the imaging section 21*a*, color component pixels are provided in a Bayer array. In particular, one or two pixel blocks are formed from 2×2 pixels, and the pixels in one block are configured as a red component pixel R, a blue component pixel B and two green component pixels, Gr and Gb, such that the red component pixel R and the blue component pixel B are arranged in an oblique direction. Further, the control section 45 determines a pixel block of 2×2 pixels including the color component pixels as a pixel unit for the imaging pixels or the light intensity detection pixels. Further, the control section 45 may use a pixel block of four pixels, which includes the color component pixels by using two pixel blocks of 1 pixel×2 pixels (or 2 pixels×1 pixel), as a pixel unit for imaging pixels or light intensity detection pixels.

In the case where the frame frequency of an imaging picture is lower than the flicker frequency, the control section 45 provides imaging pixels and light intensity detection pixels alternately in the horizontal direction similarly, for example, as in the first operation of the first embodiment. In this case, the imaging section 21*a* allows setting of exposure time in a unit of a pixel.

The control section 45 provides imaging pixels and light intensity detection pixels on the imaging section 21*a* such that a pixel unit is formed from a pixel block including the color component pixels. FIG. 15A exemplifies a case in which, as a pixel block in which 2×2 pixels correspond to imaging pixels or light intensity detection pixels, the control section 45 provides imaging pixels and light intensity detection pixels alternately in the horizontal direction. FIG. 15B exemplifies another case in which, as a pixel block in which 1 pixel (horizontal direction)×2 pixels (vertical direction) correspond to imaging pixels or light intensity detection pixels, an imaging pixel is provided for each 3 pixels in the horizontal direction and a light intensity detection pixel is provided adjacent each imaging pixel in the horizontal direction to provide imaging pixels and light intensity detection pixels alternately in the horizontal direction.

Figure 16A:
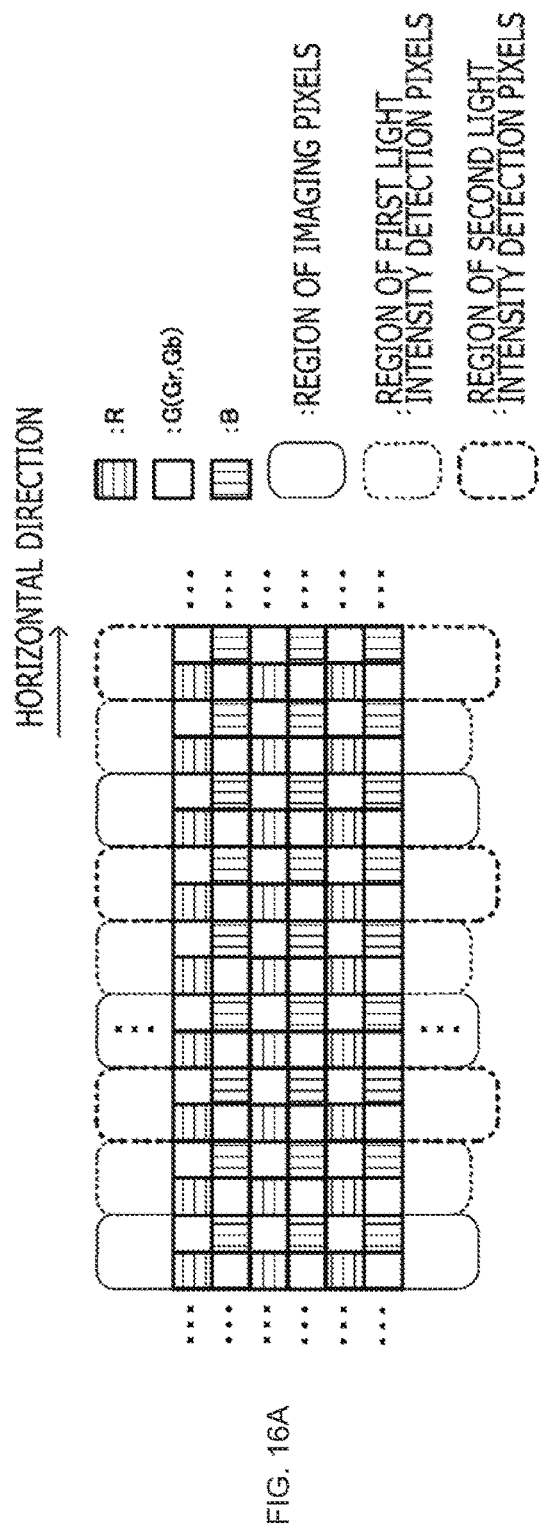
FIGS. 16A and 16B are views exemplifying arrangement of imaging pixels and light intensity detection pixels in the case where the frame frequency of an imaging picture is higher than a flicker frequency but is lower than twice the flicker frequency.
Figure 16B:
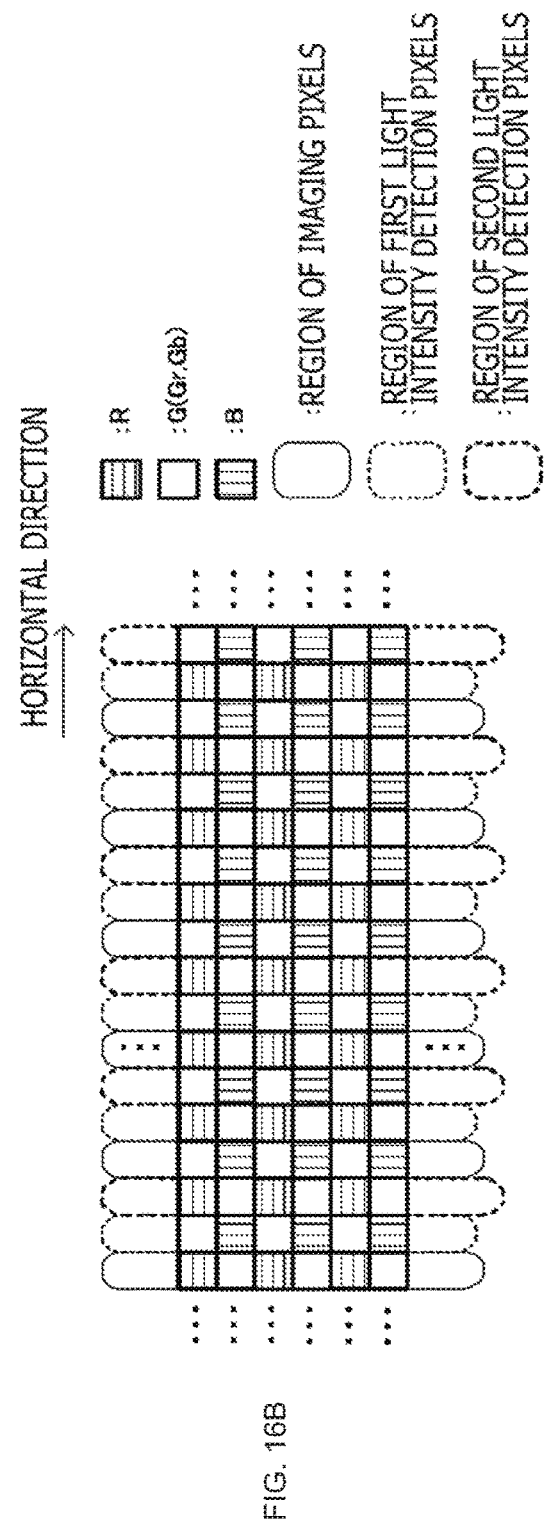

FIGS. 16A and 16B exemplifies arrangement of imaging pixels and light intensity detection pixels in the case where the frame frequency of an imaging picture is higher than the flicker frequency but is lower than twice the flicker frequency. In the imaging plane of the imaging section 21*a*, color component pixels are provided in a Bayer array. In particular, one or two pixel blocks are formed from 2×2 pixels, and the pixels in one pixel block are configured as a red component pixel R, a blue component pixel B and two green component pixels, Gr and Gb, such that the red component pixel R and the blue component pixel B are arranged in an oblique direction.

In the case where the frame frequency of an imaging picture is higher than the flicker frequency but is lower than twice the flicker frequency, the control section 45 provides an imaging pixel and two light intensity detection pixels alternately in the horizontal direction similarly as in, for example, the second operation of the first embodiment.

The control section 45 provides imaging pixels and light intensity detection pixels forming a pixel unit from a pixel block including the color component pixels in the imaging section 21*a*. FIG. 16A exemplifies a case in which 2×2 pixels form a pixel block corresponding to imaging pixels or light intensity detection pixels and an imaging pixel and two light intensity detection pixels are provided alternately in the horizontal direction. FIG. 16B exemplifies another case in which 1 pixel (horizontal direction)×2 pixels (vertical direction) form a pixel block corresponding to imaging pixels or light intensity detection pixels and an imaging pixel is provided for each three pixels in the horizontal direction and two reference correction pixels are provided between adjacent imaging pixels such that an imaging pixel and two light intensity detection pixels are provided alternatively in the horizontal direction.

Figure 17A:
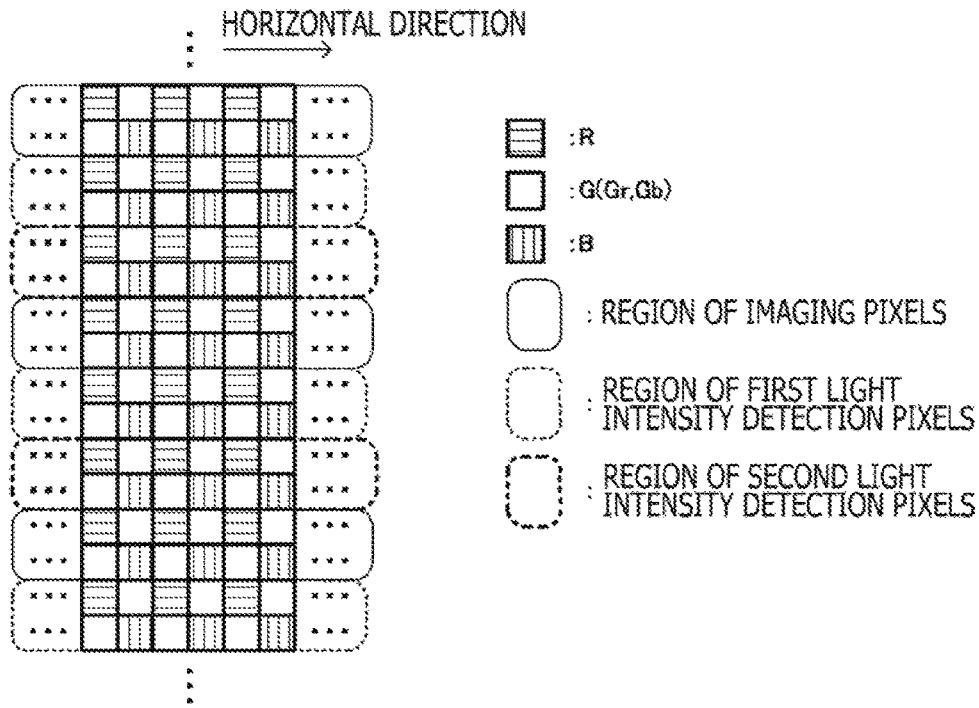
FIGS. 17A and 17B are views exemplifying different arrangement of imaging pixels and light intensity detection pixels in the case where the frame frequency of an imaging picture is higher than the flicker frequency but is lower than twice the flicker frequency.
Figure 17B:
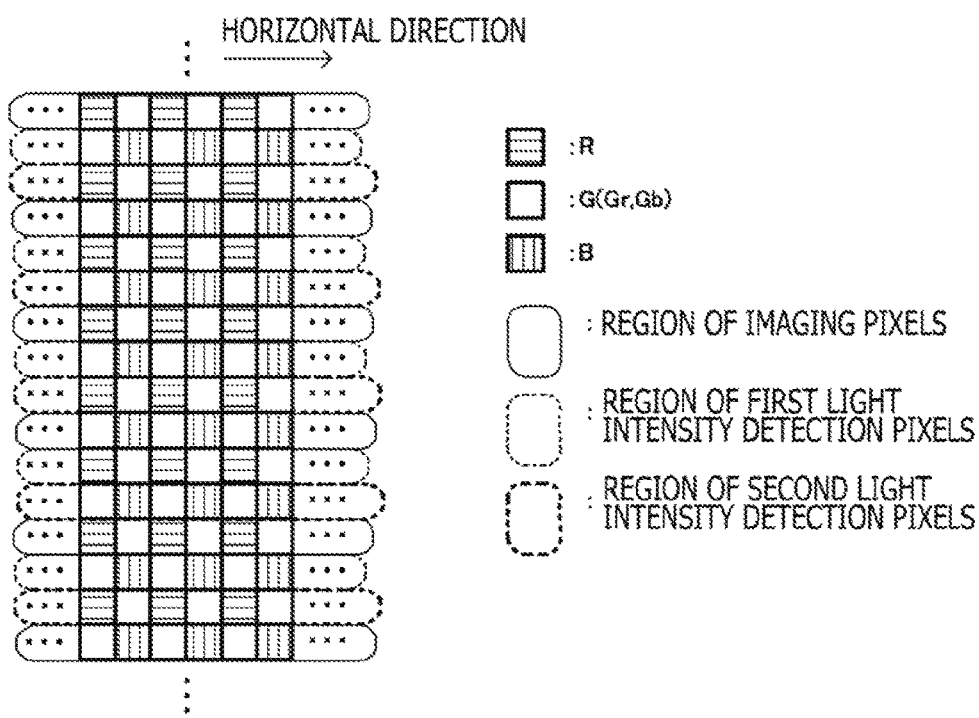

FIGS. 17A and 17B exemplifies different arrangement of imaging pixels and light intensity detection pixels in the case where the frame frequency of an imaging picture is higher than the flicker frequency but is lower than twice the flicker frequency. In the imaging plane of the imaging section 21*a*, color component pixels are provided in a Bayer array. In particular, one or two pixel blocks are formed from 2×2 pixels, and pixels in a block are configured from a red component pixel R, a blue component pixel B and two green component pixels, Gr and Gb, and the red component pixel R and the blue component pixel B are arranged in an oblique direction.

In the case where the frame frequency of the imaging picture is higher than the flicker frequency but is lower than twice the flicker frequency, the control section 45 provides an imaging pixel and two light intensity detection pixels alternately in the vertical direction similarly as in, for example, the third operation of the first embodiment.

The control section 45 provides, on the imaging section 21a, imaging pixels and light intensity detection pixels forming a pixel unit from a pixel block including the color component pixels. FIG. 17A exemplifies a case in which 2×2 pixels are imaging pixels or light intensity detection pixels and an imaging pixel and two light intensity detection pixels are provided alternately in the vertical direction. FIG. 17B exemplifies another case in which 2 pixels (horizontal direction)×1 pixel (vertical direction) are formed from imaging pixels or light intensity detection pixels and an imaging pixel is provided for each three pixels in the vertical direction while two reference correction pixels are provided between imaging pixels such that an imaging pixel and two light intensity detection pixels are provided alternately in the vertical direction.

Now, as calculation operation of a flicker correction gain of the second embodiment, calculation operation of a flicker correction gain in the case where, for example, a block of 2×2 pixels is formed as a pixel unit of imaging pixels or light intensity detection pixels is described with reference to FIGS. 18A and 18B.

FIGS. 18A and 18B are views illustrating calculation operation of a flicker correction gain of the second embodiment. The luminance calculation section 31 calculates a luminance value Ya(j−2,x) from a pixel value of a pixel block of 2×2 pixels on a line Lj−2 that are first light intensity detection pixels as depicted in FIG. 18A. Similarly, the luminance calculation section 31 calculates a luminance value Ya(j−1,x) from a pixel value of a pixel block of 2×2 pixels on a line Lj−1 that are second light intensity detection pixels. Further, the luminance calculation section 31 calculates a luminance value Yr(j,x) from a pixel value of a pixel block of 2×2 pixels on a line Lj that are imaging pixels. Similarly, the luminance calculation section 31 calculates a luminance value from a pixel value of a different pixel block of 2×2 pixels.

The correction gain calculation section 32 calculates a flicker correction gain for a block of a correction target using the luminance value calculated for each pixel block of 2×2 pixels by the luminance calculation section 31. FIG. 18B depicts the luminance values calculated by the luminance calculation section 31. The luminance calculation section 31 calculates a luminance value in a unit of a pixel block of 2×2 pixels. For example, for a luminance value Yr(j,k) of a pixel block corresponding to an imaging pixel of a correction target, luminance values of 3 pixels in the horizontal direction and 5 pixels in the vertical direction as depicted in FIG. 18B are calculated, and they indicate arrangement similar to that of the pixel values of FIG. 10 described hereinabove in connection with the third operation. Accordingly, the correction gain calculation section 32 calculates a flicker correction gain using luminance values similarly as in the third operation.

The flicker correction section 33 corrects a pixel signal of color component pixels of a pixel block for an imaging pixel of a correction target using the flicker correction gain calculated by the correction gain calculation section. For example, where, in a pixel block for an imaging pixel of a correction target, the red pixel has a pixel value R and the green pixels have pixel values Gr and Gb while the blue pixel has a pixel value B and the flicker correction gain is HG, an arithmetic operation of expressions (23) to (26) is performed to calculate pixel values Rc, Gcr, Gcb and Bc after flicker correction.

$$Rc = R \times HG \quad (23)$$

$$Gcr = Gr \times HG \quad (24)$$

$$Gcb = Gb \times HG \quad (25)$$

$$Bc = B \times HG \quad (26)$$

Now, in regard to different calculation operation of a flicker correction gain of the second embodiment, calculation operation of a flicker correction gain in the case where, for example, 2×1 pixels form a pixel block and two blocks form a pixel unit of imaging pixels or light intensity detection pixels is described with reference to FIGS. 19A and 19B.

Figure 19B:
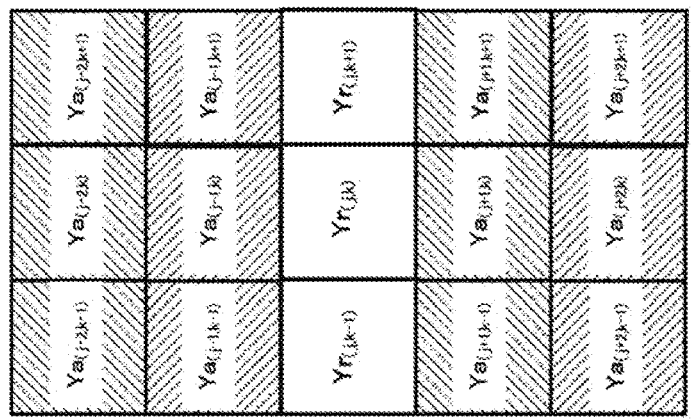
FIGS. 19A and 19B are views illustrating different calculation operation of a flicker correction gain of the second embodiment.
Figure 19A:
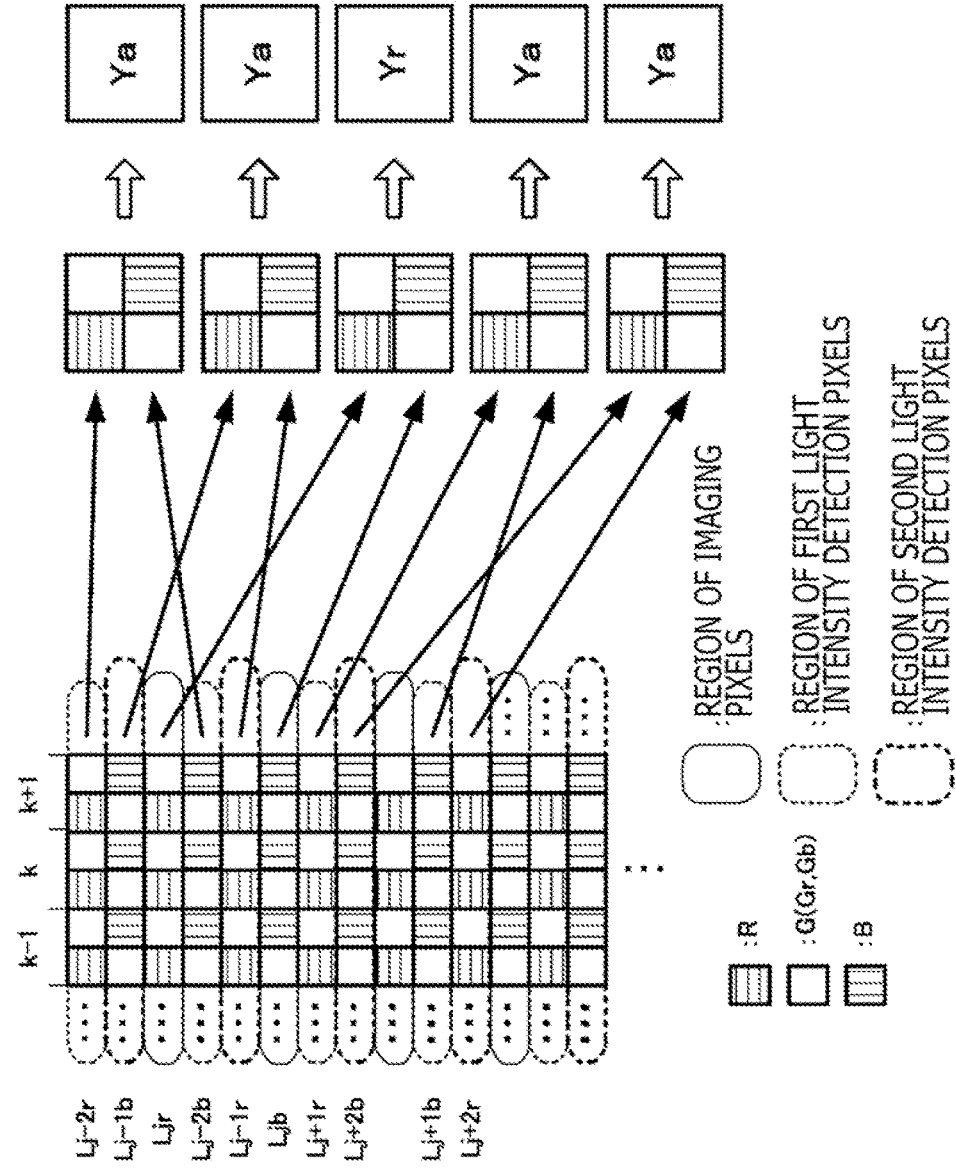

FIGS. 19A and 19B are views illustrating the different calculation operation of a flicker correction gain of the second embodiment. The luminance calculation section 31 calculates a luminance value Ya(j−2,x) from pixel signals of two pixel blocks of 2×1 pixels on lines Lj−2r and Lj−2b that are first light intensity detection pixels as depicted in FIG. 19A. Similarly, the luminance calculation section 31 calculates a luminance value Ya(j−1,x) from pixel signals of two pixel blocks of 2×1 pixels on lines Lj−1b and Lj−1r that are second light intensity detection pixels. Further, the luminance calculation section 31 calculates a luminance value Yr(j,x) from pixel signals of two pixel blocks of 2×1 pixels on lines Ljr and Ljb that are imaging pixels. Further, the luminance calculation section 31 calculates a luminance value from pixel signals of two different pixel blocks of 2×1 pixels.

The correction gain calculation section 32 calculates a flicker correction gain for a block of a correction target using a luminance value calculated using two pixel blocks of 2×1 pixels by the luminance calculation section 31. FIG. 19B indicates luminance values calculated by the luminance calculation section 31. The luminance calculation section 31 calculates a luminance value using two pixel blocks of 2×1 pixels. For example, for a luminance value Yr(j,k) of a pixel block corresponding to an imaging pixel of a correction target, luminance values of 3 pixels in the horizontal direction and 5 pixels in the vertical direction as depicted in FIG. 19B is calculated, and they indicate arrangement similar to that of the pixel values of FIG. 10 described hereinabove in connection with the third operation. Accordingly, the correction gain calculation section 32 calculates a flicker correction gain using the luminance values similarly as in the third operation.

The flicker correction section 33 corrects a pixel signal of color component pixels of a pixel block for the imaging pixel of the correction target using the flicker correction gain calculated by the correction gain calculation section. For example, where, in a pixel block for the imaging pixel of the correction target, the red pixel has a pixel value R and the green pixels have pixel values Gr and Gb while the blue pixel has a pixel value B, the flicker correction section 33 performs an arithmetic operation of expressions (23) to (26) to calculate pixel values Rc, Gcr, Gcb and Bc after flicker correction.

Figure 20:
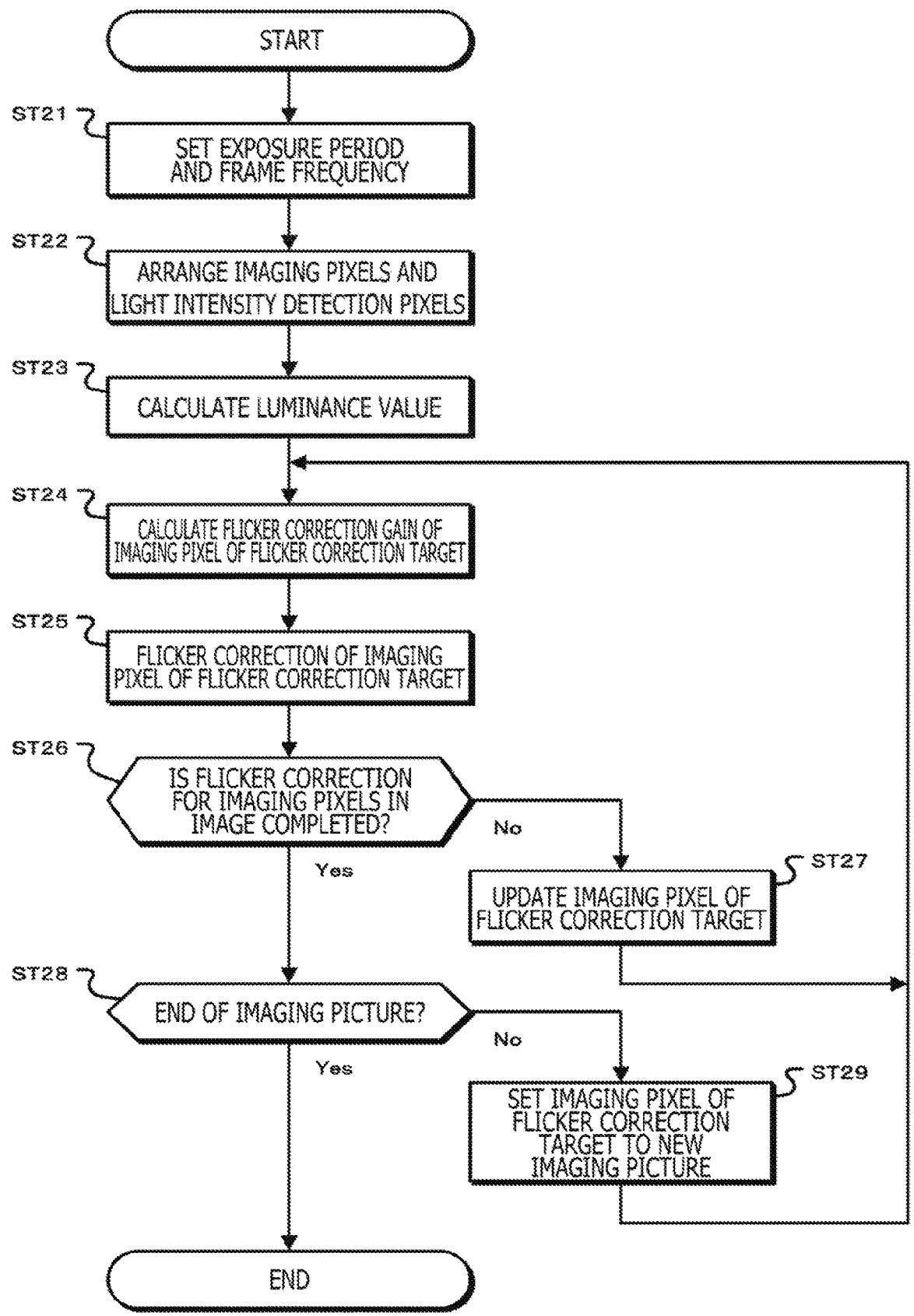
FIG. 20 is a flow chart exemplifying operation of the imaging apparatus of the second embodiment.

FIG. 20 is a flow chart exemplifying operation of the imaging apparatus of the second embodiment. At step ST21, the imaging apparatus sets an exposure period and a frame frequency. The control section 45 of the imaging apparatus 10a sets the exposure period for imaging pixels to a period corresponding to a set shutter speed. Further, the control section 45 sets the exposure period for light intensity detection pixels to the flicker cycle period. Furthermore, the control section 45 sets a frame frequency FV of an imaging picture in response to a frame rate set by the user or the like and then advances the processing to step ST22.

At step ST22, the imaging apparatus arranges imaging pixels and light intensity detection pixels. The control section 45 of the imaging apparatus 10a sets imaging pixels and light intensity detection pixels in such a manner as described above in the imaging plane of the imaging section 21a and performs driving control setting the exposure periods for the imaging pixels and the light intensity detection pixels to the exposure periods set at step ST21, and then advances the processing to step ST23.

At step ST23, the imaging apparatus calculates a luminance value. The luminance calculation section 31 of the imaging apparatus 10a calculates a luminance value from pixel signals of a pixel block of color component pixels corresponding to the imaging pixels. Further, the luminance calculation section 31 calculates a luminance value from pixel signals of a pixel block of color component pixels corresponding to the light intensity detection pixels, and then advances the processing to step ST24.

At step ST24, the imaging apparatus calculates a flicker correction gain for the imaging pixel of the flicker correction target. The correction gain calculation section 32 of the imaging apparatus 10a calculates a flicker correction gain in such a manner as described hereinabove using the luminance value calculated at step ST23, using a luminance value of imaging pixels and a luminance value of light intensity detection pixels in a predetermined pixel range based on the imaging pixel of the flicker correction target, and advances the processing to step ST25.

At step ST25, the imaging apparatus performs flicker correction of the imaging pixel of the flicker correction target. The flicker correction section 33 of the imaging apparatus 10a uses the flicker correction gain calculated at step ST24 to perform gain adjustment for the color component pixels of the pixel block corresponding to the imaging pixel of the flicker correction target to generate a pixel signal on which the influence of the flicker is corrected, and the processing advances to step ST26.

At step ST26, the imaging apparatus decides whether flicker correction of the imaging pixels in the screen image is completed. In the case where the image signal processing section 30a of the imaging apparatus 10a does not complete the flicker correction of the imaging pixels in the screen image, the processing advances to step ST27. In the case where the flicker correction of the imaging pixels in the screen image is completed, the processing advances to step ST28.

At step ST27, the imaging apparatus updates the imaging pixel of the flicker correction target. The image signal processing section 30a of the imaging apparatus 10a sets an imaging pixel for which flicker correction of the imaging pixel has not been performed as an imaging pixel of a new flicker correction target, and then the processing returns to step ST24.

At step ST28, the imaging apparatus decides whether the imaging picture is ended. In the case where the control section 45 of the imaging apparatus 10a does not end the imaging picture for which flicker correction is to be performed, the processing advances to step ST29, but in the case where the imaging picture for which flicker correction is to be performed is ended, for example, in the case where an ending operation for imaging is performed, the flicker correction operation is ended.

At step ST29, the imaging apparatus sets an imaging pixel of a flicker correction target in a new imaging picture. The image signal processing section 30a of the imaging apparatus 10a sets an imaging pixel of a flicker correction target in an imaging picture of a new frame, and the processing advances to step ST24.

In this manner, the imaging apparatus provides color component pixels in an imaging screen image, and the control section performs association among pixel blocks including color component pixels, imaging pixels and light intensity detection pixels. Further, the control section sets the exposure period for the imaging pixels to a period according to a shutter speed and sets the exposure period for the light intensity detection pixels to the flicker cycle period. Further, the correction gain calculation section calculates a flicker correction gain using imaging pixels and light intensity detection pixels within a predetermined pixel range based on an imaging pixel of a flicker correction target. The flicker correction section performs gain adjustment for the color component pixels of the pixel block corresponding to the imaging pixel of the flicker correction target with the calculated flicker correction gain. Accordingly, a color imaging picture on which the influence of fluctuation of the intensity of illumination light is reduced irrespective of the positional relationship between the illumination apparatus and the imaging object can be obtained.

3. Third Embodiment

Incidentally, although the first and second embodiments described above are directed to a case in which a flicker frequency (or a flicker cycle) is set in advance by a user or the like, the flicker frequency may be decided automatically on the basis of a pixel signal generated by the imaging section 21 (21a).

Figure 21:
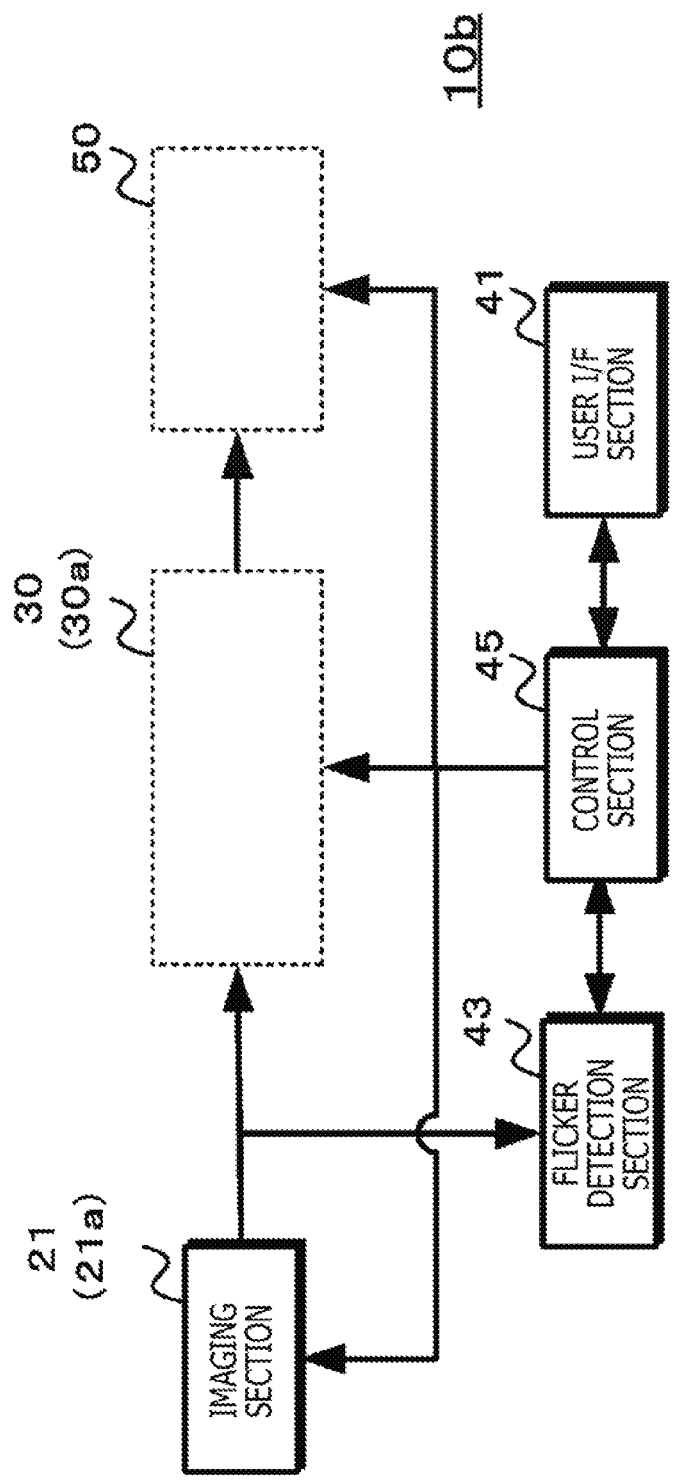
FIG. 21 is a view exemplifying a configuration of the imaging apparatus in the case where the flicker frequency is automatically detected.

FIG. 21 exemplifies a configuration of an imaging apparatus in the case where a flicker frequency is automatically detected. The imaging apparatus 10b includes an imaging section (21a), an image signal processing section 30 (30a), a user interface section 41, a flicker detection section 43, a control section 45 and a peripheral section 50. It is to be noted that, in FIG. 21, elements corresponding to those of the imaging apparatus of the first and second embodiments are denoted by like reference signs.

The imaging section 21 (21a) includes imaging pixels and light intensity detection pixels and outputs pixel signals generated by the imaging pixels and the light intensity detection pixels to the flicker detection section 43.

The flicker detection section 43 sets a flicker detection first pixel and a flicker detection second pixel on the basis of a control signal from the control section 45. FIGS. 22A, 22B, and 22B exemplifies flicker detection first pixels and flicker detection second pixels. FIG. 22A depicts a case in which an imaging pixel and a light intensity detection pixel are provided alternately in a unit of one pixel in the horizontal direction similarly as in the first operation in the first embodiment described hereinabove. In this case, an imaging pixel is a flicker detection first pixel and a light intensity detection pixel is a flicker detection second pixel. FIG. 22B depicts a case in which an imaging pixel and two light intensity detection pixels are provided alternately in the horizontal direction similarly as in the second operation in the first embodiment described hereinabove. In this case, a first light intensity detection pixel is a flicker detection first pixel and a second light intensity detection pixel is a flicker detection second pixel. FIG. 22C depicts a case in which a line of imaging pixels and two lines of light intensity detection pixels are provided alternately in the vertical direction similarly as in the third operation in the first embodiment described hereinabove. In this case, a first light intensity detection pixel is a flicker detection first pixel and a second light intensity detection pixel is a flicker detection second pixel. It is to be noted that, also in the case where an imaging section is configured using color component pixels as in the second embodiment described hereinabove, imaging pixels and light intensity detection pixels are similarly set as flicker detection first pixels and flicker detection second pixels.

The control section 45 performs flicker detection before the correction gain calculation section 32 calculates a flicker correction gain for each imaging pixel and the flicker correction section 33 performs flicker correction of the imaging pixel using the flicker correction gain for each imaging pixel. Further, the control section 45 may perform flicker detection in the case where flicker information indicative of presence or absence of a flicker, a flicker frequency and so forth is not acquired.

In the case where flicker detection is to be performed, for example, the control section 45 sets the exposure period for a flicker detection first pixel to ($\frac{1}{100}$) second that is a flicker cycle when the commercial power supply frequency is 50 Hz and sets the exposure period for a flicker detection second pixel to ($\frac{1}{120}$) second that is a flicker cycle when the commercial power supply frequency is 60 Hz. Further, the control section 45 sets the cycle of the intensity change of illumination light detected by the flicker detection section 43 as an exposure period for a light intensity detection pixel.

The flicker detection section 43 performs flicker detection on the basis of a signal level change of a unit of a frame of a flicker detection first pixel and a signal level change of a unit of a frame of a flicker detection second pixel.

In the case where the intensity of illumination light of the illumination apparatus does not exhibit a change according to the commercial power supply frequency, any one of the flicker detection first pixel and the flicker detection second pixel does not indicate a signal level change in a unit of a frame. Further, in the case where the flicker detection first pixel and the flicker detection second pixel are positioned adjacent each other, the signal level ratio between the flicker detection first pixel and the flicker detection second pixel becomes equal to the ratio in exposure period. Further, even in the case where the intensity of illumination light of the illumination apparatus exhibits a change according to the commercial power supply frequency, in the case where the exposure starting timing or the exposure end timing synchronizes with an intensity change of the illumination light in each frame, any one the flicker detection first pixel and the flicker detection second pixel does not indicate a signal level change in a unit of a frame.

Therefore, in the case where the flicker detection first pixel does not exhibit a signal level change in a unit of a frame but the flicker detection second pixel exhibits a signal level change in a unit of a frame, the flicker detection section 43 outputs to the control section 45 a flicker detection result indicating that a flicker having a flicker frequency of 100 Hz occurs.

On the other hand, in the case where the flicker detection first pixel exhibits a signal level change in a unit of a frame but the flicker detection second pixel does not exhibit a signal level change in a unit of a frame, the flicker detection section 43 outputs, to the control section 45, a flicker detection result indicating that a flicker having a flicker frequency of 120 Hz occurs.

Further, in the case where any one of the flicker detection first pixel and the flicker detection second pixel does not exhibit a signal level change in a unit of a frame and the signal level ratio between the flicker detection first pixel and the flicker detection second pixel is substantially equal to the ratio in exposure period, the flicker detection section 43 outputs, to the control section 45, a flicker detection result indicating that no flicker occurs.

It is to be noted that the control section 45 may control the exposure starting timings and the exposure end timings of the flicker detection first pixel and the flicker detection second pixel to timings different from each other. In this case, the flicker detection section 43 performs exposure for a predetermined period displacing, for example, the exposure starting timing for each line among the flicker detection first pixels and performs, also for the flicker detection second pixels, exposure for a predetermined period at different timings corresponding to those for the flicker detection first pixels. Here, in the case where the difference in signal level at a same line position of the flicker detection first pixels and the flicker detection second pixels indicates a change depending upon a difference in line position, the flicker detection section 43 outputs, to the control section 45, a flicker detection result indicating that a flicker occurs. On the other hand, in the case where the difference in signal level at a same line position of the flicker detection first pixels and the flicker detection second pixels does not indicate a change depending upon a difference in line position, the flicker detection section 43 outputs, to the control section 45, a flicker detection result indicating that a flicker does not occur. Accordingly, since exposure starting timings or exposure end timings at both of the flicker detection first pixel and the flicker detection second pixel are synchronized with a change in intensity of illumination light in each frame, such a situation that a signal level change in a unit of a frame does not occur with any of the flicker detection first pixel and the flicker detection second pixel can be prevented.

Figure 23:
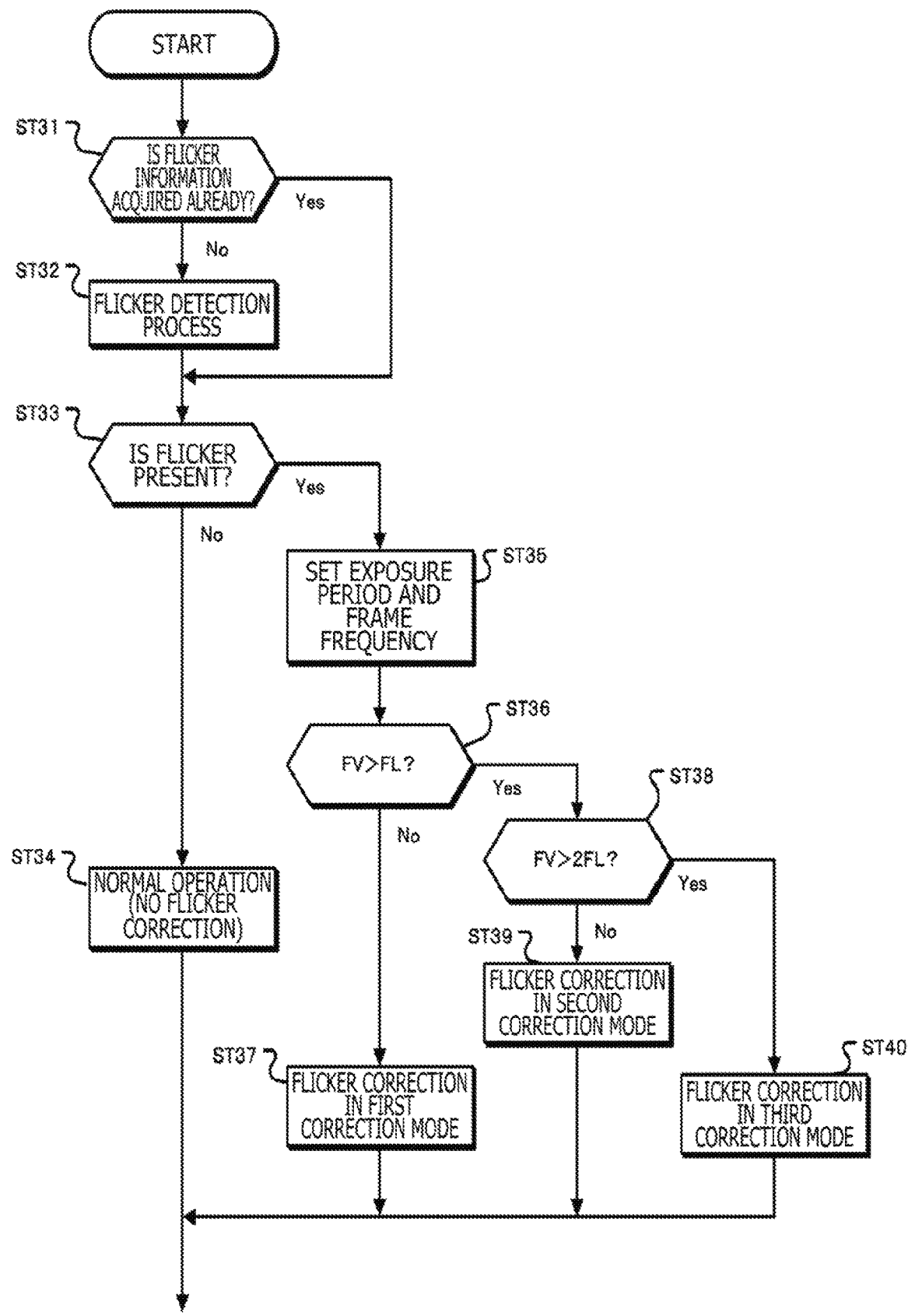
FIG. 23 is a flow chart exemplifying operation of a third embodiment.

FIG. 23 is a flow chart exemplifying operation of the third embodiment. It is to be noted that operations at step ST35 to step ST40 in FIG. 23 correspond to the processes at step ST11 to step ST16 in the flow chart of the fifth operation depicted in FIG. 12, respectively.

At step ST31, the imaging apparatus decides whether or not flicker information is acquired already. In the case where flicker information indicative of presence or absence of a flicker, a flicker frequency and so forth is acquired already by the control section 45 of the imaging apparatus 10b, for example, in the case a flicker frequency or the like is set by a user or the like, the processing advances to step ST33. On the other hand, in the case where flicker information is not acquired by the control section 45, the processing advances to step ST32.

At step ST32, the imaging apparatus performs a flicker detection process. The control section 45 of the imaging apparatus 10 sets flicker detection first pixels and flicker detection second pixels. Further, the control section 45 sets exposure periods for the flicker detection first pixels and the flicker detection second pixels. The flicker detection section 43 detects presence or absence of a flicker and a flicker frequency on the basis of a signal level change of the flicker detection first pixels in a unit of a frame and a signal level change of the flicker detection second pixels in a unit of a frame, and the processing advances to step ST33.

At step ST33, the imaging apparatus decides whether or not there is a flicker. In the case where the flicker information indicates presence of a flicker, or in the case where a flicker is detected by the flicker detection process at step ST32, the control section 45 of the imaging apparatus 10b advances the processing to step ST35. On the other hand, in the case where the flicker information indicates absence of a flicker and a flicker is not detected by the flicker detection process at step ST32, the control section 45 advances the processing to step ST34.

At step ST34, the imaging apparatus performs ordinary operation. Since a flicker is not detected, the imaging apparatus 10b performs recording, outputting or the like of the imaging picture without performing flicker correction.

At step ST35, the imaging apparatus sets an exposure period and a frame frequency. The control section 45 of the imaging apparatus 10b sets the exposure period for an imaging pixel to an exposure period corresponding to the shutter speed. Further, the control section 45 sets the exposure period for a light intensity detection pixel to a cycle period of the flicker frequency indicated by the flicker information or a cycle period of a flicker detected at step ST32. Furthermore, the control section 45 sets the frame frequency FV of the imaging picture to a frequency corresponding to a frame rate set by the user or the like and then advances the processing to step ST36.

At step ST36, the imaging apparatus decides the frame frequency FV of the imaging picture exceeds the flicker frequency FL. The control section 45 compares the frame frequency FV of the imaging picture set by the user or the like and the flicker frequency FL indicated by the flicker information or detected by the flicker detection with each other. In the case where the frame frequency FV of the imaging picture does not exceed the flicker frequency FL, the control section 45 advances the processing to step ST37. On the other hand, in the case where the flicker frequency FL of the imaging picture exceeds the flicker frequency FL, the control section 45 advances the processing to step ST38.

At step ST37, the imaging apparatus performs flicker correction in the first correction mode. In the case where the frame frequency FV of the imaging picture does not exceed the flicker frequency FL, flicker correction is performed similarly as in the first operation described hereinabove. In particular, as described in the first operation, the control section 45 provides one kind of light intensity detection pixels and controls the imaging section to operate such that the imaging pixels generate a pixel signal during an exposure period according to the shutter speed and the light intensity detection pixels generate a pixel signal during an exposure period that is the flicker cycle period. In the first correction mode, the image signal processing section performs linear interpolation using the pixel values of the light intensity detection pixel group to calculate a pixel value of the light intensity detection pixel group having a spatial phase same as that of the imaging pixel group within a predetermined pixel range. Further, the image signal processing section calculates a flicker correction gain on the basis of the calculated pixel values and pixel values of the imaging pixel group within the predetermined pixel range. Furthermore, the image signal processing section corrects the pixel signal of the imaging pixel of the flicker correction target using the calculated flicker correction gain.

When the processing advances from step ST36 to step ST38, the imaging apparatus decides at step ST38 whether the frame frequency FV of the imaging picture exceeds twice the flicker frequency FL. The control section 45 compares the frame frequency FV of the imaging picture set by the user or the like and the flicker frequency FL with each other. In the case where the frame frequency FV of the imaging picture does not exceed twice the flicker frequency FL, the control section 45 advances the processing to step ST39. On the other hand, in the case where the frame frequency FV of the imaging picture exceeds twice the flicker frequency FL, the processing advances to step ST40.

At step ST39, the imaging apparatus performs flicker correction in the second correction mode. In the case where the frame frequency FV of the imaging picture exceeds the flicker frequency FL but does not exceed twice the frequency, the imaging apparatus performs flicker correction similarly as in the second operation described hereinabove. In particular, as described in the second operation, the control section 45 provides two kinds of light intensity detection pixels and controls the imaging section to operate such that the imaging pixel generates a pixel signal for an exposure period according to the shutter speed and the light intensity detection pixel generates a pixel signal for an exposure period that is the flicker cycle period. In the second correction mode, the image signal processing section performs linear interpolation using the pixel values of the light intensity detection pixel group from which the pixel signal for an exposure period that is the flicker cycle period has been obtained and calculates pixel values of the light intensity detection pixel group having a spatial phase same as that of the imaging pixel group in the predetermined pixel range and then calculates a flicker correction gain on the basis of the calculated pixel values and the pixel values of the imaging pixel group in the predetermined pixel range. Further, the image signal processing section corrects the pixel signal of the imaging pixel of the flicker correction target using the calculated flicker correction gain.

At step ST40, the imaging apparatus performs flicker correction in the third correction mode. In the case where the frame frequency FV of the imaging picture exceeds twice the flicker frequency FL but does not exceed four times the frequency at step ST40, the imaging apparatus provides four kinds of light intensity detection pixels to perform flicker correction. In particular, the control section 45 provides four kinds of light intensity detection pixels and controls the imaging section to operate such that the imaging pixel generates a pixel signal during an exposure period according to the shutter speed and the light intensity detection pixel generates a pixel signal during an exposure period that is the flicker cycle period. In the third correction mode, the image signal processing section performs linear interpolation using the pixel values of the light intensity detection pixel group from which a pixel signal during an exposure period that is the flicker cycle period and calculates a pixel value having a spatial movement same as that of the pixel position of the imaging pixel group in a predetermined pixel range. Further, the image signal processing section calculates a flicker correction gain on the basis of the calculated pixel values and the pixel values of the imaging pixel group in the predetermined pixel range. Furthermore, the image signal processing section corrects the pixel signal of the imaging pixel of the flicker correction target using the calculated flicker correction gain.

In this manner, in the third embodiment, since the flicker detection section automatically detects presence or absence of a flicker and a flicker frequency, even in the case where the user does not perform a designation operation of a flicker frequency and so forth according to an illumination environment using the user interface section 41, flicker correction can be performed correctly.

Further, although the third embodiment described above is directed to operation for performing flicker detection in the case where flicker information is not acquired, flicker detection may be performed otherwise irrespective of the acquisition state of flicker information. In this case, when a flicker frequency indicated by flicker information acquired already and a flicker frequency detected by the flicker detection section 43 are different from each other, a process for notifying the user or the like that the frequencies are different is performed or, for example, the detected flicker frequency is used preferentially. This makes it possible for flicker correction to be performed with a flicker frequency different from an intensity change of illumination light.

4. Fourth Embodiment

Incidentally, in the first and second embodiments described above, not only imaging pixels but also light intensity detection pixels are provided on the imaging plane of the imaging section. Further, as described above, as the frame frequency of the imaging picture becomes higher, it is necessary to provide an increasing number of kinds of light intensity detection pixels. Therefore, there is the possibility that, as the frame frequency of the imaging picture becomes higher, the spatial resolution of the imaging picture may be degraded. Therefore, the fourth embodiment described below is directed to a case in which degradation of the spatial resolution of an imaging picture is suppressed.

Figures 24A, 24B:
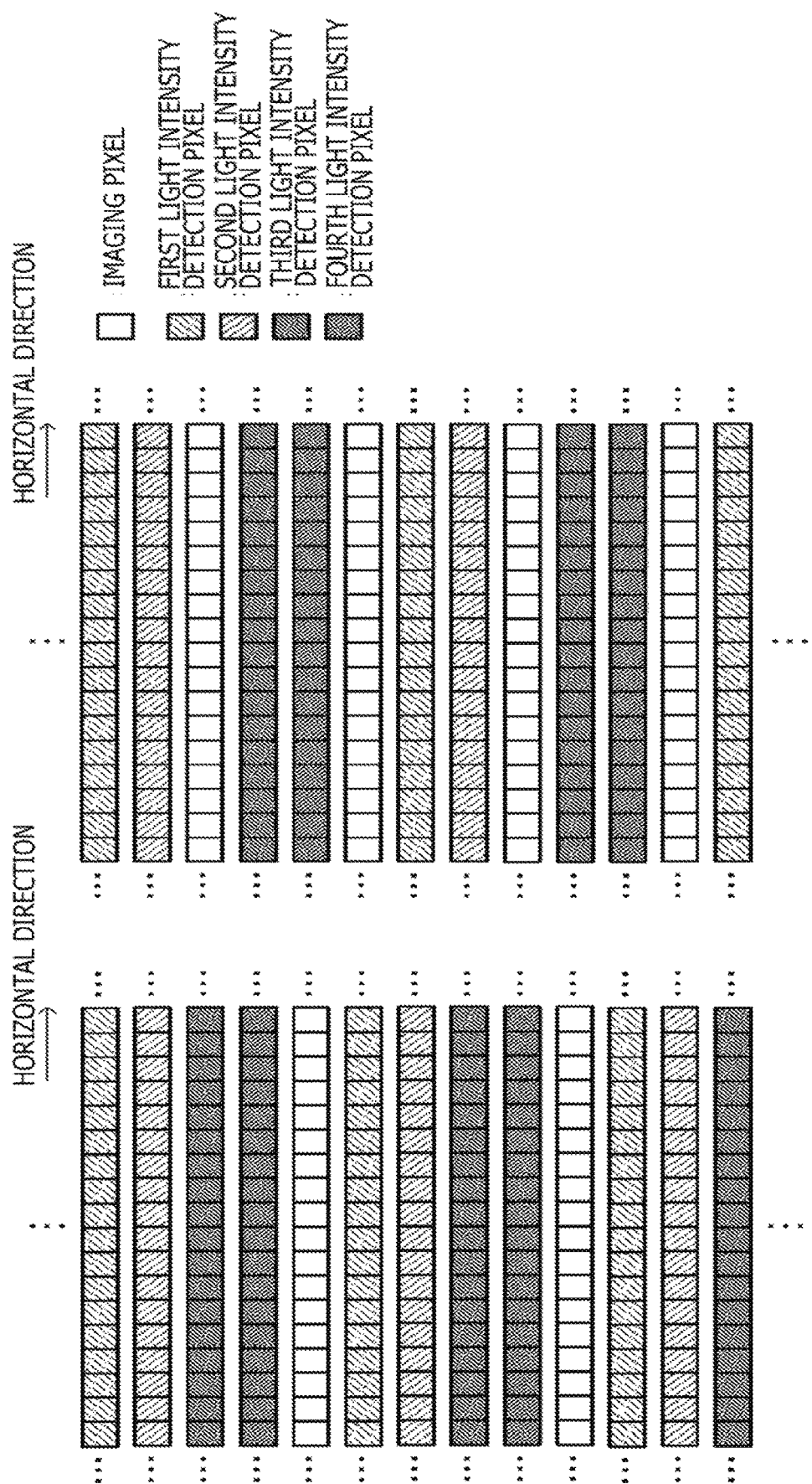
FIGS. 24A and 24B are views depicting an example of operation of a fourth embodiment.

FIGS. 24A and 24B depict an example of operation of the fourth embodiment. In the case where imaging pixels and light intensity detection pixels are to be set, the control section 45 arranges light intensity detection pixels thinned out. FIG. 24A depicts operation in a case in which four kinds of light intensity detection pixels are arranged without being thinned out, and FIG. 24B depicts operation in another case in which four kinds of light intensity detection pixels are arranged thinned out. In the case where four kinds of light intensity detection pixels are arranged without being thinned out, lines of the four kinds of light intensity detection pixel are provided between lines of imaging pixels. On the other hand, in the case where four kinds of light intensity detection pixels are arranged thinned out, for example, lines of two kinds of light intensity detection pixels are provided between lines of imaging pixels such that the kinds of light intensity detection pixels on the upper side and the lower side of a line of imaging pixels are different from each other. If light intensity detection pixels are arranged thinned out in this manner, even if the frame frequency of the imaging picture becomes high, decrease of imaging pixels can be suppressed, and therefore, degradation of the spatial resolution of the imaging picture can be suppressed.

Figure 25:
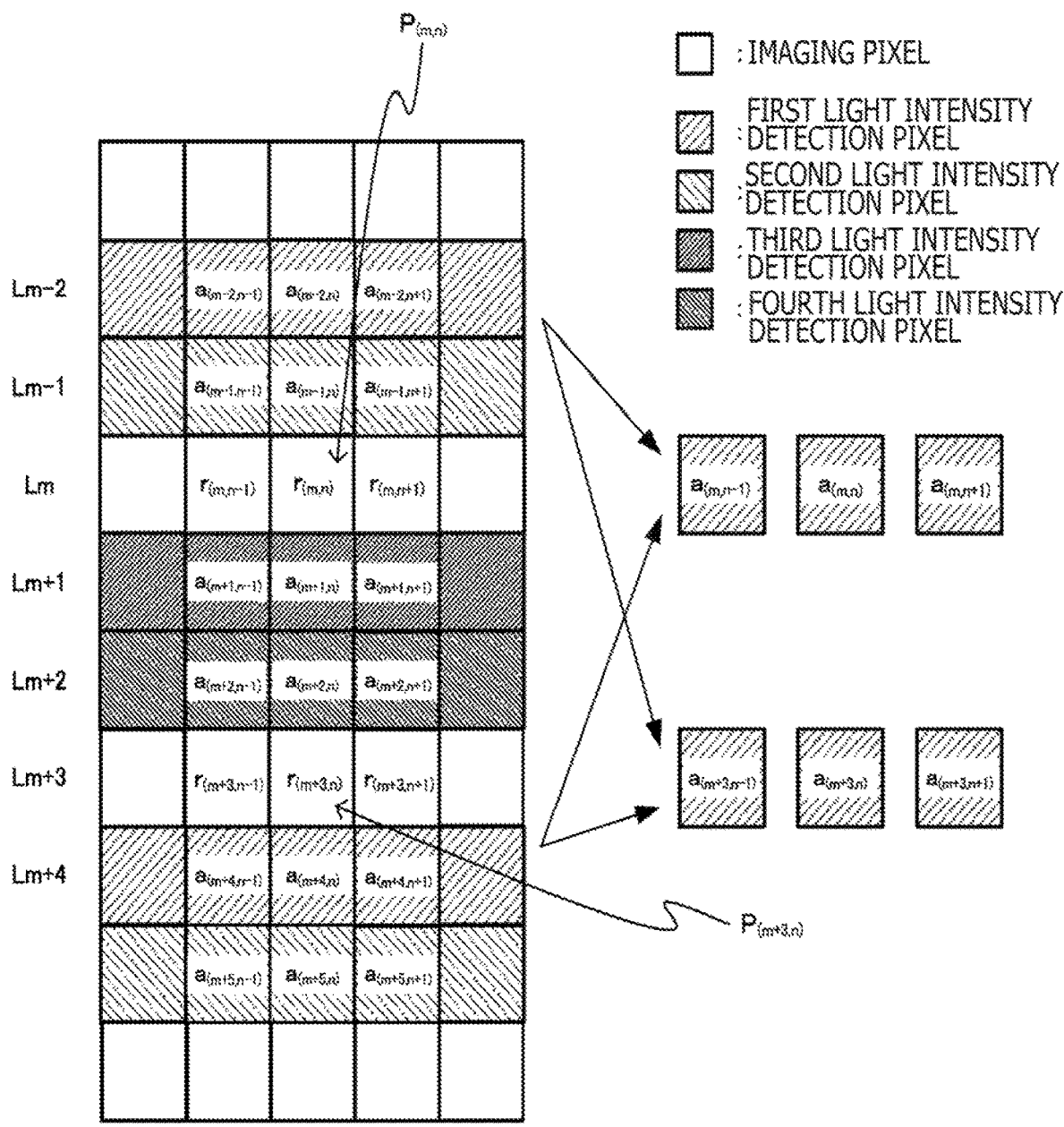
FIG. 25 is a view exemplifying a predetermined pixel range based on an imaging pixel of a flicker correction target.

FIG. 25 exemplifies a predetermined pixel range based on an imaging pixel of a flicker correction target. The correction gain calculation section 32 calculates a flicker correction gain for imaging pixels in two lines sandwiched by a pair of lines of light intensity detection pixels of a same kind. Note that it is assumed in FIG. 25 that a flicker cycle period for an exposure period of the imaging pixel of the flicker correction target is the exposure period of the first light intensity detection pixels. Further, it is assumed that the nth pixels P(m,n) and P(m+3, n) on the line Lm and the line Lm+3, which are imaging pixels sandwiched by the line LM−2 and the line Lm+4 that are lines of the first light intensity detection pixels are determined as the line positions of the imaging pixel of the flicker correction target. Further, it is assumed that the pixel value of the pixel P(m,n) of the flicker correction target is r(m,n) and the pixel values of the imaging pixels on the opposite sides of the pixel P(m,n) are r(m,n−1) and r(m,n+1). Further, the pixel value of the pixel P(m+3, n) of the flicker correction target is r(m+3, n), and the pixel values of the imaging pixels on the opposite sides of the pixel P(m+3, n) are r(m+3, n−1) and r(m+3, n+1). Further, the pixel values of pixels on the line Lx, which are light intensity detection pixels, are a(x, n−1), a(x,n) and a(x, n+1).

The correction gain calculation section 32 of the image signal processing section calculates a flicker correction gain on the basis of an expression (27).

Flicker correction gain=(pixel value WTam of first light intensity detection pixel group/pixel value WTrm of imaging pixel group) (27)

For the pixel value WTrm of the imaging pixel group, for example, an average pixel value of the imaging pixels is used as indicated by an expression (28).

$$WTrm=(r(m,n-1)+r(m,n)+r(m,n+1))/3 \qquad (28)$$

For the pixel value WTa of the first light intensity detection pixel group, linear interpolation is performed using pixel values of the light intensity detection pixel group and pixel values of the light intensity detection pixel group having a spatial phase same as that of the imaging pixel group of the flicker correction target are calculated, and an average value of the calculated pixel values is used as the pixel value WTa.

The correction gain calculation section 32 calculates pixel values a(m,n−1), a(m,n) and a(m,n+1) of a spatial phase same as that of the line Lm of the imaging pixels are calculated by expressions (29) to (31), respectively. Further, the correction gain calculation section 32 performs an arithmetic operation of an expression (32) to calculate the pixel value WTa of the light intensity detection pixel group.

$$a(m,n-1)=0.667 \times a(m-2,n-1)+0.333 \times a(m+4,n-1) \qquad (29)$$

$$a(m,n)=0.667 \times a(m-2,n)+0.333 \times a(m+4,n) \qquad (30)$$

$$a(m,n+1)=0.667 \times a(m-2,n+1)+0.333 \times a(m+4,n+1) \qquad (31)$$

$$WTam=(a(m,n-1)+a(m,n)+a(m,n+1))/3 \qquad (32)$$

The correction gain calculation section 32 outputs the calculated flicker correction gain, namely, the flicker correction gain HG(m,n) indicated by an expression (33), to the flicker correction section 33.

$$HG(m, n) = (WTam / WTrm) = \qquad (33)$$
$$(0.667 \times (a(m-2, n-1) + a(m-2, n) + a(m-2, n+1)) +$$
$$0.333 \times (a(m+4, n-1) + a(m+4, n) + a(m+4, n+1)))/$$
$$(r(m, n-3) + r(m, n) + r(m, n+3))$$

Meanwhile, for the pixel value WTrma of the imaging pixel group, for example, an average pixel value of the imaging pixels is used as indicated by an expression (34).

$$WTrma=(r(m+3,n-1)+r(m+3,n)+r(m+3,n+1))/3 \qquad (34)$$

For the pixel value WTama of the first light intensity detection pixel group, linear interpolation is performed using pixel values of the light intensity detection pixel group and pixel values of the light intensity detection pixel group having a spatial phase same as that of the imaging pixel group of the flicker correction target are calculated, and an average value of the calculated pixel values is used as the pixel value WTama.

The correction gain calculation section 32 calculates pixel values a(m,n−1), a(m,n) and a(m,n+1) corresponding to positions on the line Lm of the imaging pixels by expressions (35) to (37), respectively. Further, the correction gain calculation section 32 performs an arithmetic operation of an expression (38) to calculate the pixel value WTa of the light intensity detection pixel group.

$$a(m+3, n-1) = 0.167 \times a(m-2, n-1) + 0.833 \times a(m+4, n-1) \quad (35)$$

$$a(m+3, n) = 0.167 \times a(m-2, n) + 0.833 \times a(m+4, n) \quad (36)$$

$$a(m+3, n+1) = 0.167 \times a(m-2, n+1) + 0.833 \times a(m+4, n+1) \quad (37)$$

$$WTama = (a(m+3, n-1) + a(m+3, n) + a(m+3, n+1))/3 \quad (38)$$

The correction gain calculation section 32 outputs the calculated flicker correction gain, namely, the flicker correction gain HG(m+3, n) indicated by an expression (39), to the flicker correction section 33.

$$HG(m+3, n) = (WTama / WTrma) = \quad (39)$$
$$(0.167 \times (a(m-2, n-1) + a(m-2, n) + a(m-2, n+1) + 0.833 \times$$
$$(a(m+4, n-1) + a(m+4, n) + a(m+4, n+1)))/$$
$$(r(m, n-3) + r(m, n) + r(m, n+3))$$

The flicker correction section 33 uses the flicker correction gain HG(m,n) calculated by the correction gain calculation section 32 to perform gain adjustment for the imaging pixel that is the pixel P(m,n) of the flicker correction target. Further, the flicker correction section 33 uses the flicker correction gain HG(m+3, n) calculated by the correction gain calculation section 32 to perform gain adjustment for the imaging pixel of the flicker correction target.

The image signal processing section generates an image signal on which the influence of the flicker is reduced by performing the processes described above for each imaging pixel.

Figure 26:
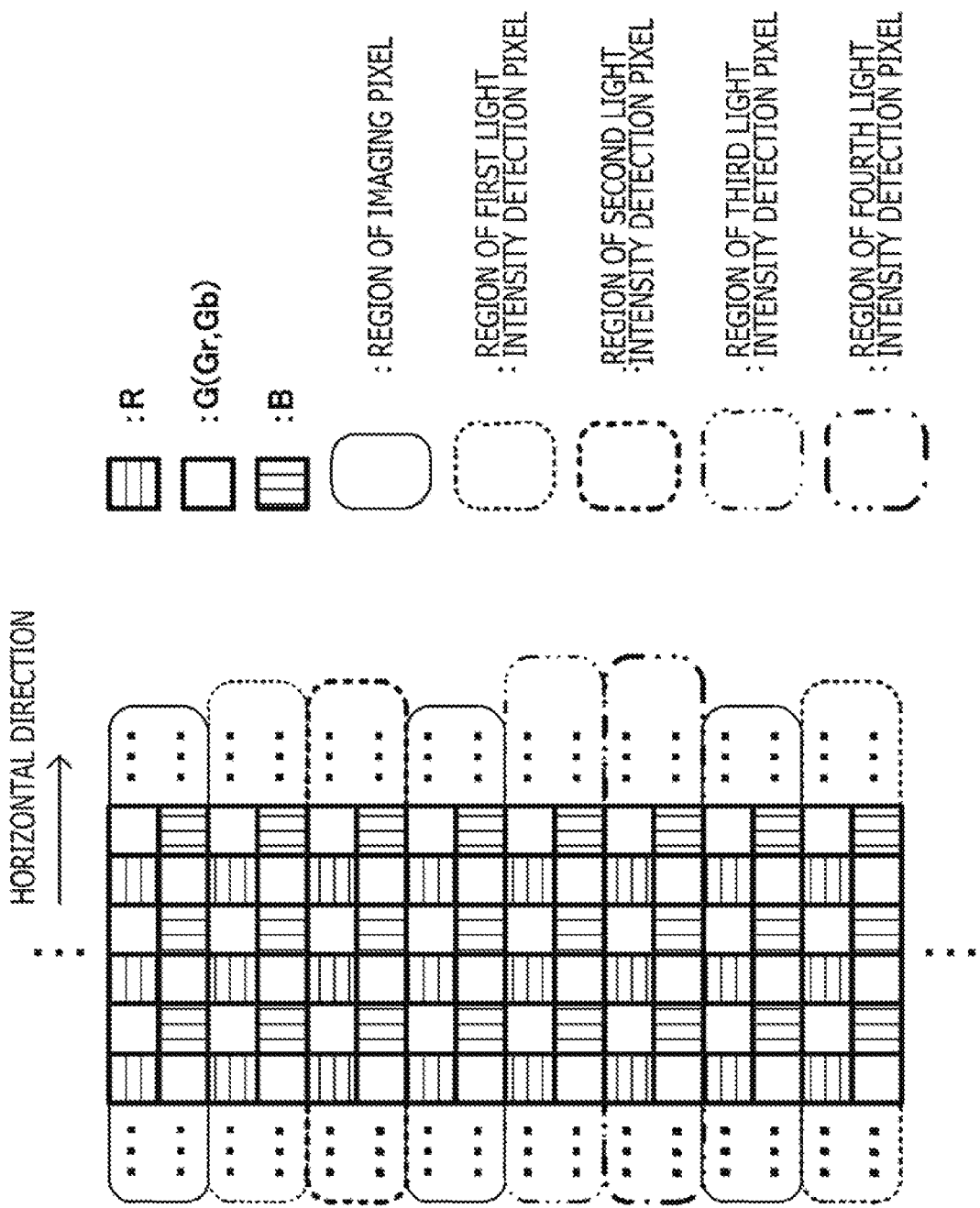
FIG. 26 is a view depicting a case of a color imaging picture as another example of operation of the fourth embodiment.

FIG. 26 depicts a case of a color imaging picture as another example of operation of the fourth embodiment. In the case where the array of color component pixels in the imaging section 21a is a Bayer array, the control section 45 thins out and arranges light intensity detection pixels setting a pixel block of 2×2 pixels as a pixel unit of imaging pixels and light intensity detection pixels similarly as in the second embodiment. If the light intensity detection pixels are arranged thinned out in this manner, then even if the frame frequency of the imaging picture becomes high, decrease of imaging pixels can be suppressed, and therefore, degradation of the spatial resolution of the imaging picture can be suppressed.

Figures 27A, 27B:
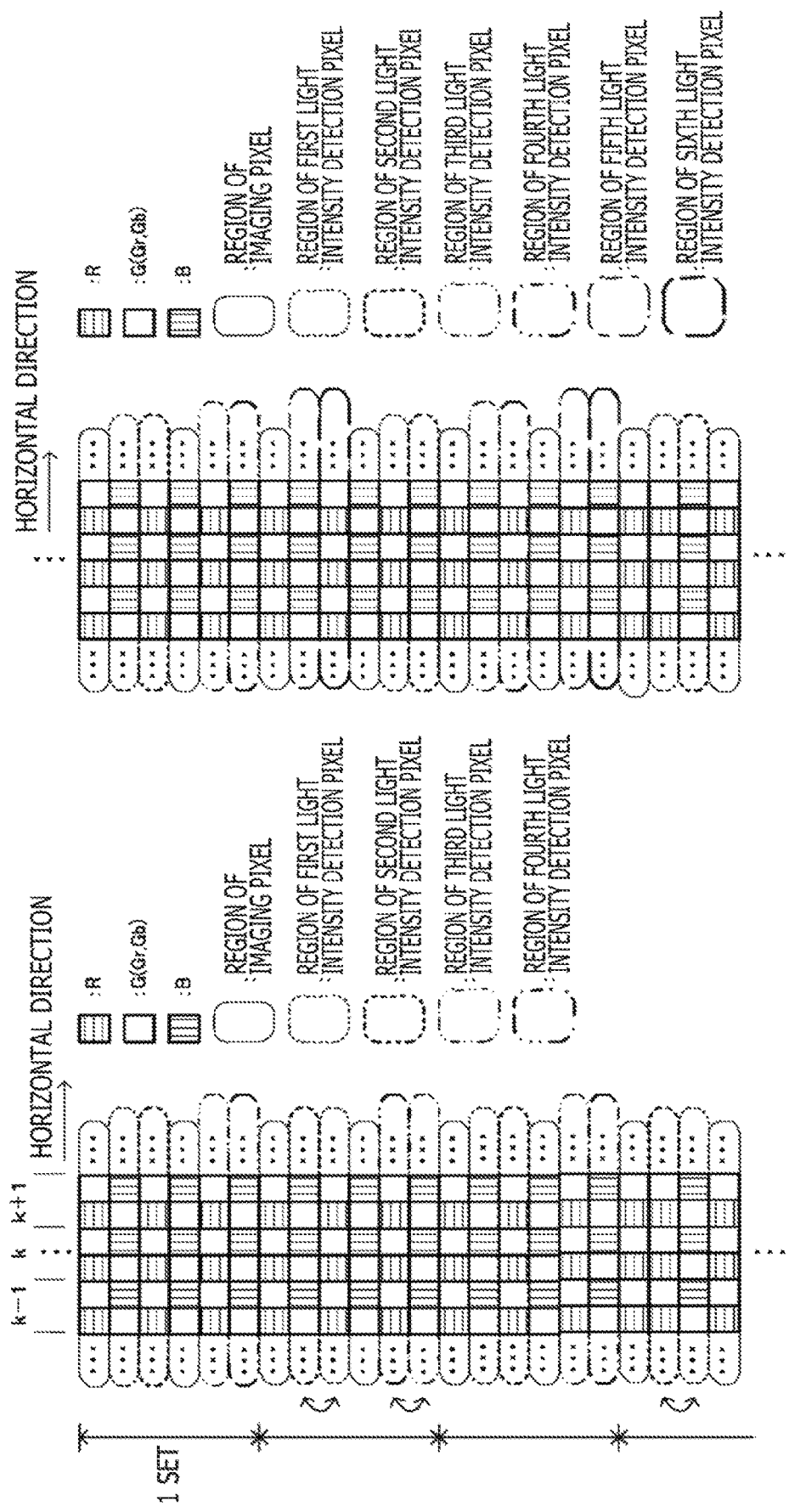
FIGS. 27A and 27B are views depicting another case of a color imaging picture as a further example of operation of the fourth embodiment.

FIGS. 27A and 27B depict another case of the color imaging picture as a further example of operation of the fourth embodiment. In the case where the array of color component pixels in the imaging section 21a is a Bayer array, the control section 45 thins out and arranges light intensity detection pixels setting, for example, two pixel blocks of 1×2 pixels as a pixel unit for imaging pixels and light intensity detection pixels, as in the second embodiment. If light intensity detection pixels are arranged thinned out in this manner, then even if the frame frequency of the imaging picture becomes high, decrease of imaging pixels can be suppressed, and therefore, degradation of the spatial resolution of an imaging picture can be suppressed. It is to be noted that FIG. 27A indicates a case in which four kinds of light intensity detection pixels are provided and FIG. 27B depicts a case in which six kinds of light intensity detection pixels are provided.

Further, in the case where four kinds of light intensity detection pixels are provided, it is necessary to perform, for each set, replacement of a line of first light intensity detection pixels and a line of second light intensity detection pixels and replacement of a line of third light intensity detection pixels and a line of fourth light intensity detection pixels. For example, if replacement of a line of first light intensity detection pixels and a line of second light intensity detection pixels is not performed, then when a line of second light intensity detection pixels includes red pixels and green pixels in pixel blocks whose horizontal directions are the same, also in a next line of second light intensity detection pixels, it includes red pixels and green pixels. Therefore, replacement of lines is performed such that, in the next line of second light intensity detection pixels, pixel signals of green pixels and blue pixels are obtained. In particular, lines of second light intensity detection pixels are successively used such that pixel signals of the color component pixels of a pixel block of 2×2 pixels of a Bayer array can be obtained. This similarly applies also to lines of other light intensity detection pixels. It is to be noted that, in the case where six kinds of light intensity detection pixels are provided, there is no necessity to perform replacement of lines of light intensity detection pixels.

Figures 28A, 28B:
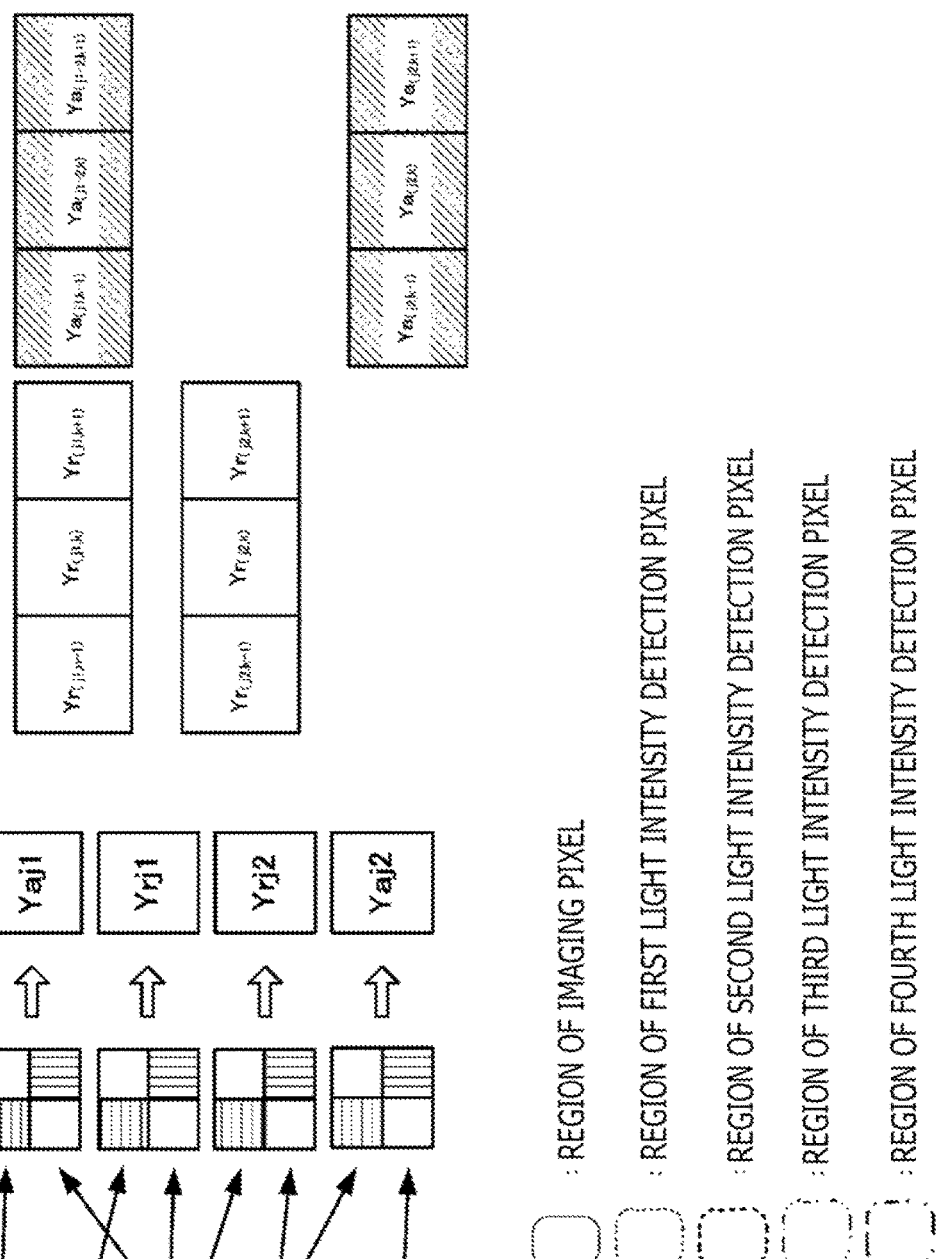
FIGS. 28A and 28B are views illustrating calculation operation of a flicker correction gain in the case where four kinds of light intensity detection pixels are arranged thinned out.

FIGS. 28A and 28B are views illustrating calculation operation of a flicker correction gain in the case where four kinds of light intensity detection pixels are arranged thinned out. For example, if two image blocks of 1×2 pixels on a line Lj−2r and another line Lj+2b of first light intensity detection pixels are used, then, since a pixel signal for each of the color component pixels of 2×2 pixels of a Bayer array is obtained, the correction gain calculation section 32 calculates a luminance value Ya1 using the pixel signals of the two image blocks of 1×2 pixels on the line Lj−2r and the line Lj+2b. Similarly, the correction gain calculation section 32 calculates a luminance value Ya2 using pixel signals of two image blocks of 1×2 pixels on a line Lj+2r and another line Lj+3b of first light intensity detection pixels.

Further, since a pixel signal for each color component pixel of 2×2 pixels of a Bayer array can be obtained if two image blocks of 1×2 pixels on a line Ljr and another line Ljb of imaging pixels, the correction gain calculation section 32 calculates a luminance value Yrj1 using pixel signals of two image blocks of 1×2 pixels on the line Ljr and the line Ljb.

Similarly, since pixel signals of 2×2 pixels of a Bayer array can be obtained if two image blocks of 1×2 pixels on a line Ljb and another line L'jr of imaging pixels, the correction gain calculation section 32 calculates a luminance value Yaj2 using pixel signals of two image blocks of 1×2 pixels on the line Ljb and the line L'jr. Further, the correction gain calculation section 32 calculates an image signal for each block position in the horizontal direction and calculates luminance values, for example, at block positions k−1, k and k+1 as depicted in FIG. 28B.

Furthermore, the correction gain calculation section 32 calculates, for each of luminance values Yrj1 and Yrj2 of the imaging pixels, a luminance value of a corresponding spatial phase from a luminance value Yar1 and another luminance value Yar2 of the light intensity detection pixels and calculates a flicker correction gain from the ratio between the luminance value of the imaging pixel and the luminance value of the light intensity detection pixel having a spatial phase same as that of the imaging pixel. For example, since the luminance value Yrj1 and the luminance value Yaj1 have spatial phases same as each other, the correction gain calculation section 32 determines the ratio between an average of the luminance values Yr(j1, k−1), Yr(j1, k) and Yr(j1, k+1) and an average of the luminance values Ya(j1, k−1), Ya(j1, k) and Ya(j1, k+1) as a flicker correction gain of the luminance value Yr(j1, k).

Further, since the luminance value Yrj2 has a spatial phase same as that of an average of the luminance value Yaj1 and the luminance value Yaj2, the correction gain calculation section 32 determines the ratio between an average of the luminance values Yr(j2, k−1), Yr(j2, k) and Yr(j2, k+1) and an average of the luminance values Ya(j1, k−1), Ya(j1, k), Ya(j1, k+1), Ya(j2, k−1), Ya(j2, k) and Ya(j2, k+1) as a flicker correction gain of the luminance value Yr(j2, k).

Furthermore, the correction gain calculation section 32 sets a flicker correction gain for a pixel block of 1×2 pixels used for calculation of a luminance value of an imaging pixel using the flicker correction gain calculated for the luminance value. For example, since the line Ljb is used for calculation of the luminance value Yrj1 and the luminance value Yrj2, the correction gain calculation section 32 calculates a flicker correction gain corresponding to the spatial phase of the line Ljb using the flicker correction gains for the luminance value Yrj1 and the luminance value Yrj2. In the case of FIG. 28A, since the spatial phase of the line Ljb is the middle between the luminance value Yrj1 and the luminance value Yrj2, the correction gain calculation section 32 sets the flicker correction gain for the block (Ljb,k) of the imaging pixels to an average value of the flicker correction gain of Yr(j1,k) and the flicker correction gain of Yr(j2,k).

In this manner, in the imaging apparatus of the present technology, by arranging light intensity detection pixels thinned out, decrease of imaging pixels can be suppressed. Further, even if light intensity detection pixels are thinned out, a flicker correction gain can be calculated for each pixel of imaging pixels or for each calculation unit of a luminance value by such processes as described above. Accordingly, even if decrease of imaging pixels is suppressed, working effects similar to those of the embodiments described above can still be achieved.

5. Application Example

The imaging apparatus indicated by the embodiments described above are suitable, for example, for an imaging apparatus that can perform imaging of still pictures and moving pictures. Although, for imaging of a still picture, an imaging element of a high pixel number is required such that printing and so forth of a high definition imaging picture can be performed, in imaging of a moving picture, it is sufficient if the imaging apparatus has a pixel number ready for a display apparatus. Accordingly, in the case where imaging of a moving picture is performed using an imaging element of a high pixel number, since some pixels are not used for imaging, if pixels that are not used for imaging are used as light intensity detection pixels, then the imaging element of a high pixel number can be effectively utilized also upon imaging of a moving picture.

6. Application Example to Mobile Body

The technology according to the present disclosure can be applied to various products. For example, the technology according to the present disclosure may be implemented as an apparatus that is incorporated in any of various types of mobile bodies such as automobiles, electric cars, hybrid electric cars, motorcycles, bicycles, personal mobilities, airplanes, drones, ships, robots and so forth.

Figure 29:
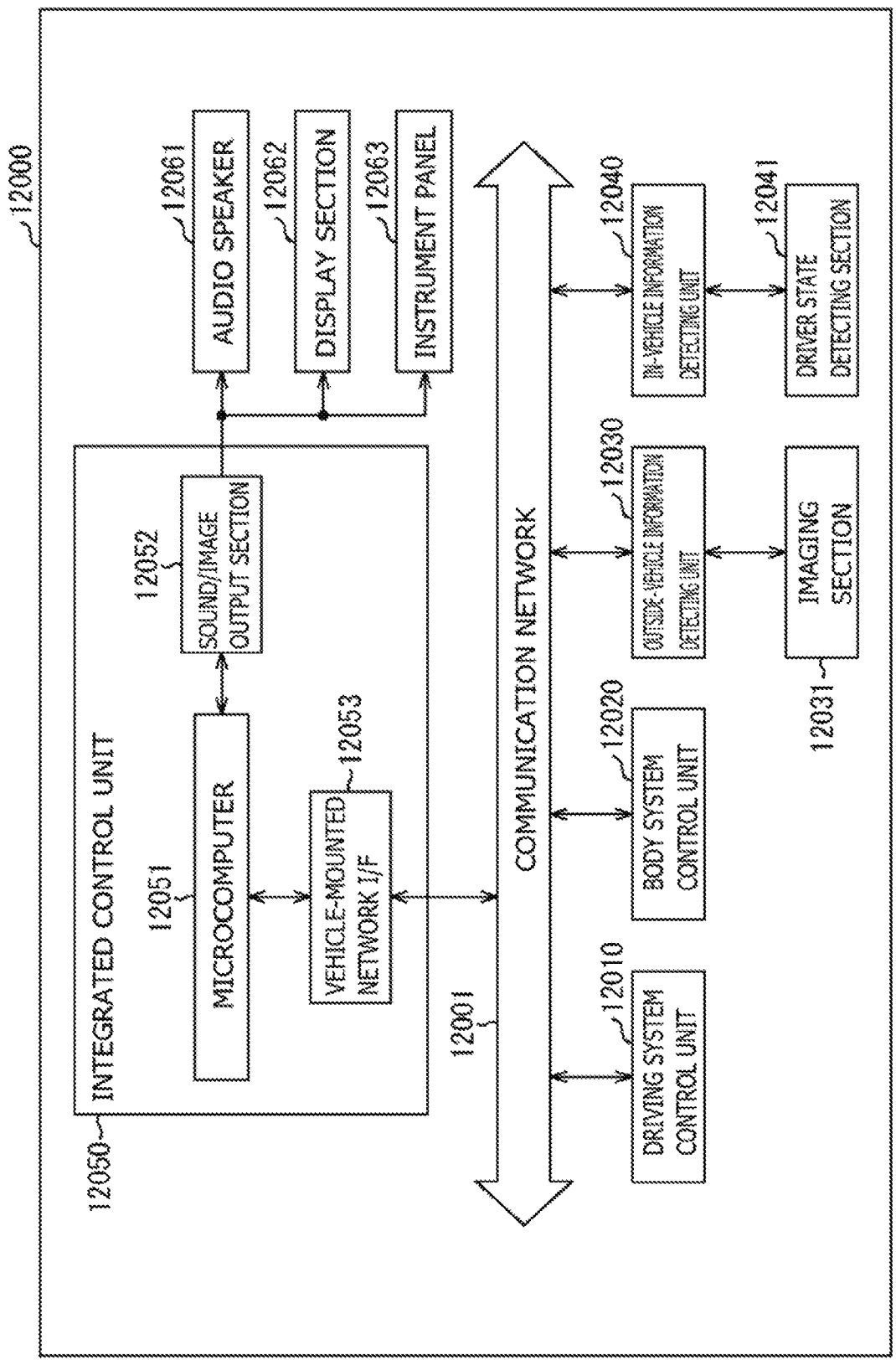
FIG. 29 is a block diagram depicting an example of schematic configuration of a vehicle control system.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display and a head-up display.

Figure 30:
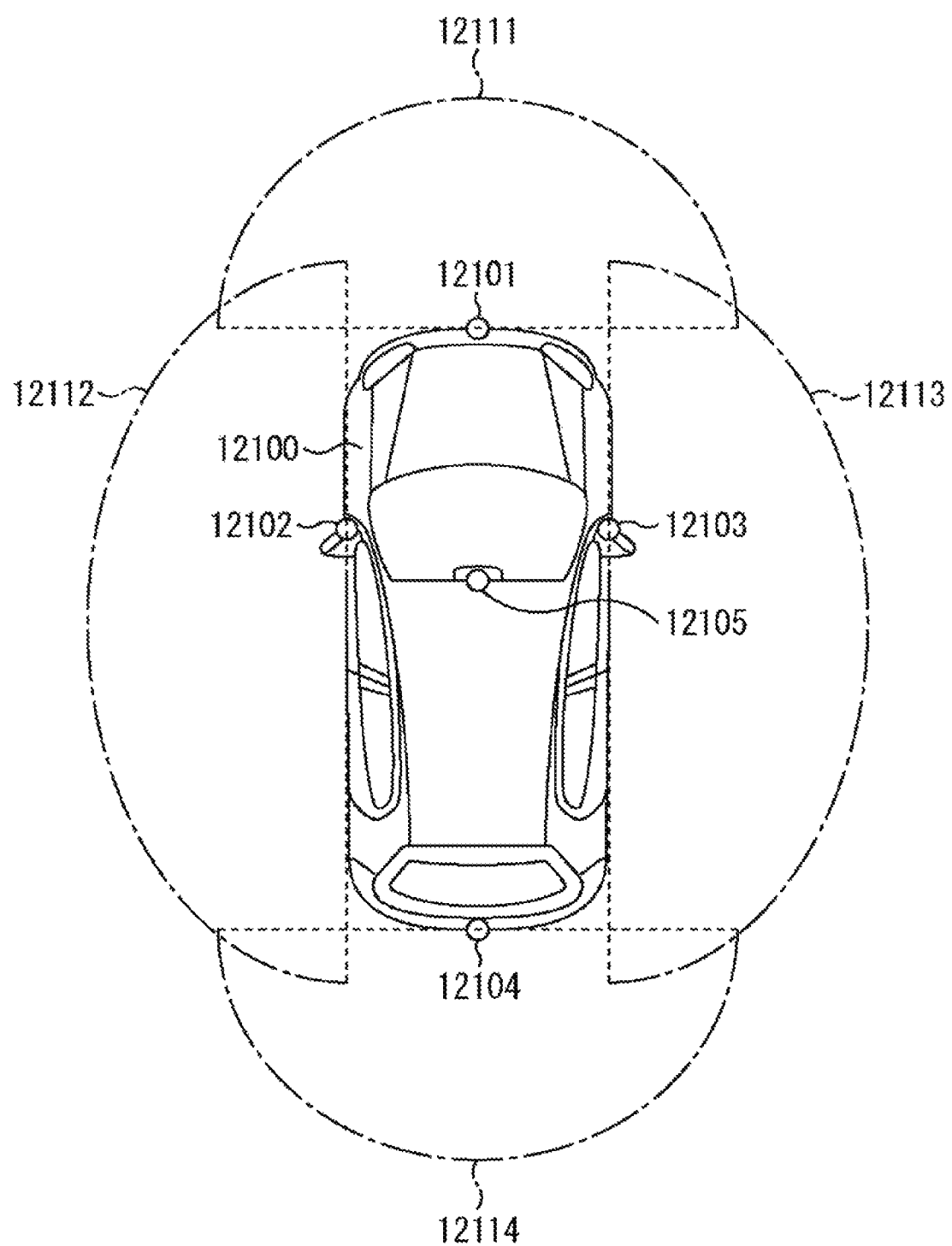
FIG. 30 is a diagram of assistance in explaining an example of installation positions of an outside-vehicle information detecting section and an imaging section.

FIG. 30 is a diagram depicting an example of the installation position of the imaging section 12031.

In FIG. 30, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described. The technology according to the present disclosure can be applied to the imaging sections 12031, 12101, 12102, 12103, 12104, 12105 and so forth from among the configurations described hereinabove. For example, by applying the technology according to the present disclosure to the imaging sections 12031, 12101, 12102, 12103, 12104, 12105 and so forth, even if an illumination apparatus whose illumination light has an intensity that fluctuates periodically is used for illumination for a road, a parking place or the like, an imaging picture on which the influence of the fluctuation of the intensity of the illumination light is reduced can be acquired, and therefore the driver fatigue can be reduced. Further, in the case where an imaging picture is used for automatic driving or the like, since the influence of fluctuation of the intensity of the illumination light is reduced, driving control is facilitated in comparison with that in an alternative case in which the present technology is not used.

The series of processes described in the present specification can be executed by hardware or software or by a composite configuration of them. In the case where processing by software is to be executed, a program in which a processing sequence is recorded is installed into a memory in a computer incorporated in hardware for exclusive use and is executed. Alternatively, it is possible to install the program into a computer for universal use, which can execute various processes, so as to be executed by the computer.

For example, the program can be recorded in advance in a hard disk, an SSD (Solid State Drive) or a ROM (Read Only Memory) as a recording medium. Otherwise, it is possible to store (record) the program temporarily or permanently on a removable recording medium such as a flexible disk, a CD-ROM (Compact Disk Read Only Memory), MO (Magneto optical) disk, DVD (Digital Versatile Disc), a BD (Blu-Ray Disc (registered trademark)), a magnetic disk or a semiconductor memory card. Such a removable recording medium as just described can be provided as so-called package software.

Further, the program not only may be installed from a removable recording medium into a computer but also may be transferred by wireless or wired transfer from a download site to a computer through a network such as a LAN (Local Area Network) or the Internet. The computer can receive the program transferred in this manner and install the program into a recording medium such as a built-in hark disk.

It is to be noted that the advantageous effects described in the present specification are exemplary to the last and are not restrictive, and other additional advantages that are not described herein may be available. Further, the present technology shall not be interpreted restrictively to the embodiments of the technology described above. The embodiments of the present technology disclose the present technology in the form of exemplification, and it is apparent that those skilled in the art can perform various modifications and substitutions of the embodiments without departing from the subject matter of the present disclosure. In particular, in order to decide the subject matter of the present technology, the claims should be taken into consideration.

Further, the imaging apparatus of the present technology can assume also such a configuration as described below.

(1) An imaging apparatus including:

a correction gain calculation section configured to calculate a flicker correction gain on a basis of pixel signals of imaging pixels for acquiring an imaging picture and pixel signals of light intensity detection pixels for detecting intensity of illumination light; and a control section configured to set an exposure timing and an exposure period for the imaging pixels and the light intensity detection pixels individually.

(2) The imaging apparatus according to (1), in which the control section sets the exposure period for the imaging pixels to a period according to a shutter speed and sets the exposure period for the light intensity detection pixels to a cycle period of an intensity change of the illumination light, and sets the exposure timing for the imaging pixels and the light intensity detection pixels to a timing same as any one of an exposure start, an exposure end and a middle of the exposure period.

(3) The imaging apparatus according to (1) or (2), in which the control section provides one or a plurality of pixel groups of the light intensity detection pixels on a basis of a frame cycle of the imaging picture and a cycle of an intensity change of the illumination light to obtain pixel signals during the exposure period that is a cycle period of the intensity change of the illumination light by any one of the pixel groups of the light intensity detection pixels for each frame of the imaging picture.

(4) The imaging apparatus according to (3), in which the control section provides an increasing number of pixel groups of the light intensity detection pixels as the number of frame cycles of the imaging picture included in the cycle of the intensity change of the illumination light increases, and the correction gain calculation section calculates a flicker correction gain on a basis of the pixel signals of the light intensity detection pixels of a pixel group from which the pixel signals during the exposure period that is the cycle period of the intensity change of the illumination light.

(5) The imaging apparatus according to any one of (1) to (4), further including:

a flicker detection section configured to detect a cycle of an intensity change of the illumination light on a basis of a signal level change of the pixel signals for each frame of flicker detection first pixels whose exposure period is a cycle of a first commercial power supply frequency and flicker detection second pixels whose exposure period is a cycle of a second commercial power supply frequency.

(6) The imaging apparatus according to (5), in which the control section sets, before calculation of the flicker correction gain, the light intensity detection pixels or the light intensity detection pixels and the imaging pixels to the flicker detection first pixels and the flicker detection second pixels and controls the flicker detection section to perform flicker detection, and then sets, after the flicker detection, a cycle detected by the flicker detection section to an exposure period for the light intensity detection pixels.

(7) The imaging apparatus according to any one of (1) to (6), in which
the control section determines a pixel block configured from a plurality of color component pixels as a pixel unit of the imaging pixels and light intensity detection pixels, and
the correction gain calculation section calculates the flicker correction gain on a basis of a luminance value calculated from pixel signals of the color component pixels of the pixel block configuring the imaging pixels and the light intensity detection pixels.

(8) The imaging apparatus according to any one of (1) to (7), in which
the correction gain calculation section performs an interpolation process using the pixel signals of the light intensity detection pixels to generate pixel signals of light intensity detection pixels each having a spatial phase same as that of the imaging pixels and calculates a flicker correction gain for each of the imaging pixels on a basis of the pixel signals of the imaging pixels and the pixel signals of the light intensity detection pixels each having the spatial phase same as that of the imaging pixels.

(9) The imaging apparatus according to any one of (1) to (8), in which
the correction gain calculation section calculates, on a basis of pixel signals of a plurality of imaging pixels and light intensity detection pixels in a horizontal direction and a vertical direction based on an imaging pixel of a flicker correction target, a flicker correction gain of the imaging pixel of the flicker correction target.

(10) The imaging apparatus according to any one of (1) to (9), in which
the imaging pixels and the light intensity detection pixels are provided adjacent each other.

(11) The imaging apparatus according to (10), in which
the imaging pixels and the light intensity detection pixels are provided adjacent each other in a vertical direction.

(12) The imaging apparatus according to any one of (1) to (11), in which
the light intensity detection pixels are arranged thinned out, and
the correction gain calculation section performs an interpolation process using the pixel signals of the light intensity detection pixels to calculate pixel signals of light intensity detection pixels each having a spatial phase same as that of the imaging pixels.

(13) The imaging apparatus according to any one of (1) to (12), further including:
a flicker correction section configured to perform flicker correction of the imaging pixels using the flicker correction gain calculated by the correction gain calculation section.

INDUSTRIAL APPLICABILITY

According to the imaging apparatus, flicker correction method and program of the present technology, an exposure timing and an exposure period for the imaging pixels for acquiring an imaging picture and the light intensity detection pixels for detecting intensity of illumination light are set individually, and a flicker correction gain is calculated for each imaging pixel on the basis of the pixel signals generated by the imaging pixels and the pixel signals generated by the light intensity detection pixels. Therefore, since it becomes possible to acquire an imaging picture on which the influence of fluctuation of the intensity of illumination light is reduced can be acquired irrespective of the positional relationship between the illumination apparatus and the imaging object, the present technology is suitable for an imaging apparatus that images a moving picture under an illumination environment in which the illumination intensity changes in response to a commercial power supply frequency.

REFERENCE SIGNS LIST 10, 10a, 10b . . . Imaging apparatus
21, 21a . . . Imaging section
30, 30a . . . Image signal processing section
31 . . . Luminance calculation section
32 . . . Correction gain calculation section
33 . . . Flicker correction section
34 . . . Color image signal generation section
41 . . . User interface (I/F) section
43 . . . Flicker detection section
45 . . . Control section
50 . . . Peripheral section
51 . . . Recording section
52 . . . Signal outputting section
53 . . . Display section

The invention claimed is:

1. An imaging apparatus, comprising:
circuitry configured to:
calculate a flicker correction gain based on pixel signals of imaging pixels and pixel signals of light intensity detection pixels, wherein
the imaging pixels are for acquisition of an imaging picture, and
the light intensity detection pixels are for detection of intensity of illumination light; and
set an exposure timing and an exposure period for the imaging pixels and the light intensity detection pixels individually, wherein
the exposure period for the imaging pixels is set to a period according to a shutter speed,
the exposure period for the light intensity detection pixels is set to a cycle period of an intensity change of the illumination light, and
the exposure timing for the imaging pixels and the light intensity detection pixels is set to a timing same as one of an exposure start, an exposure end, or a middle of the exposure period.

2. The imaging apparatus according to claim 1, wherein the circuitry is further configured to provide one or a plurality of pixel groups of the light intensity detection pixels based on a frame cycle of the imaging picture and a cycle of the intensity change of the illumination light to obtain specific pixel signals during the exposure period by one of the plurality of pixel groups of the light intensity detection pixels for each frame of the imaging picture, and
the exposure period is the cycle period of the intensity change of the illumination light.

3. The imaging apparatus according to claim 2, wherein the circuitry is further configured to:
provide an increasing number of pixel groups of the light intensity detection pixels as a number of frame cycles of the imaging picture included in the cycle of the intensity change of the illumination light increases; and
calculate the flicker correction gain based on the pixel signals of the light intensity detection pixels of a pixel group from which the specific pixel signals during the exposure period are obtained.

4. The imaging apparatus according to claim 1, wherein the circuitry is further configured to detect a cycle of the intensity change of the illumination light based on a signal level change of the pixel signals for each frame of flicker detection first pixels whose exposure period is a cycle of a first commercial power supply frequency and flicker detection second pixels whose exposure period is a cycle of a second commercial power supply frequency.

5. The imaging apparatus according to claim 4, wherein the circuitry is further configured to:
   set, before the calculation of the flicker correction gain, one of the light intensity detection pixels or the light intensity detection pixels and the imaging pixels to the flicker detection first pixels and the flicker detection second pixels to perform flicker detection; and
   set, after the flicker detection, the detected cycle to the exposure period for the light intensity detection pixels.

6. The imaging apparatus according to claim 1, wherein the circuitry is further configured to:
   determine a pixel block comprising a plurality of color component pixels as a pixel unit of the imaging pixels and the light intensity detection pixels; and
   calculate the flicker correction gain based on a luminance value calculated from pixel signals of plurality of the color component pixels of the pixel block.

7. The imaging apparatus according to claim 1, wherein the circuitry is further configured to:
   perform an interpolation process using the pixel signals of the light intensity detection pixels to generate pixel signals of specific light intensity detection pixels each having a spatial phase same as a spatial phase of the imaging pixels; and
   calculate the flicker correction gain for each of the imaging pixels based on the pixel signals of the imaging pixels and the pixel signals of the specific light intensity detection pixel.

8. The imaging apparatus according to claim 7, wherein the circuitry is further configured to:
   calculate, based on the pixel signals of a set of imaging pixels and a set of light intensity detection pixels in a horizontal direction and a vertical direction corresponding to an imaging pixel of a flicker correction target, the flicker correction gain of the imaging pixel of the flicker correction target.

9. The imaging apparatus according to claim 1, wherein the imaging pixels are adjacent to the light intensity detection pixels.

10. The imaging apparatus according to claim 9, wherein the imaging pixels are adjacent to the light intensity detection pixels in a vertical direction.

11. The imaging apparatus according to claim 1, wherein the light intensity detection pixels are arranged thinned out, and
    the circuitry is further configured to perform an interpolation process using the pixel signals of the light intensity detection pixels to calculate pixel signals of specific light intensity detection pixels each having a spatial phase same as a spatial phase of the imaging pixels.

12. The imaging apparatus according to claim 1, wherein the circuitry is further configured to perform flicker correction of the imaging pixels using the flicker correction gain.

13. An imaging apparatus, comprising:
    circuitry configured to:
      calculate a flicker correction gain based on pixel signals of imaging pixels and pixel signals of light intensity detection pixels, wherein
        the imaging pixels are for acquisition of an imaging picture, and
        the light intensity detection pixels are for detection of intensity of illumination light;
      set an exposure timing and an exposure period for the imaging pixels and the light intensity detection pixels individually; and
      provide one or a plurality of pixel groups of the light intensity detection pixels based on a frame cycle of the imaging picture and a cycle of an intensity change of the illumination light to obtain specific pixel signals during the exposure period by one of the plurality of pixel groups of the light intensity detection pixels for each frame of the imaging picture, wherein the exposure period is a cycle period of the intensity change of the illumination light.

14. An imaging apparatus, comprising:
    circuitry configured to:
      calculate a flicker correction gain based on pixel signals of imaging pixels and pixel signals of light intensity detection pixels, wherein
        the imaging pixels are for acquisition of an imaging picture, and
        the light intensity detection pixels are for detection of intensity of illumination light;
      set an exposure timing and an exposure period for the imaging pixels and the light intensity detection pixels individually;
      perform an interpolation process using the pixel signals of the light intensity detection pixels to generate pixel signals of specific light intensity detection pixels each having a spatial phase same as a spatial phase of the imaging pixels; and
      calculate the flicker correction gain for each of the imaging pixels based on the pixel signals of the imaging pixels and the pixel signals of the specific light intensity detection pixels.

* * * * *